(12) United States Patent
Stanley

(10) Patent No.: US 11,141,928 B2
(45) Date of Patent: Oct. 12, 2021

(54) SYSTEM FOR MOUNTING OBJECTS TO POLYMERIC MEMBRANES

(71) Applicant: BWDT, LLC, Colleyville, TX (US)

(72) Inventor: Joel A. Stanley, Colleyville, TX (US)

( * ) Notice: Subject to any disclaimer, the term of this patent is extended or adjusted under 35 U.S.C. 154(b) by 0 days.

(21) Appl. No.: 15/058,741

(22) Filed: Mar. 2, 2016

(65) Prior Publication Data

US 2016/0176105 A1    Jun. 23, 2016

Related U.S. Application Data

(63) Continuation-in-part of application No. 14/823,703, filed on Aug. 11, 2015, now abandoned, which is a
(Continued)

(51) Int. Cl.
| | | |
|---|---|---|
| *E04D 13/18* | (2018.01) | |
| *B29C 65/56* | (2006.01) | |
| *B29C 65/48* | (2006.01) | |
| *E04B 1/41* | (2006.01) | |
| *F24F 13/32* | (2006.01) | |
| *H02S 20/23* | (2014.01) | |
| *F24S 25/61* | (2018.01) | |
| *F24S 25/70* | (2018.01) | |
| *B29L 31/10* | (2006.01) | |
| *H01Q 1/12* | (2006.01) | |
| *F24S 25/00* | (2018.01) | |

(52) U.S. Cl.
CPC .............. *B29C 65/56* (2013.01); *B29C 65/48* (2013.01); *E04B 1/40* (2013.01); *F24F 13/32* (2013.01); *F24S 25/61* (2018.05); *F24S 25/70* (2018.05); *H02S 20/23* (2014.12); *B29L 2031/108* (2013.01); *F24S 2025/014* (2018.05); *F24S 2025/021* (2018.05); *H01Q 1/1207* (2013.01); *Y02B 10/12* (2013.01); *Y02B 10/20* (2013.01); *Y02E 10/47* (2013.01); *Y10T 29/4997* (2015.01)

(58) Field of Classification Search
CPC ......... Y02B 10/12; Y02B 10/10; Y02E 10/47; Y02E 10/50; H02S 20/00; H01L 31/048; H01L 31/0422; H01L 31/042; H01L 31/0482; Y10S 323/906
See application file for complete search history.

(56) References Cited

U.S. PATENT DOCUMENTS

| | | | | |
|---|---|---|---|---|
| 4,860,514 A | * | 8/1989 | Kelly ...................... | E04D 5/143 52/410 |
| 6,110,311 A | * | 8/2000 | Mayle .................... | B29C 65/04 156/189 |

(Continued)

*Primary Examiner* — Gisele D Ford
(74) *Attorney, Agent, or Firm* — Eldredge Law Firm, LLC; Richard Eldredge; Beth Felix

(57) ABSTRACT

A mounting system for attaching an object to a roof structure includes a roof membrane placed on to the roof structure, a mounting plate, an elastic membrane secured to the roof membrane. The mounting plate includes a fastener, the fastener being secured to the mounting plate and extending therefrom, the fastener is configured to secure the mounting plate to the roof structure, which in turn secures the roof membrane to the roof structure, the fastener is configured to extend through a thickness of the roof membrane; and a protrusion extending from a top surface of the mounting plate, the protrusion is configured to secure the object to the mounting plate.

4 Claims, 45 Drawing Sheets

Related U.S. Application Data continuation-in-part of application No. 13/653,935, filed on Oct. 17, 2012, now Pat. No. 9,121,545.

(60) Provisional application No. 62/127,104, filed on Mar. 2, 2015, provisional application No. 62/035,897, filed on Aug. 11, 2014, provisional application No. 61/547,888, filed on Oct. 17, 2011.

(56) References Cited

U.S. PATENT DOCUMENTS

| | | | | |
|---|---|---|---|---|
| 6,526,701 | B2 * | 3/2003 | Stearns | E04D 13/10 |
| | | | | 52/24 |
| 7,069,698 | B2 * | 7/2006 | Nee | E04D 13/10 |
| | | | | 52/24 |
| 7,413,392 | B2 * | 8/2008 | Nebesnak | E04D 5/142 |
| | | | | 411/531 |
| 8,826,618 | B2 * | 9/2014 | Stearns | E04D 13/10 |
| | | | | 52/410 |
| 2010/0212725 | A1 * | 8/2010 | Barth | H01L 31/02013 |
| | | | | 136/252 |
| 2010/0212740 | A1 * | 8/2010 | Barth | H01L 31/02013 |
| | | | | 136/259 |
| 2010/0307074 | A1 * | 12/2010 | Stearns | E04D 13/10 |
| | | | | 52/173.1 |
| 2011/0120047 | A1 * | 5/2011 | Stearns | E04D 13/10 |
| | | | | 52/698 |
| 2011/0214367 | A1 * | 9/2011 | Haddock | F24S 25/615 |
| | | | | 52/173.3 |

* cited by examiner

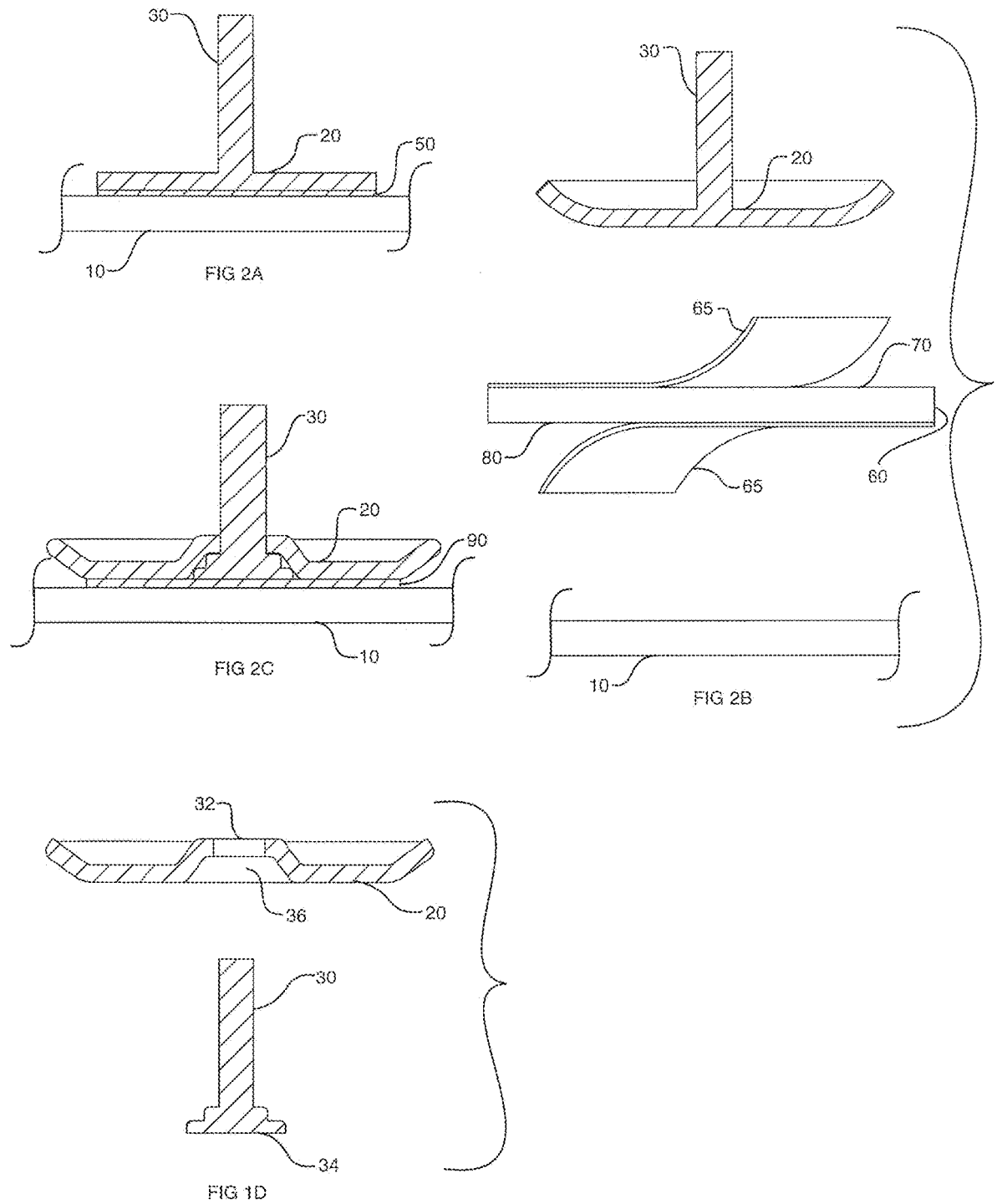

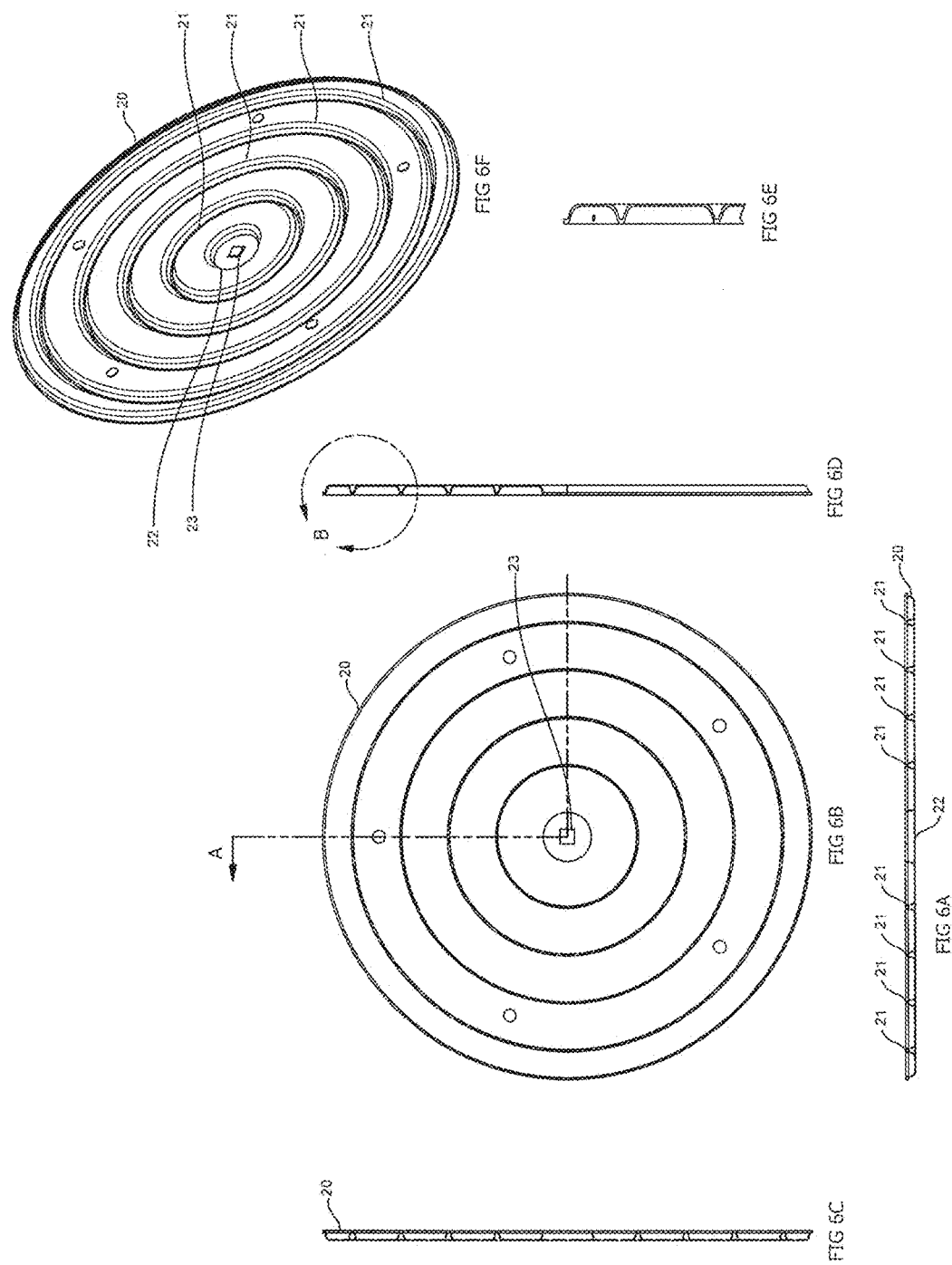

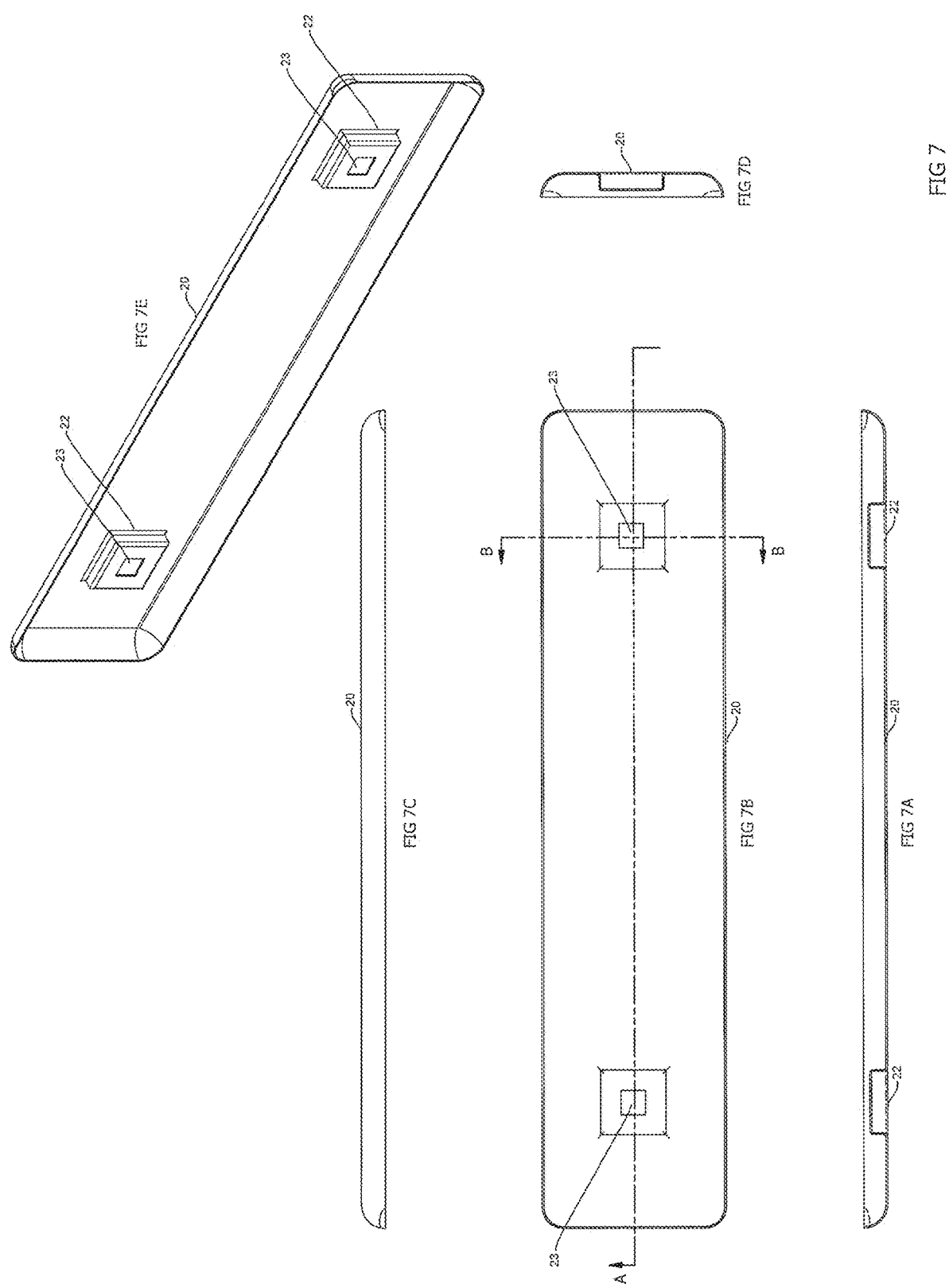

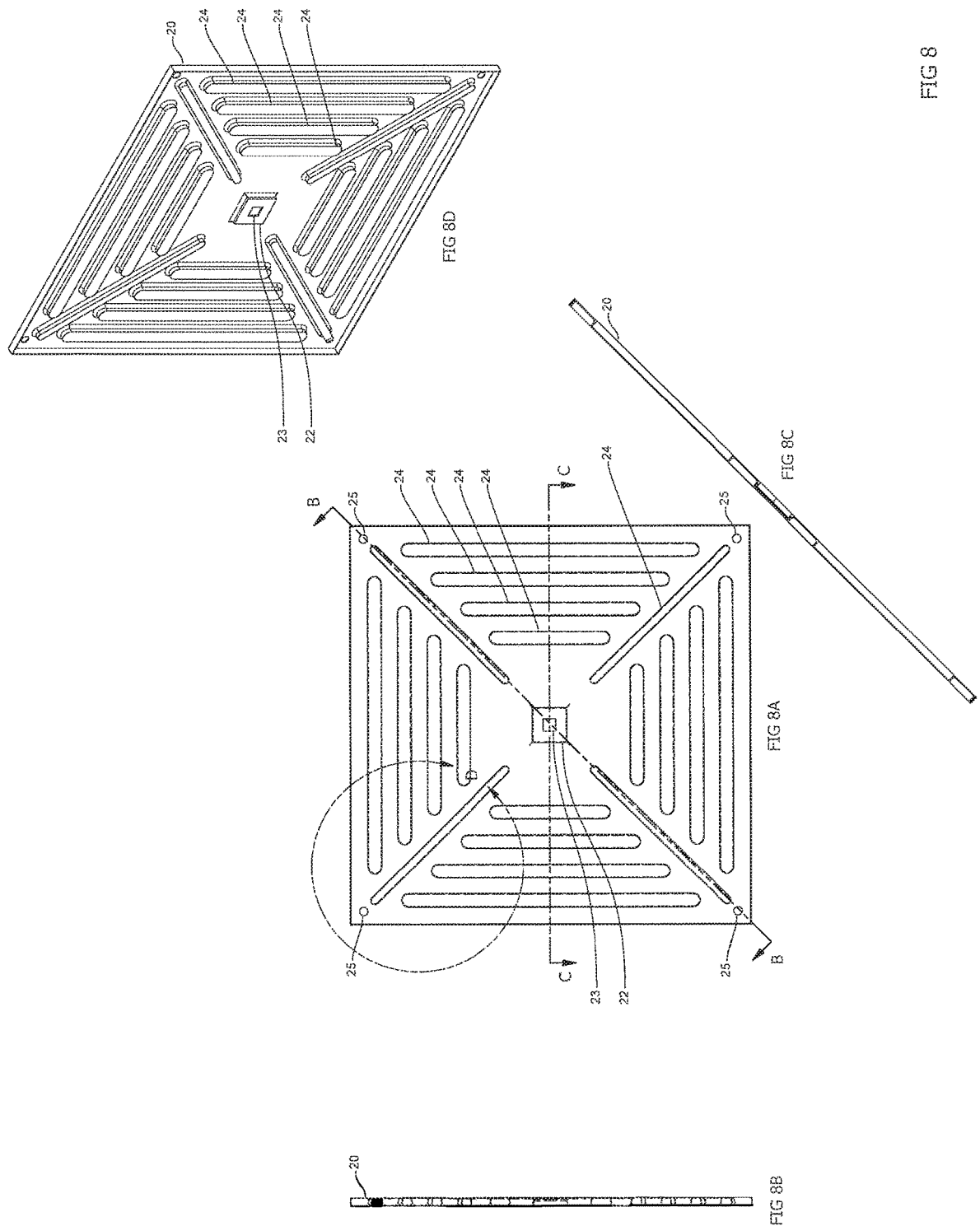

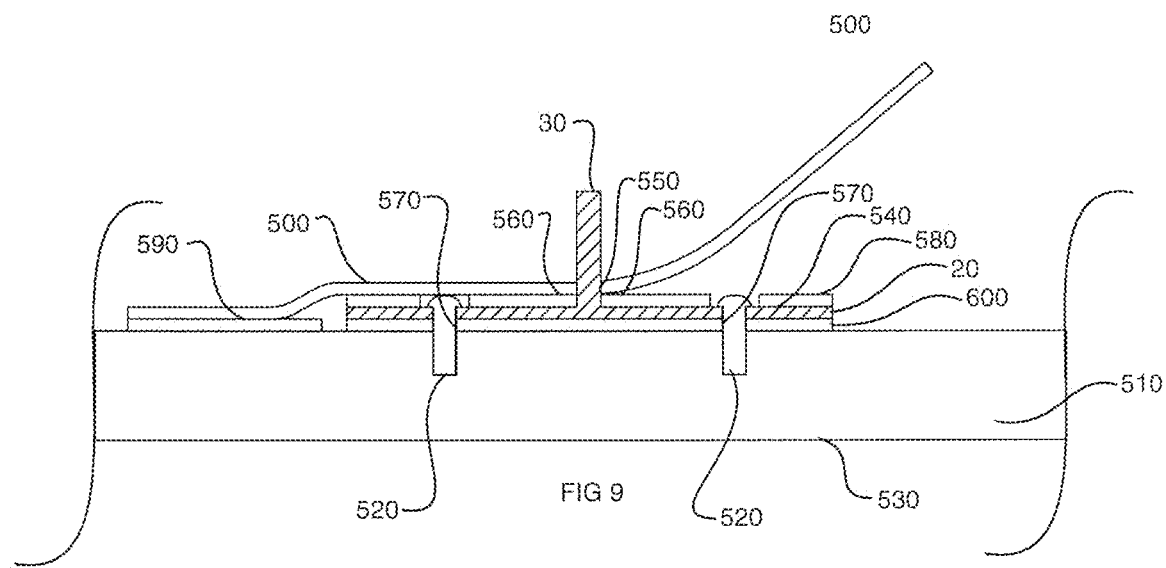
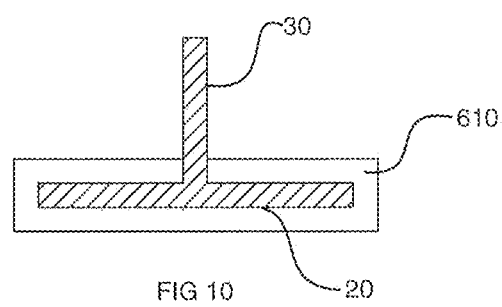

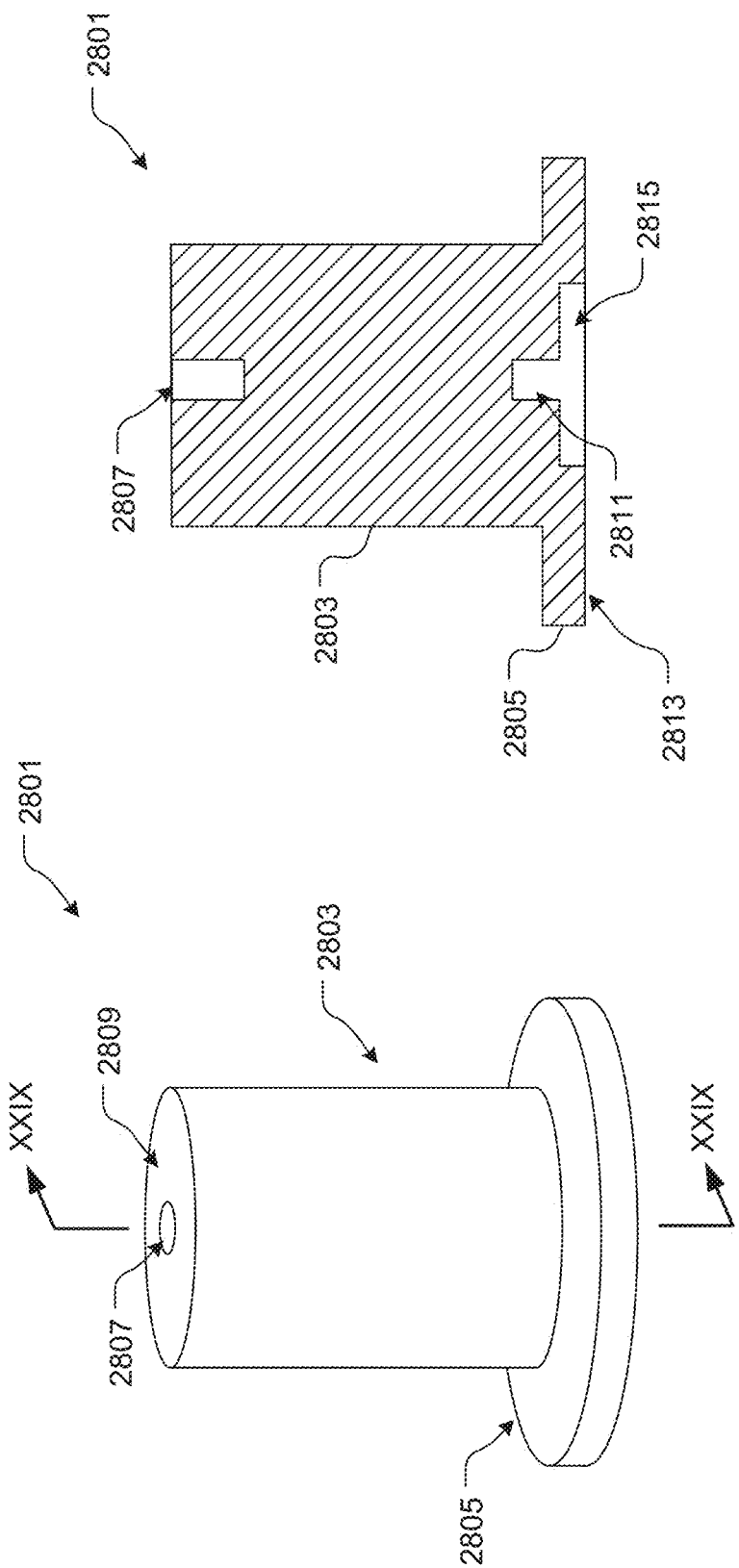

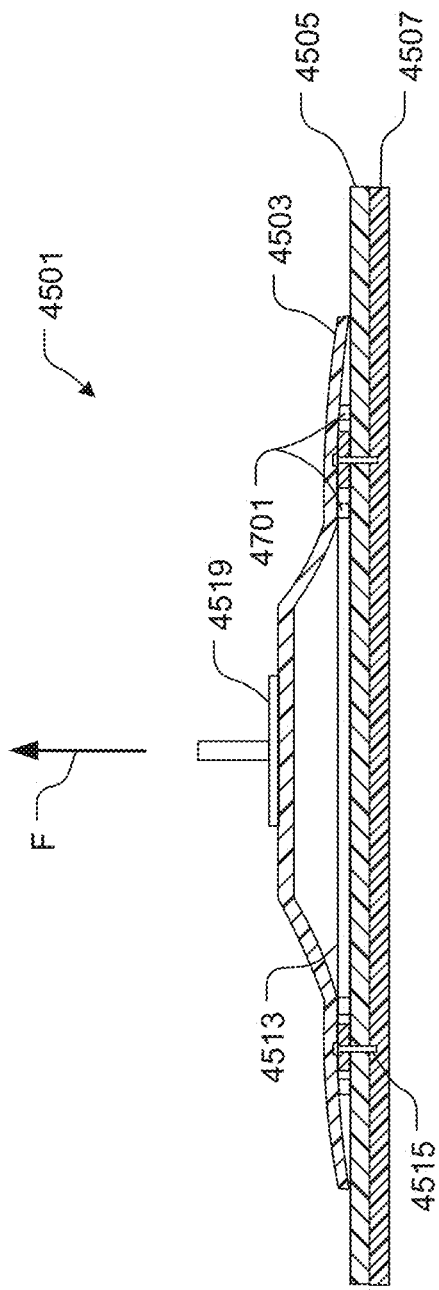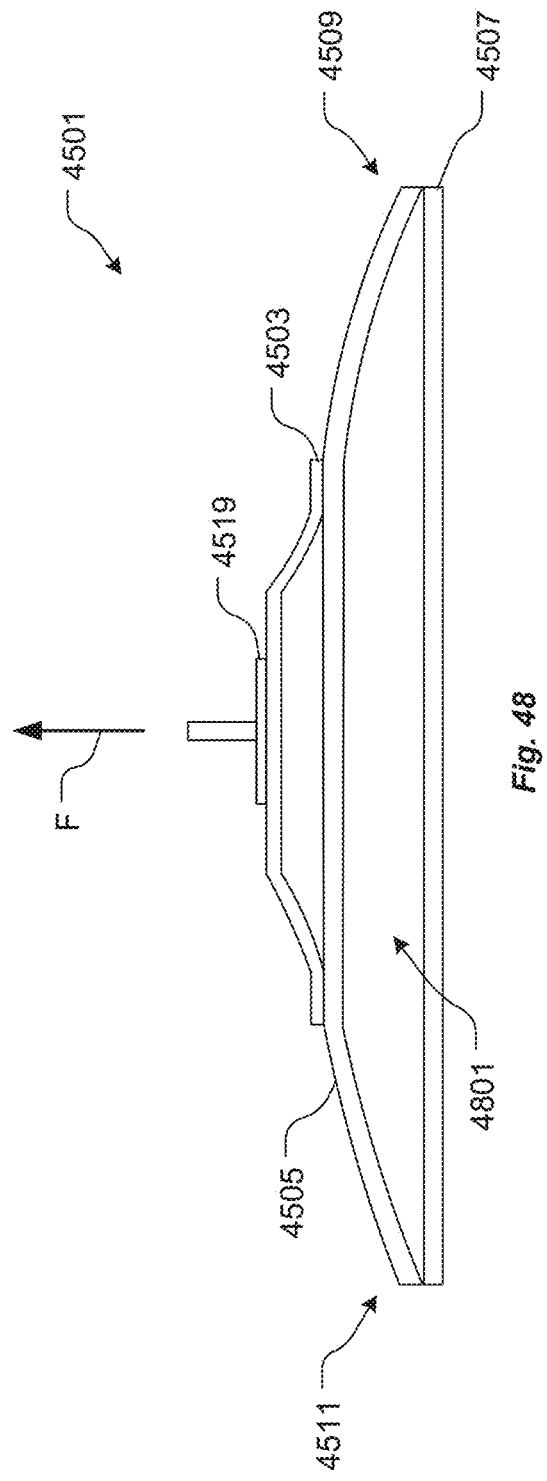

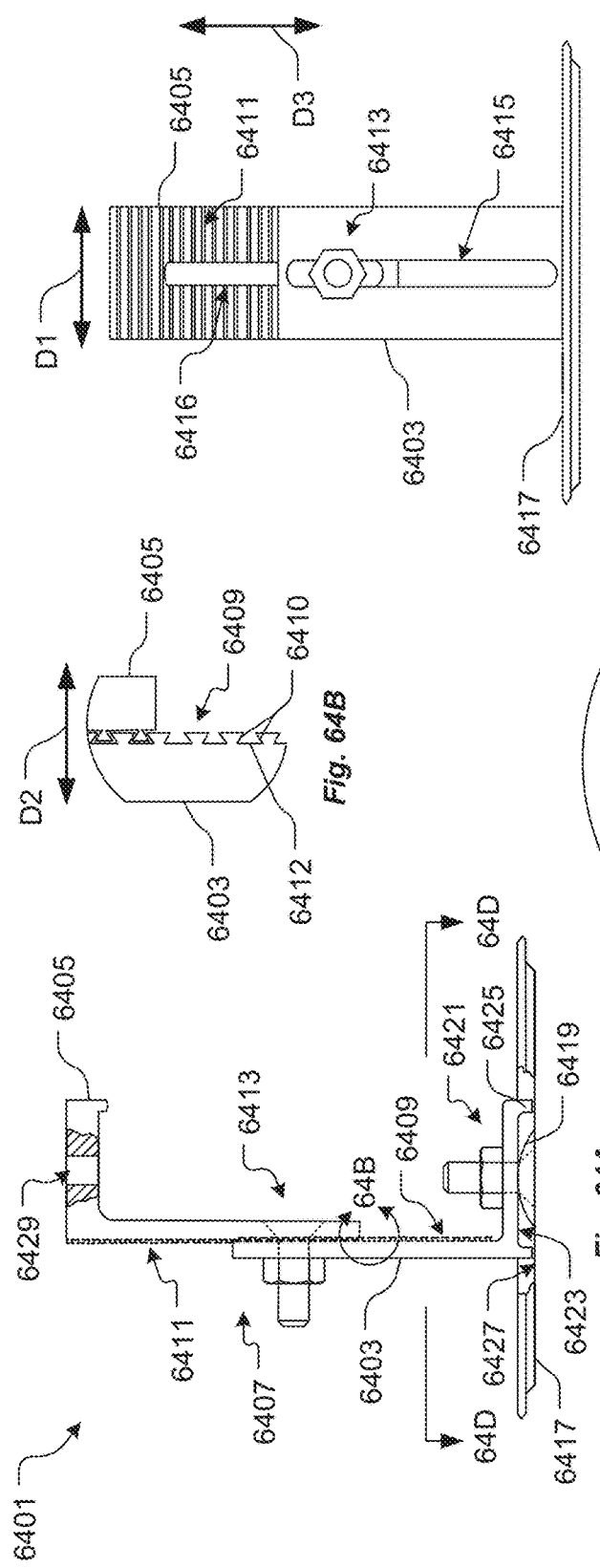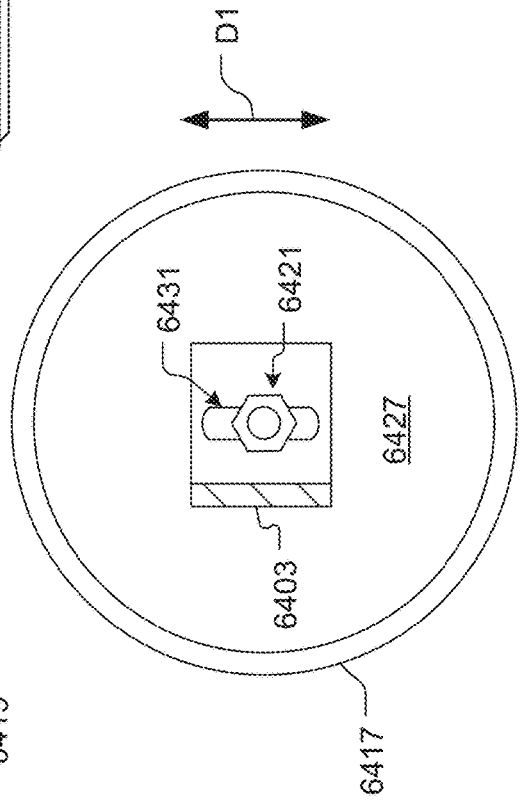

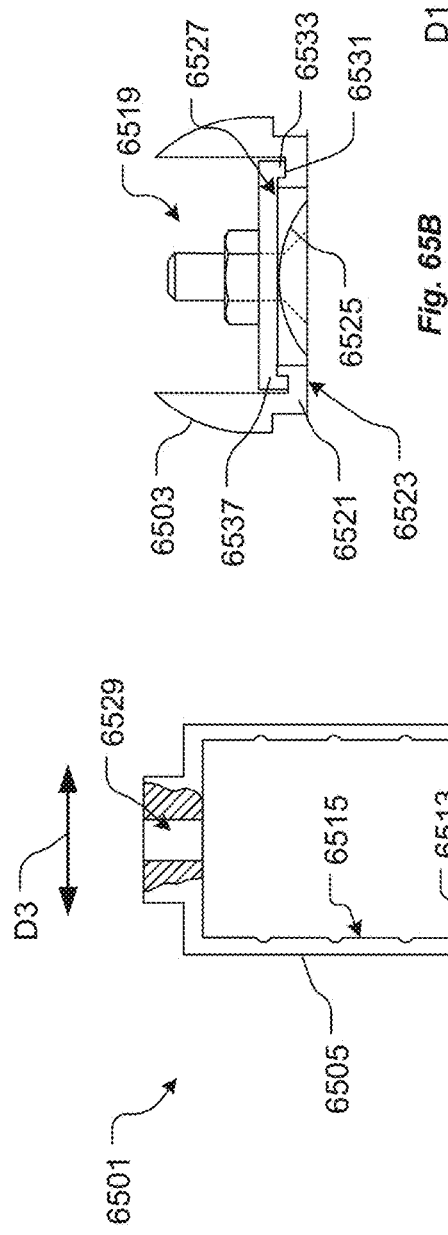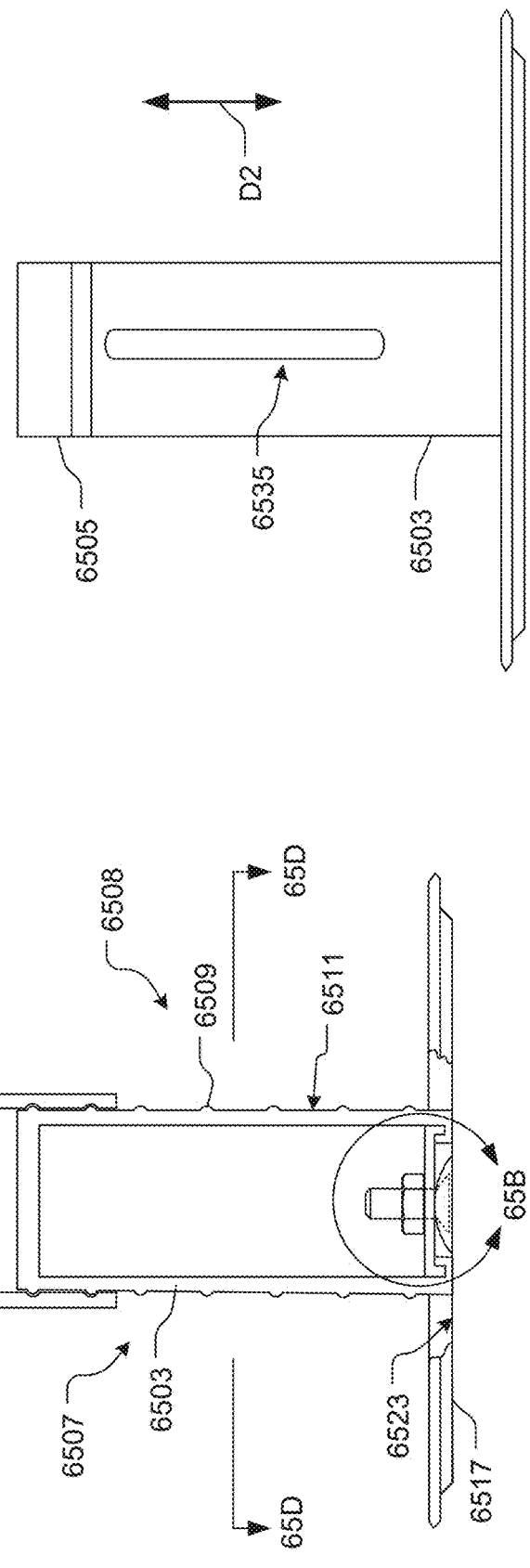

ent of the present invention;
SYSTEM FOR MOUNTING OBJECTS TO POLYMERIC MEMBRANES

BACKGROUND

1. Field of the Present Description

The present description relates to methods and system for mounting objects to polymeric membranes.

2. Description of Related Art

Various applications exist in which a polymeric membrane may be placed over a surface. For example, it may be desirable to provide a polymeric membrane as a roofing material. That is, a polymeric membrane may be applied to an outer surface of a building structure, such as a roof, to protect the structure from the environment.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1D shows a cross-sectional view of an example mounting plate;

FIG. 2A is a cross-sectional view of an example mounting system including a mounting plate secured to polymeric membrane with an adhesive;

FIG. 2B shows an exploded view in cross section of an example mounting system with a tape including adhesive on opposing sides thereof;

FIG. 2C shows a cross-sectional view of a further example mounting system;

FIGS. 6A-F, 7A-E, and 8A-D show various views of example mounting plates;

FIG. 9 shows a cross-sectional view of a further example mounting system;

FIG. 10 shows a cross-sectional view of an example mounting plate illustrated in FIG. 9;

FIG. 28 is an oblique view of a riser according to an alternative embodiment of the present invention;

FIG. 29 is a cross-sectional front view of the riser of FIG. 28 taken at XXIX-XXIX;

FIG. 47 shows a cross-sectional front view of the mounting system of FIG. 45 during operation;

FIG. 48 shows a front view of the mounting system of FIG. 45 during operation and without a bracket;

FIGS. 64A-64D depict various views of the adjustable riser of FIG. 6;

FIGS. 65A-65D depict various view of an adjustable riser of an alternative embodiment;

Figure 1A:
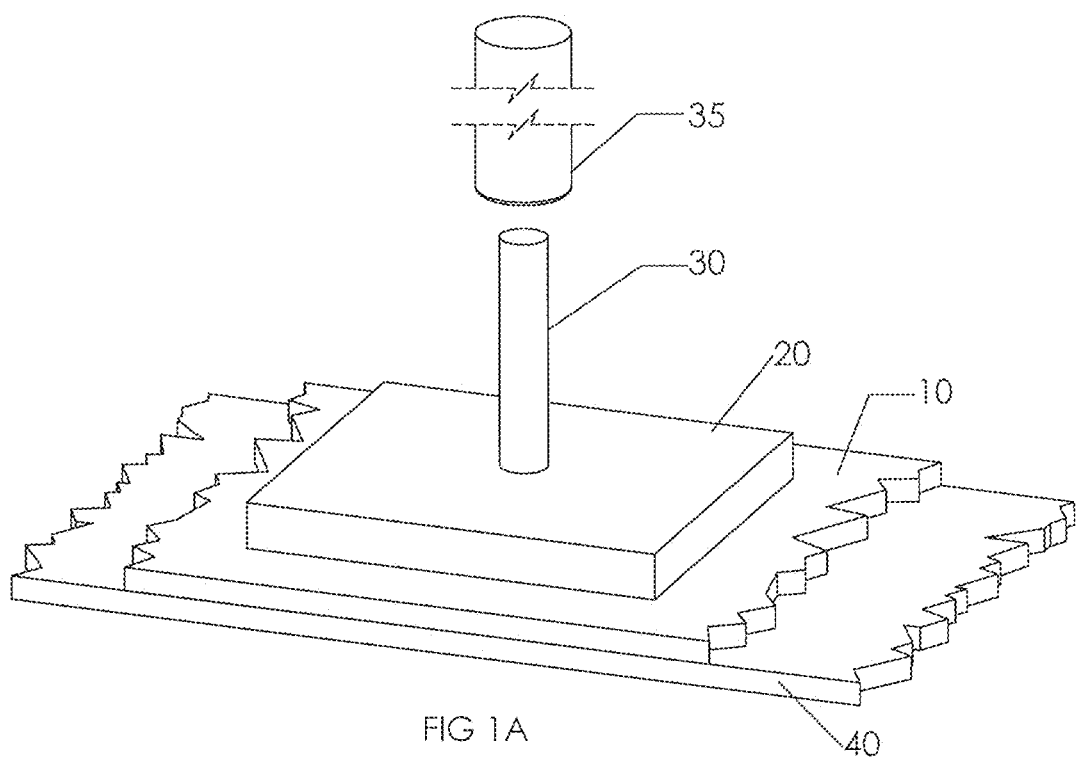
FIGS. 1A-1C show an example systems for attaching a mounting plate to a polymeric membrane.

While the mounting system of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The present disclosure describes methods and systems for mounting or otherwise attaching an object to polymeric membranes. For example, in some instances, the present disclosure describes methods and systems for attaching objects to polymeric membranes utilized for covering all or a portion of a building structure roof. In some instances, the polymeric membranes may include thermoplastic polymeric membranes ("thermoplastic membranes"), while, in other instances, the polymeric membranes may include thermoset polymeric membranes ("thermoset membranes"). Example objects that may be attached include photovoltaic cells, an air handling component (e.g., air conditioning or heating components), telecommunications equipment (e.g., antennas, satellite dishes, etc.), or any other desired object. It should be understood that the materials described herein provide sufficient elasticity for the features described below.

Utilizing the described systems and methods for securing one or more photovoltaic cells to the roof of a structure may provide tax benefits. For example, tax benefits may exist for having photovoltaic cells attached to the structure of a roof that are otherwise unavailable for photovoltaic cells that are merely placed on a roof unattached to the roof structure. Thus, in some implementations, the system and methods described herein provide for attaching an object to the roof structure, and, in the case of photovoltaic cells, may enable a user to enjoy the available tax benefits associated therewith.

In other implementations, the described methods and systems may be utilized for attaching objects to a polymeric membrane forming part of a structure. Further, while some implementations may be described with respect to thermoplastic membranes, thermoset membranes may also be applicable and vice versa. In general, the described methods and systems may be applicable to applications including roofing, waterproofing, earth lining, pond lining, tent construction, tension fabric applications, air forming technologies, flexible plastic forming (such as with flexible plastic films), rigid plastic forms, as well as any other suitable application.

Referring now to the drawings wherein like reference characters identify corresponding or similar elements throughout the several views, FIG. 1A shows a perspective view of an exemplary embodiment of a system for mounting an object to a polymeric membrane. FIG. 1A shows a polymeric membrane (interchangeably referred to as "membrane") 10 and a mounting plate 20. In some instances, the polymeric membrane 10 is a thermoplastic membrane. Example thermoplastic membranes may include one or more of polyvinyl chloride (PVC), thermoplastic olefins (TPO), keytone ethylene esters (KEE), nitrile butadiene polymers (NBP), as well as other suitable thermoplastics. In other instances, thermoset membranes may also be used. For example, examples thermoset membranes may include membranes formed from ethylene propylene diene monomer (EPDM) as well as any other suitable thermoset membranes, including thermoplastic membranes that may morph into thermoset membranes over time, such as chlorosulfonated polyethylene (CSPE).

In the contemplated embodiment, polymeric membrane 10 is preferably secured to a support structure 40, such as a roof structure. However, it will be appreciated that the system discussed herein could easily be adapted for use with other support structures. Further, in some instances, the mounting plate 20 may be formed entirely or in part from a metal, such as steel, galvanized steel, aluminum, titanium, or other desired or suitable metal. Additionally, the mounting plate 20 may or may not be weatherized. In other instances, the mounting plate 20 may be formed from other materials, such as glass, plastic, ceramics, composite materials, or any other material. It should be appreciated that some applications may not require polymeric membrane 10; as such, mounting plate 20 may be bonded or attached directly to structure 40 without the use of polymeric membrane 10.

As shown, the mounting plate 20 has a protrusion 30 extending therefrom that may be used for securing a structure. The protrusion 30 may allow attachment and detachment of the structure, such as structure 35, without damage or alteration to the polymeric membrane 10. For example, in some instances, the protrusion 30 may provide for a threaded connection with structure 35, although any other suitable connection mechanism may be used. In other implementations, the mounting plate 20 may be integral to a structure. In still other implementations, the mounting plate 20 may omit the protrusion 30. Alternately, the mounting plate 20 may include a mechanism for attaching or detaching a corresponding structure thereto. For example, the mounting plate 20 may include an interlocking mechanism for accepting one or more structures. Example structures may include one or more photovoltaic cells, air handling equipment (e.g., air conditioning equipment or heating equipment), one or more antennas, mounting structures therefor, a barrier, or any other desired structure.

Figure 1B:
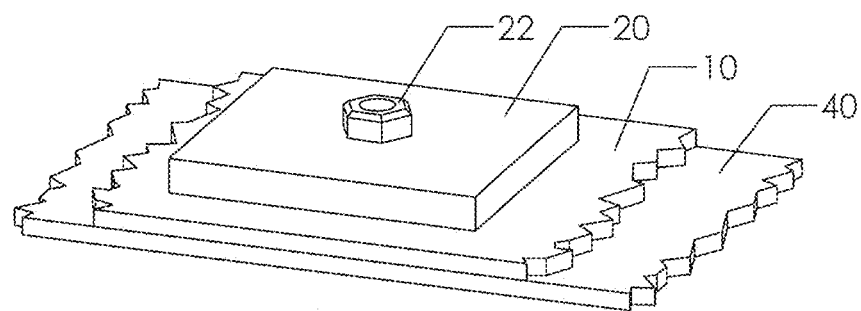
Figure 1C:
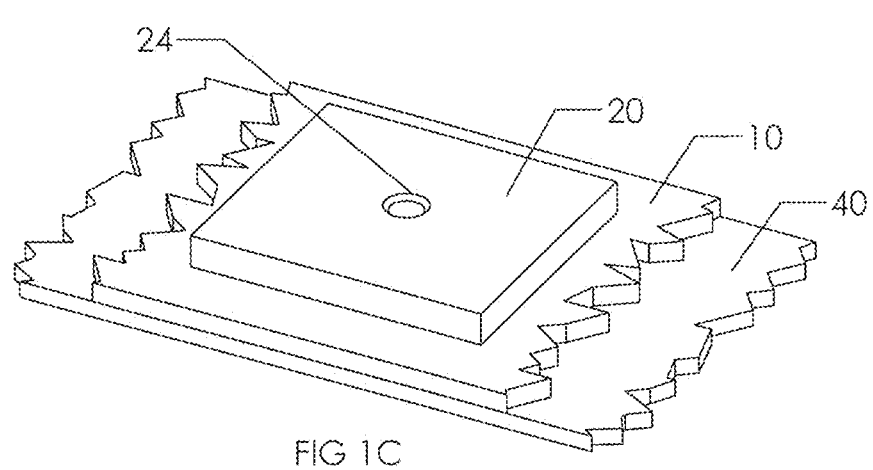

In still other implementations, an example mounting plate 20 may include a threaded portion for mating engaging with a corresponding threaded portion provided on a structure to be attached or otherwise coupled to the mounting plate 20. For example, FIG. 1B shows a mounting plate 20 that includes a welded nut 22 for accepting a protrusion having mating threads. Alternately, as shown in FIG. 1C, the mounting plate 20 may have a threaded portion 24 formed therein for accepting the protrusion.

FIG. 1D shows a cross-sectional view of another example mounting plate 20 in which the protrusion 30 is a separate piece insertable into an opening 32 formed in the mounting plate 20. Further, a head 34 of the protrusion 30 may be retained in a pocket 36 formed in the mounting plate 20. In other instances, the head 34 may not be retained in a pocket formed in the mounting plate 20. In some implementations, the protrusion 30 may be a carriage bolt insertable into the opening 32, and the interface between the opening 32 and the protrusion 30 prevents the protrusion 30 from rotating relative to the mounting plate 20. Further, a mounting plate 20 having an opening 32 of a single size may be operable to accept protrusions 30 having varying shaft lengths, widths, and/or diameters.

The mounting plate 20 may be attached to the polymeric membrane 10 in numerous ways. FIGS. 2A-2C show several cross sectional views of the mounting plate 20 attached to the polymeric membrane 10. For example, FIG. 2A shows the mounting plate 20 attached to the membrane 10 with a binding agent, such as an adhesive 50, disposed therebetween. Alternately, the binding agent for securing the mounting plate 20 may be a carrier tape 60 having adhesive 70, 80 provided on opposing sides thereof, as shown in FIG. 2B. In some implementations, the carrier tape 60 may have a removable protective film or backing 65. In some instances the adhesive 70 and adhesive 80 may be the same adhesive, while, in other instances, the adhesives 70, 80 may be different. For example, adhesives 70, 80 may be selected based on the material being adhered. For example, for a mounting plate 20 formed from steel, the adhesive 70 may be selected to adhere steel, while, for a membrane 10 formed from PVC, the adhesive 80 may be selected to adhere to PVC. In some instances the carrier tape 60 may be a foam-based tape. Carrier tape 60 may be used to secure the mounting plate 20 to the membrane 10. One or more tape strips or sheets may be used to secure the mounting plate 20. Further, the carrier tape 60 may be custom shaped and/or formed to fit to geometry of the mounting plate 20. For example, the carrier tape 60 may be custom fit to correspond to one or more geometric features of the mounting plate 20, such as protrusions or other topographical shapes.

Multiple options for adhesives 50, 70, and 80 are available and selecting an appropriate adhesive is often dependent upon the desired engineered failure during testing. In some instances, it may be desirable for the adhesion provided by the selected adhesive to give way at a chosen weight threshold preventing damage to other components within the assembly. In other instances, it may be desirable for the adhesive bond to be so strong that components would not separate without damage to one surface or another. In addition, the selected adhesive may be applied to a carrier tape, the carrier tape and selected adhesive also being capable of being engineered with a chosen weight threshold and thickness. Adhesives 50, 60, and 70 include cross linking as well as non-cross linked butyl adhesives. A non-exclusive list of adhesives 50, 70, and 80, as well as carrier tapes 60, that may be used are: 3M VHB 4941 F, 3M VHB 4941, 3M VHB 4932, 3M VHB 4952, 3M VHB 5925, 3M VHB 5952, 3M VHB 5962, 3M weather strip tapes, 3M Polyurethane 560, 3M Hybrid Sealant 760, 3M DP 190, 3M DP 125, and 3M 1099 Scotch Weld Adhesive, all of which are produced by 3M of 3M Center, St. Paul, Minn. 55144. Additionally, Ashland Aroset 1930 produced by Ashland Inc of Covington, Ky. 41012 is another example of a suitable adhesive. Further, SikaLastomer-68 produced by Sika Corporation of Madison Heights, Mich. 48071, is example of a suitable carrier tape. The following companies make similar or competing adhesive to those named above: Carlisle Syntec of Carlisle, Pa., Carlisle Hardcast Incorporated of Wylie, Tex., and Firestone Building Products of Indianapolis, Ind. It should be appreciated that the adhesives and carrier tapes identified above may be identified as adhesives alone, or as carrier tape alone, or any combination of carrier tape and adhesive.

FIG. 2C shows another example implementation in which the binding agent may be a coating of thermoplastic material 90 applied to one or more surfaces of the mounting plate 20 placed into contact with the polymeric membrane 10. For example, the polymeric membrane 10 may be a thermoplastic membrane. The mounting plate 20 may be located at a desired location on the polymeric membrane 10, and the coating 90 may be heated to form a bond between the mounting plate 20 and the polymeric membrane 10. In some instances, the coating 90 may be heated by heating the mounting plate 20, such as with a thermoinduction welder or hot iron. In other instances, energy may be applied more directly to the coating 90, such as with sonic welding. For example, the mounting plate 20 may be affixed using the coating 90 such as by dielectrical or sonic or vibration welding, solvent bonding, heat bonding (such as using induction heating, infrared heating, hot air heating, or hot iron heating), any combination of the above, or in any other suitable manner.

It should be appreciated that thermoplastic coating 90, as well as the thermoplastic coatings described in the other embodiments herein, may be represented in a variety of forms. Such forms include, but are not limited to: solids, liquids, or any mixtures of material phases suitable for the implementations disclosed herein.

Figure 3:
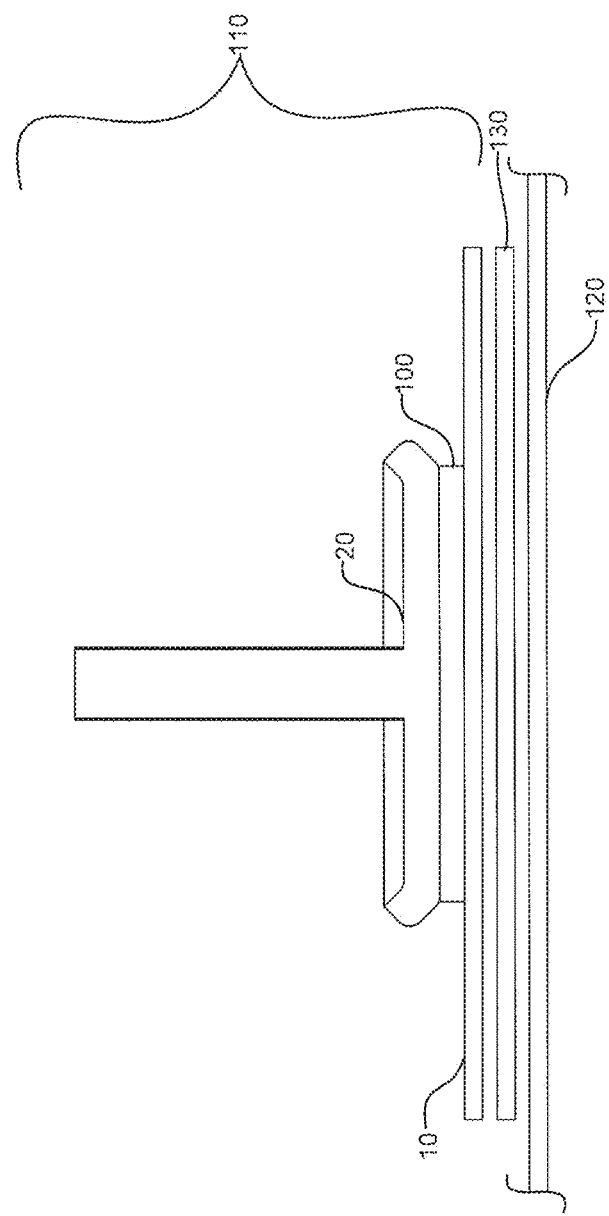
FIG. 3 shows an example mounting assembly that may be coupled to a polymeric membrane.

A further example mounting system is shown in FIG. 3. FIG. 3 shows a mounting plate 20 secured to a polymeric membrane 10 (e.g., a thermoplastic membrane) with a binding agent 100. According to various implementations, the binding agent 100 may be, for example, a coating of thermoplastic material applied to a contact surface of the mounting plate 20. With the thermoplastic coating, the mounting plate 20 may be located at a desired location on the polymeric membrane 10 and heated to bind the mounting plate 20 to the polymeric membrane 10. Alternatively, any adhesive or carrier tape, such as the adhesives and carrier tapes described above, may be used to secure the mounting plate 20 to the membrane 10. The combination of the mounting plate 20 and the polymeric membrane 10 may be considered a mounting assembly 110.

Referring still to FIG. 3, the mounting assembly 110 may be attached to a polymeric membrane 120. In the present example, the polymeric membrane 120 may be a thermoplastic membrane. However, in other instances, the polymeric membrane 120 may be a thermoset membrane. The mounting assembly 110 may be attached to the polymeric membrane 120 in numerous ways. For example, the polymeric membrane 10 of the mounting assembly 110 may be coupled to the polymeric membrane 120 using one or more of the methods described above in regards to the bonding of mounting plate 20 to polymeric membrane 10. In other instances, a bonding agent 130, such as a carrier tape and/or adhesive (such as the carrier tape and adhesive, described respectively above) may be used. It should be appreciated that bonding agent 130 may be another bonding medium, including various bonding materials or various bonding members. Similar to above, the carrier tape may be applied in pieces, such as one or more strips or sheets. Further, as also described above, the carrier tape may be formed to correspond to geometry of the mounting assembly 110.

Figure 4:
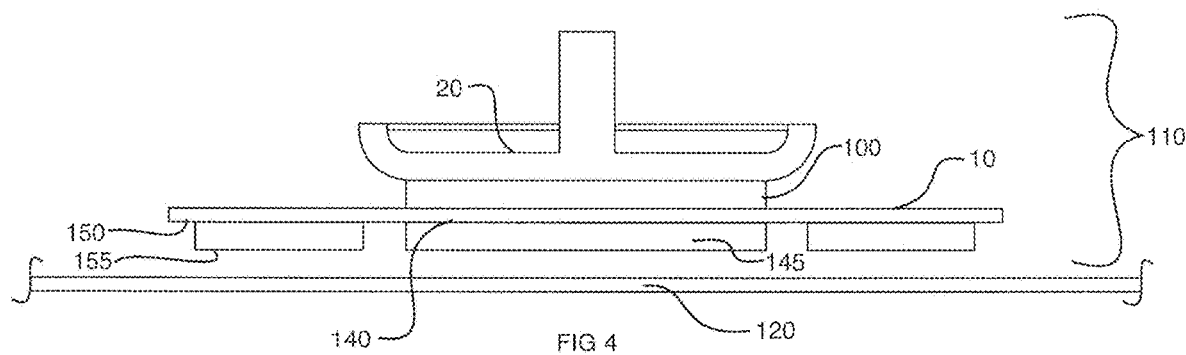
FIG. 4 shows another example mounting assembly that may be coupled to a polymeric membrane.
Figure 5:
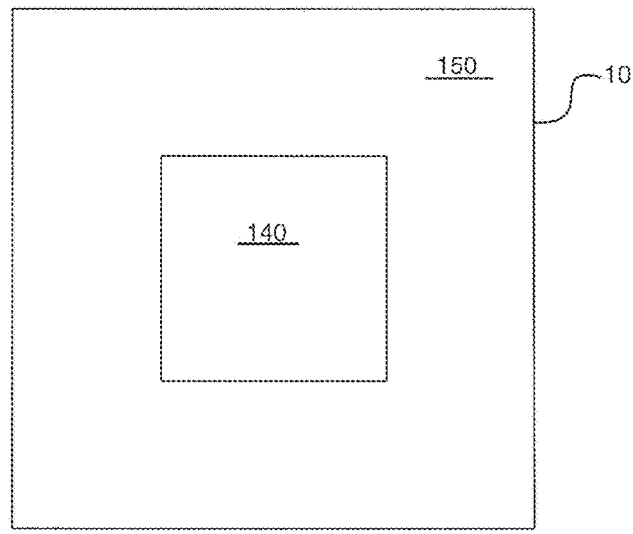
FIG. 5 is a bottom view of the mounting assembly shown in FIG. 4.

FIGS. 4 and 5 illustrate an alternate implementation for securing the mounting assembly 110 to the polymeric membrane 120. As shown, a central portion 140 of the mounting assembly 110 may be secured to the polymeric membrane 120 with an adhesive material 145, such as one or more pieces of carrier tape or adhesive, such as the carrier tape and adhesive described above. Another attachment method or material may be used around a perimeter portion 150. For example, a coating of thermoplastic material 155 at one or more locations along the perimeter portion 150 may be used to secure the perimeter portion 150 to the polymeric membrane 120. The coating of thermoplastic material 155 may be bonded using one or more of the methods described above. Alternately, one or more of an adhesive or carrier tape may be used on the perimeter portion 150. For example, the bonding material used on the perimeter portion 150 may act to further secure the mounting assembly 110 or as a waterproofing material.

It is noted that, in some instances, a coating of thermoplastic material may be used to bond one thermoplastic membrane to another same or similar thermoplastic membrane. In other instances, the thermoplastic material may be omitted. For example, some thermoplastic membranes may be joined using one or more of the welding techniques above without the aid of a bonding material. On the other hand, a coating of thermoplastic membrane may not be capable of bonding a thermoplastic membrane or thermoset membrane to another thermoset membrane. In such instances, an adhesive, such as an adhesive or carrier tape may be used to bond such dissimilar materials to each other.

In some instances, the polymeric membrane 120 may be the same or a similar thermoplastic as a thermoplastic forming the thermoplastic membrane 10, such as one or more of the thermoplastics described above. However, the thermoplastics forming the respective thermoplastic membrane 10 and the thermoplastic membrane 120 may be different while still bondable with or without the use of a thermoplastic material. In some instances, the thermoplastic membrane 120 may form an outer surface of a roof structure. However, the description is not so limited, and the present description may be applicable to a thermoplastic membrane in any desired application.

The mounting plate 20 may be of any desired shape. For example, the mounting plate may be circular, rectangular, square, elongated, or be of any other size or shape. Example mounting plates are illustrated in FIGS. 6-8. FIGS. 6A-6E show various views of a circular mounting plate 20 having a plurality of concentric ridges 21 formed therein as well as a central cavity 22 that may be used to capture a head of a protrusion, as discussed in a similar manner above. As also described above, the central cavity 22 may accept a protrusion of different sizes. The protrusion may extend through opening 23.

Referring to FIGS. 7A-E, the example mounting plate 20 also includes cavities 22 to accept the heads of protrusions. The protrusions may extend through openings 23 formed in a wall of the cavities 22. FIGS. 8A-D are various views of another example mounting plate 20. The mounting plate 20 may include various ridges 24 formed therein along with a cavity 22 and opening 23. Again, the cavity 22 may be used to capture an end portion of a protrusion extending through the opening 23. The mounting plate 20 may also include openings 25 formed around a periphery thereof.

Further, for the example mounting plate 20 shown in FIG. 6A-8D along with others within the scope of the disclosure, the cavities 22, openings 23, and/or the combination thereof may be operable to prevent rotation of the protrusion relative to the mounting plate 20 while also accepting protrusions of different sizes. Additionally, the respective sizes of the ridges 24, openings 23, cavities 22, as well as other aspects of the mounting plates 20 may be altered to any desired size.

Another example mounting system is shown in FIG. 9 in which a mounting plate 20 is disposed between a first polymeric membrane 500 and a second polymeric membrane 510. Fasteners 520 extend through the mounting plate 20, the second polymeric membrane 510, and into a substructure 530. The first polymeric membrane 510 overlays a first surface 540 of the mounting plate 20 and includes an opening 550 through which the protrusion 30 extends. A bonding material 560 may be used to adhere the first polymeric membrane 500 to the mounting plate 20.

In some instances, the bonding material 560 may be a coating of a thermoplastic material applied to a portion of the first surface 540 between the protrusion 30 and openings 570 formed in the mounting plate 20 through with the fasteners 520 extend. Still further, in some instances, the bonding material 560 may be applied and the first polymeric membrane 500 coupled therewith to the mounting plate 20 during one or more manufacturing processes. That is, bonding the first polymeric membrane 500 to the mounting plate 20 with the bonding material 560 may be performed remote from a job site, such as at a manufacturing facility. In other instances, the first polymeric membrane 500 may be bonded to the mounting plate 20 with the bonding material 560 at a jobsite. The bonding material 560 may be a coating of thermoplastic material and used to bond the two components in one or more of the methods described above. In addition to adhering the first polymeric membrane 500 to the mounting plate 20, the bonding material 560 may also form a seal preventing or substantially preventing fluids from penetrating through the opening 550 formed through the openings 570 and into the substructure 530.

A bonding material 580 may also be applied to the first surface 540 of the mounting plate 20. In some instances, the bonding material 580 may also be used to secure the first polymeric membrane 500 to the mounting plate 20, such as after the fasteners 520 have been used to secure the mounting plate 20 to the substructure 530. Utilizing the bonding material 580 after fasteners 520 have been applied avoids the need to puncture the first polymeric membrane 500 for the fastener 570. Thus, in some instances, the bonding material 560 may be used to secure only a portion of the first polymeric membrane 500 to the mounting plate 20 while still allowing passage of the fasteners 520 through the openings 570 without the need to puncture the first polymeric membrane 500. The bonding material 580 may be utilized thereafter to secure the first polymeric membrane 500 to the mounting plate 20 thereby also providing a seal. The first polymeric membrane 500 may also be secured to the second polymeric membrane 510 with a bonding material 590. Also, a coating or bonding material may be omitted where the polymeric membranes are capable of being joined without such materials. For example, the membranes may be thermoplastic membranes capable of being joined using one or more of the bonding techniques described above. In such instances, the bonding material 590 may be omitted.

A bonding material 600 may also be used to secure the mounting plate 20 to the second polymeric membrane 510. The bonding materials 560, 580, 590, and 600 cooperate to form a seal around the mounting plate 20 to aid in preventing or substantially reducing penetration of fluids and/or debris into the substructure 530. One or more of the bonding materials 560, 580, 590, and 600 may be a coating of a thermoplastic material and used to form a bond using one or more of the techniques described above. In some instances, the bonding materials 560, 580, and 590 may be the same material, such as a coating of thermoplastic material 610, and may be applied to the mounting plate 20, as shown in the example of FIG. 10. Alternately, one or more of the bonding materials 560, 580, 590, and 600 may be a carrier tape or adhesive as also described above. In still other implementations, one or more of the bonding materials 560, 580, 590, and/or 600 may be omitted. For example, in some implementations, the polymeric membranes 500, 510 may be secured directly to each other using one or more of the joining techniques described above without the use of a bonding material. Still further, the mounting plate 20 may also be formed from a material that is joinable to one or more of the polymeric membrane 500 and/or polymeric membrane 510 without the use of a bonding agent using one or more of the techniques described above. In such instances, one or more of the bonding materials 560, 580, and/or 600 may be omitted.

The mounting plate 20 is shown with a protrusion 30 includes, although the protrusion 30 may be omitted. Alternately, the mounting plate 20 may be fixedly attached to another object. Still further, the mounting plate 20 may have a mechanism for selectively attaching and detaching another object.

Figure 11:
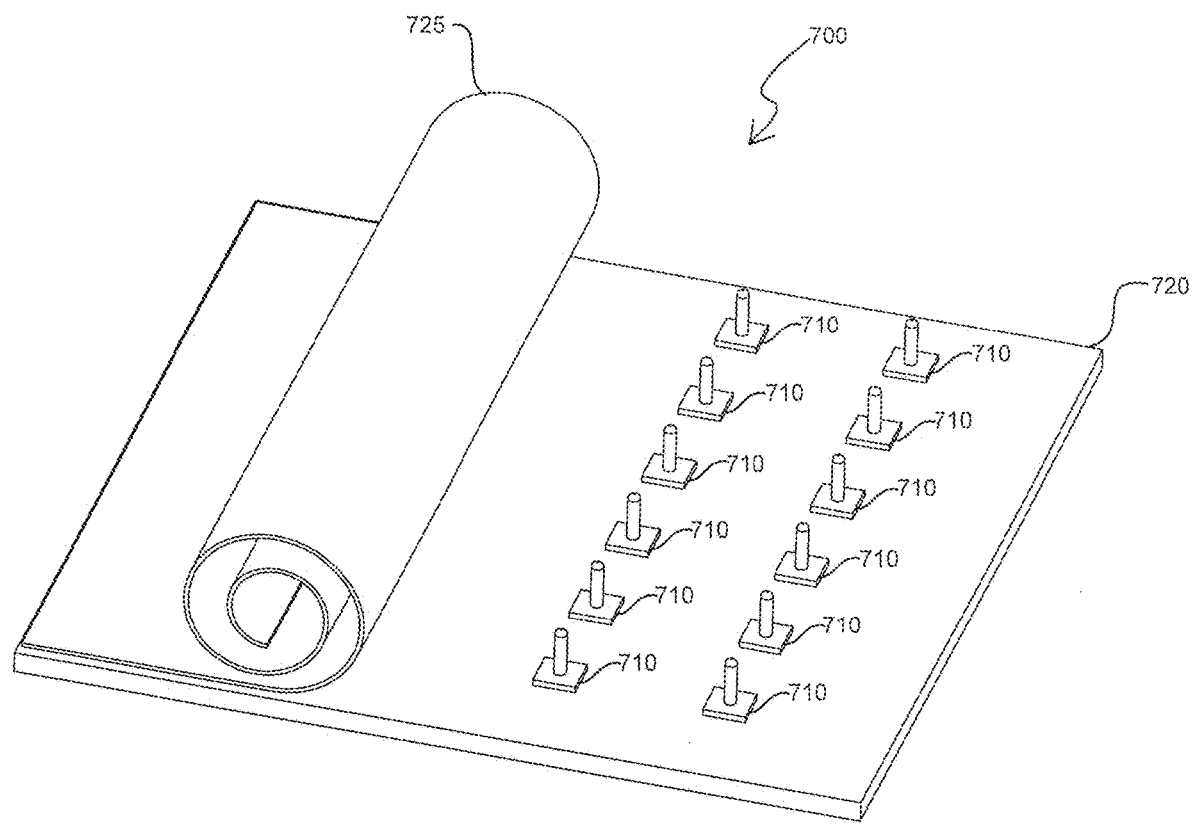
FIG. 11 shows another example mounting system.
Figure 12:
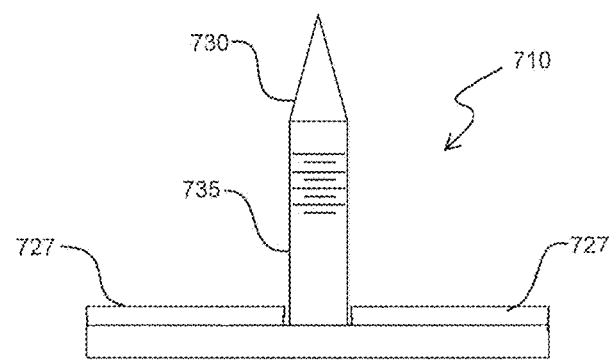
FIG. 12 is a side view of an example mounting plate shown in FIG. 11.

FIGS. 11 and 12 show another example system 700 in which one or more mounting plates 710 are secured to a structure 720. For example, the structure 720 may be a roof structure, although structure 720 is not so limited but may encompass other structures, such as one or more of the structures identified above or other suitable structure. In some instances, the mounting plates 710 may be coupled to the structure 720 with fasteners, although the mounting plates 710 may be attached in other ways. A polymeric membrane 725 is applied over the mounting plates 710, such as by unrolling a roll of the polymeric membrane 725. An example mounting plate 710 is shown in FIG. 12. The mounting plate 710 may include a protrusion 730. Further, in some implementations, the protrusion 730 may include a piercing portion 740 adapted to puncture the polymeric membrane 725. Also, a portion of the protrusion 730 may include a fastening portion 735 that may be used to attach a structure to the mounting plate. For example, in some instances, the fastening portion 735 may be a threaded portion. However other fastening mechanisms may also be used.

One or more of the mounting plates 710 may be secured to the structure 720, such as in an array or any other configuration. The mounting plates 710 may be secured with fasteners and/or with one or more of the techniques described herein (e.g., using a coating of thermoplastic material, carrier tape, adhesive, etc.). With the mounting plates 710 secured to the structure 720, the polymeric membrane 725 may be overlaid. The mounting plate 725 may be made to extend through the polymeric membrane 725 such as by puncturing the polymeric membrane 725 with the piercing portion 740. In other implementations, the polymeric membrane 725 may have preformed openings to allow the protrusions 730 to extend therethrough. The polymeric membrane 725 may be secured to the mounting plate 710 using one or more of the techniques described above. For example, the mounting plate 710 may be coupled to the polymeric membrane 725 with a bonding material 727. The bonding material 727 may be one or more of the materials discussed above and the coupling may be formed using one or more of the methods described above.

Figure 13:
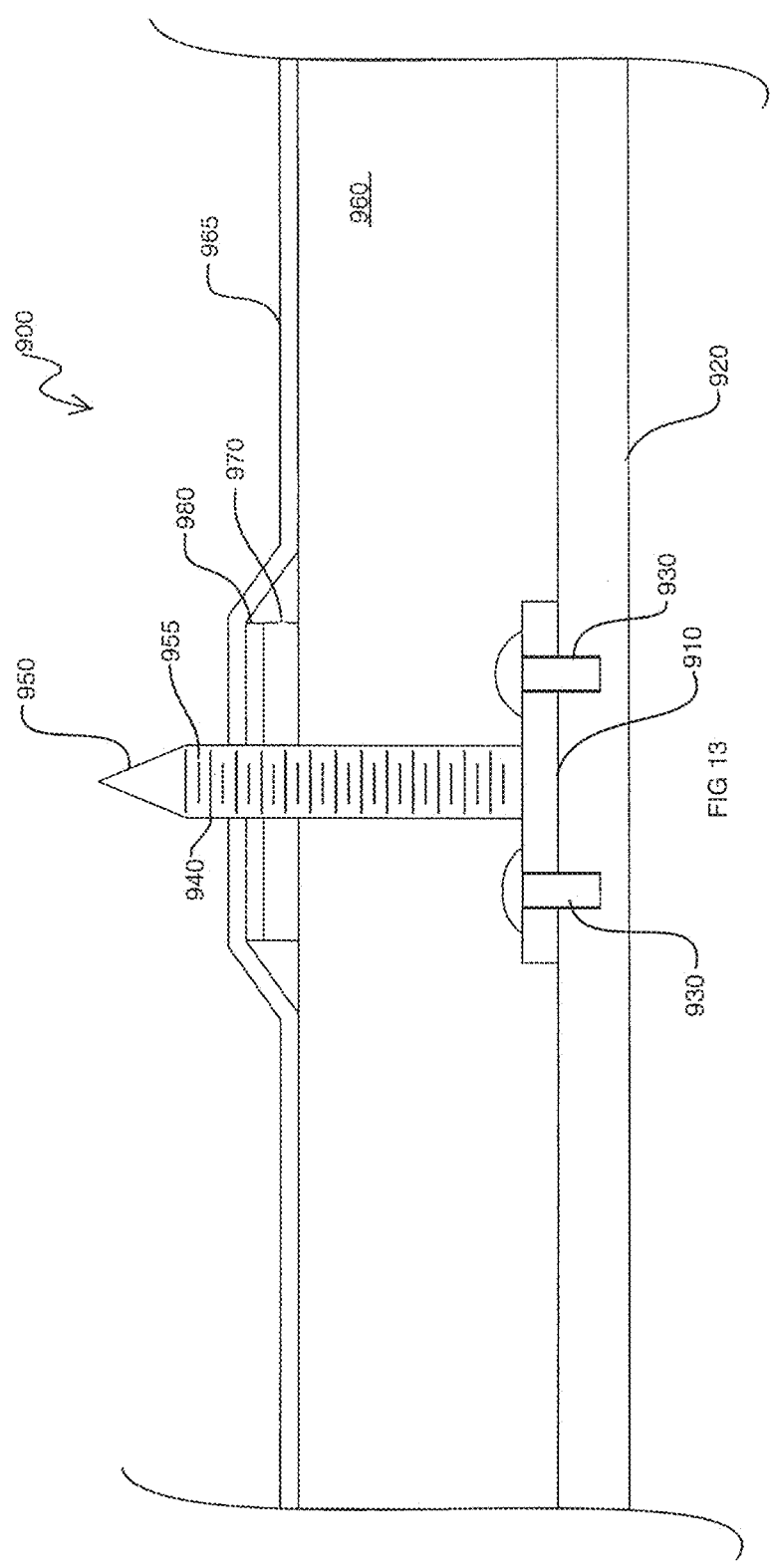
FIG. 13 is a further example mounting system that includes, among other features, an insulating member.

FIG. 13 shows another example system 900 including a mounting plate 910 coupled to a substructure 920. Among other uses, the system 900 may be applicable to roofing applications. The mounting plate 910 is shown as being attached with fasteners 930. However, other techniques may be used to secure the mounting plate 910 to the substructure 920. The mounting plate 910 may include a protrusion 940 and a piercing portion 950. Further, in some implementations, the protrusion 940 may include a fastening portion 955. Additionally, while the protrusion 940 is shown as an integral portion of the mounting plate 910, the protrusion 940 may be attached to the mounting plate 910 using a fastening mechanism. For example, in some implementations, the protrusion 940 may be attached to the mounting plate 910 via a threaded connection. An insulating member 960 may be disposed above the substructure 920. An attachment member 970 may be secured to the protrusion 940, such as by engaging the fastening portion 950. In some implementations, the fastening portion 950 and attachment member 970 may have a threaded engagement, although other attachment interfaces may be used. A polymeric membrane 965 overlays the insulating member 960 and may be bonded to the attachment member 970 with a bonding material 980. In some implementations, the bonding material 980 may be a coating of thermoplastic material applied to attachment member 970. In other implementations, a carrier tape and/or an adhesive may be used to couple polymeric membrane 965 to the attachment member 970.

In addition, the described methods and systems can also reduce damage to a polymeric membrane. For example, when objects are unattached but are in contact, debris may become lodged between the object and the polymeric membrane, and, because of the relative movement between the two, the debris may act as an abrasive on the polymeric membrane. Over time, holes, rips, or other damage may occur to the polymeric membrane exposing the underlying structure to the environment, such as moisture, wind, etc. This exposure can cause damage to the structure. However, the present disclosure describes methods and systems that avoid these drawbacks.

Additionally, some of the methods and systems described herein also provide for securing one or more objects to a polymeric membrane without piercing the polymeric membrane. Consequently, objects remain attached to the polymeric membrane without providing a pathway for moisture or other objects, e.g., insects, debris, etc., to pass through the membrane. Again, this can have particular value in waterproofing covering applications where an unperforated covering is greatly desired.

Figure 14:
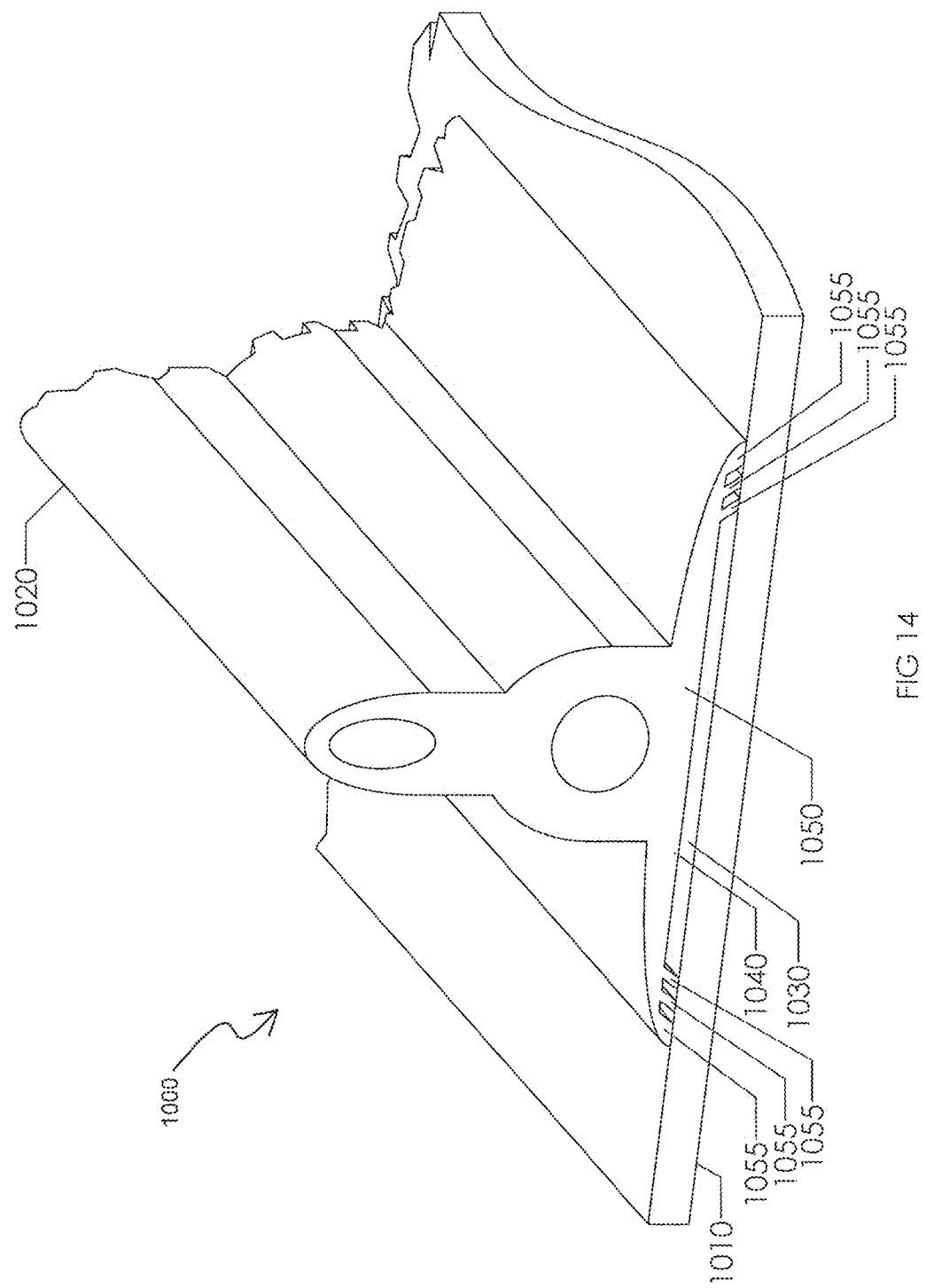
FIG. 14 is an example system for bonding a ridge member to a polymeric membrane.

Another example system 1000 is illustrated in FIG. 14. The system 1000 includes a polymeric membrane 1010, a ridge member 1020, and a bonding member 1030. In some implementations, the polymeric membrane 1010 may form a portion of a roof structure, such as an exterior membrane. The ridge member 1020 may be coupled to the polymeric membrane 1010 by the bonding member 1030. In some instances, the bonding member 1030 may be a double sided carrier tape similar to the carrier tape described above. In some implementations, the adhesive on the sides of the carrier tape may be selected to provide a bond according to the material forming the polymeric membrane 1010 and/or the ridge member 1020. In other implementations, the bonding member 1030 may be an adhesive selected to adhere polymeric membrane 1010 to the ridge member 1020. In some instances, the adhesive may be an adhesive similar to the adhesive described above.

The bonding member 1030 may occupy a channel 1040 formed in a base 1050 of the ridge member 1020. Lips 1055 may also be formed in the ridge member 1020 to aid in preventing intrusion of fluids and other materials into the channel 1040. A benefit of the bonding member 1030 is that while coupling the ridge member 1020 to the polymeric membrane 1010, the bonding member 1030 may have a bonding strength less than the yield strength of the polymeric membrane 1010 and/or the ridge member 1020. Consequently, the bonding member 1030 will yield, separating the ridge member 1020 from the polymeric membrane 1010 when a shearing load on the ridge member 1020 exceeds the strength of the bonding member 1030. Consequently, the bonding member 1030 will yield without damaging either the ridge member 1020 or the polymeric membrane 1010. For example, in an application in which the polymeric membrane 1010 and ridge member 1020 form an exterior portion of a roof structure, a shearing force on the ridge member 1020, for example, caused by a sheet of ice formed on the roof structure, would not tear the polymeric membrane 1010 as the ice sheet moves down a slope of the roof. Rather, the shearing force would merely sever the ridge member 1020 from the polymeric membrane 1010. In other implementations, the bonding member 1030 may have a yield strength equal to or greater than one or more of the ridge member 1020 and/or the polymeric membrane 1010.

Figure 15:
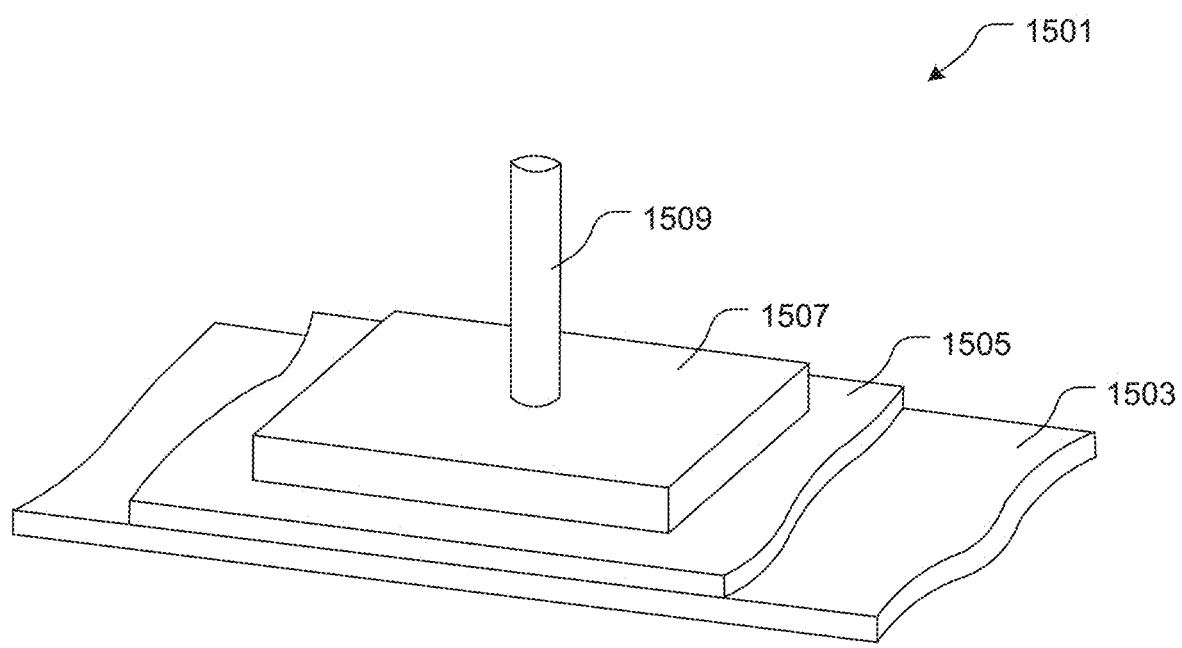
FIG. 15 is an oblique view of a mounting system according to the preferred embodiment of the present invention.
Figure 16:
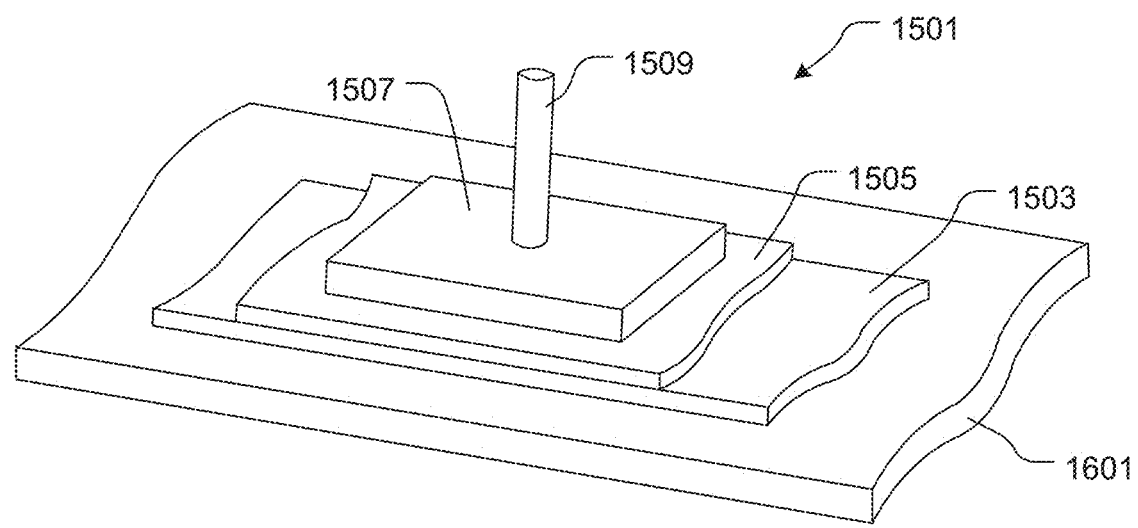
FIG. 16 is an oblique view of a mounting system of FIG. 15 shown attached to a support structure.

Referring now to FIGS. 15 and 16 in the drawings, FIG. 15 shows an oblique view of a mounting system 1501 according to the preferred embodiment of the present invention, while FIG. 16 shows an oblique view of mounting system 1501 attached to a support structure 1601. It should be appreciated that mounting system 1501 is substantially similar in form and function to the mounting systems discussed herein. Mounting system 1501 utilizes one or more membranes to securely attach an object to the support structure, which includes, but should not be limited to a polymeric membrane and/or a rooftop. Mounting system 1501 includes one or more membranes that elastically extend as a force is exerted on the object attached thereto. Further description and illustration of the elastic membrane is provided with reference to FIGS. 17-20C.

Mounting system 1501 comprises one or more of a first membrane 1503, a second membrane 1505, and an object 1507. First membrane 1503 is preferable composed of a polymeric material and is adapted to securely bond with at least a portion of second membrane 1505. It should be understood that first membrane 1503 is an optional membrane. For example, second membrane 1505 could attach directly to the support structure. However, the first membrane is preferably adapted to attach directly to the support structure while the second membrane securely bonds to a top surface of the first membrane.

In the preferred embodiment, second membrane 1505 thermally fuses to first membrane 1503; however, it should be appreciated that alternative embodiments could incorporate different methods for bonding second membrane 1505 to first membrane 1503, as disclosed herein and as conventional known in the art. Object 1507 is preferable a mounting plate substantially similar in form and function to the mounting plates disclosed herein; however, it should be understood that object 1507 should not be limited to a mounting plate, but could include other devices in lieu of a mounting plate. For example, in some embodiments, object 1507 could be an attachment device, i.e., a quick-release device, for securing a structure to mounting system 1501. Mounting system 1501 is further provided with an optional protrusion 1509 adapted to attach to object 1507. Protrusion 1509 is substantially similar in form and function to the protrusions discussed herein, wherein the protrusion is utilized for securing a riser (not shown) to mounting system 1501.

In alternative embodiments, mounting system 1501 could include a third polymeric material, a riser, a bonding medium, and/or one or more of the other features discussed herein. Furthermore, the first and second membranes of mounting system 1501 could be composed of elastic materials in addition to other suitable materials for providing elasticity to second membrane 1505.

Figure 17:
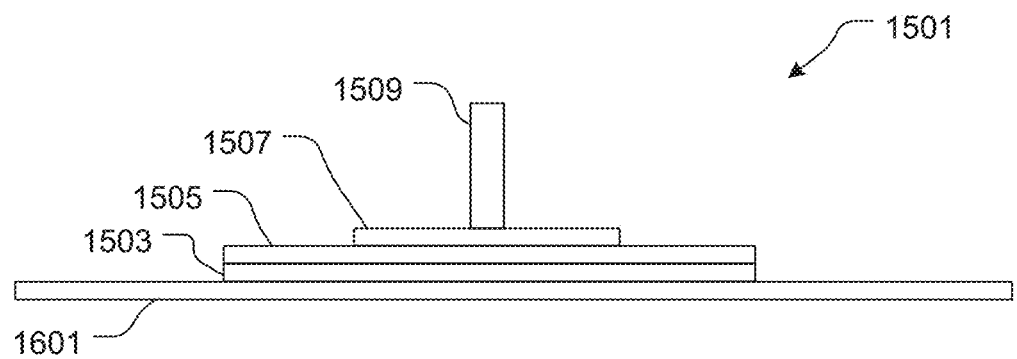
FIG. 17 is a front view of the mounting system of FIG. 15.
Figure 18:
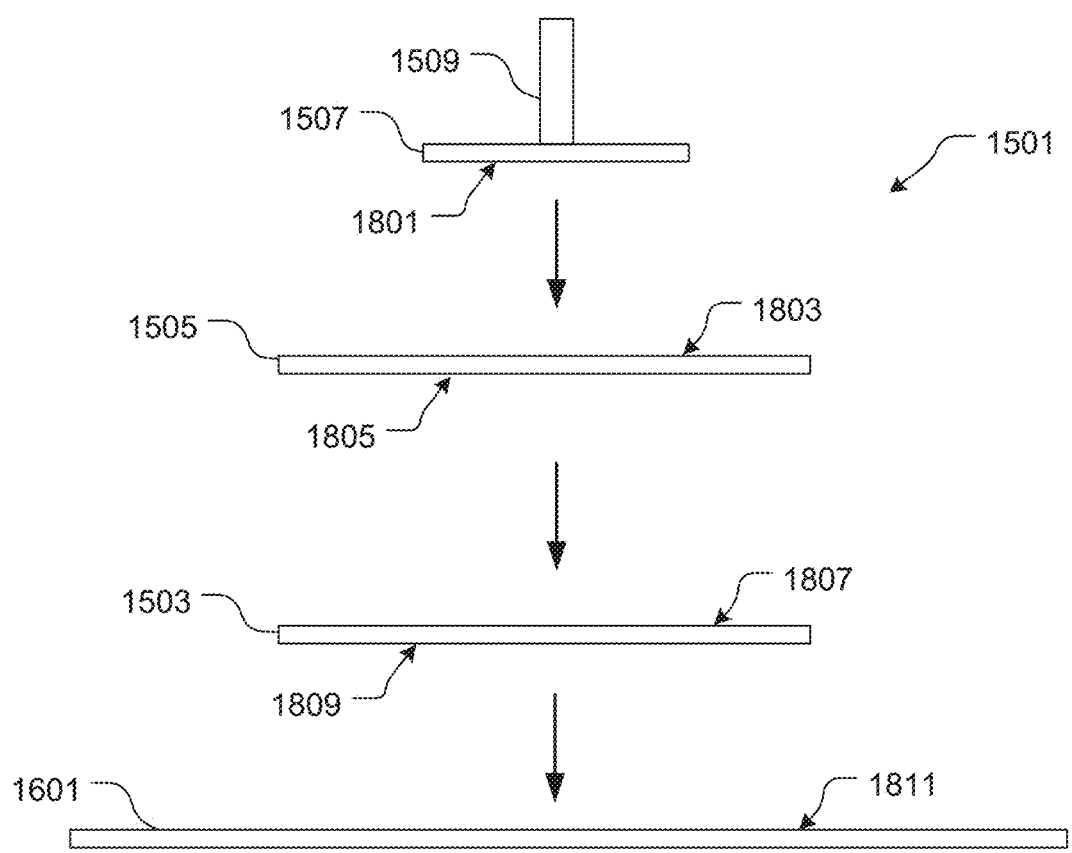
FIG. 18 is an exploded front view of the mounting system of FIG. 15.

In FIGS. 17 and 18, front views of mounting system 1501 are shown. FIG. 17 shows an assembled mounting system 1501, while FIG. 18 shows and exploded view of mounting system 1501. Object 1507 includes a bottom surface 1801 which bonds to an upper surface 1803 of second membrane 1505. Second membrane includes a lower surface 1805 which bonds to a top surface 1807 of first membrane 1503. First membrane 1503 includes a bottom surface 1809 which attaches to a top surface 1811 of support structure 1601.

Figure 19:
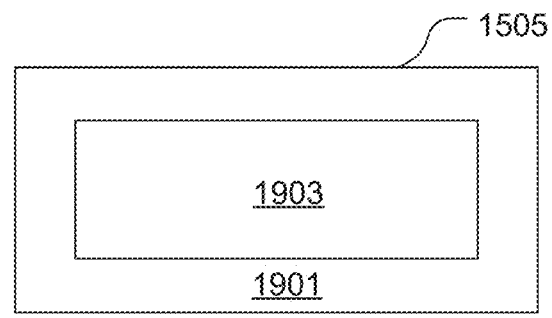
FIG. 19 is a bottom view of a membrane of the mounting system of FIG. 15.

FIG. 19 depicts a bottom view of second membrane 1505. Lower surface 1805 preferably comprises two surface areas, a first surface area 1901 being adapted to extend peripherally around a perimeter of lower surface 1805, and a second remaining surface area 1903, which is preferably enclosed within surface area 1901. In the preferred embodiment, area 1901 is bonded to top surface 1807 of first membrane 1503, while area 1903 remains separable from top surface 1807 of first membrane 1503. This feature allows second membrane 1505 to elastically extend in a direction away from first membrane 1503 as a force is exerted on object 1507.

Figure 20A:
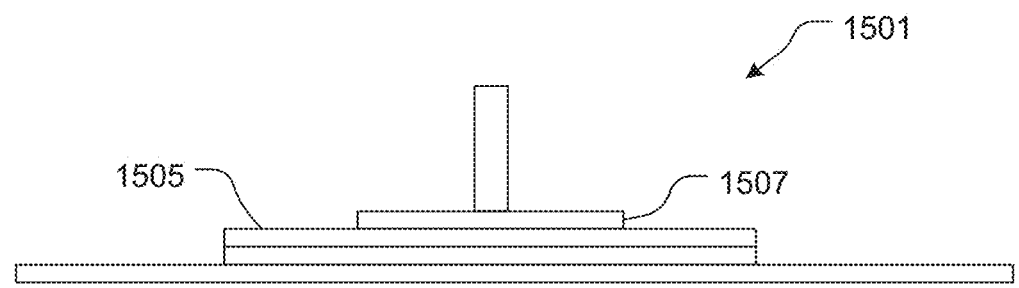
FIG. 20A-20C are front views of the mounting system of FIG. 15 shown as a force is exerted on an object attached to the mounting system.
Figure 20B:
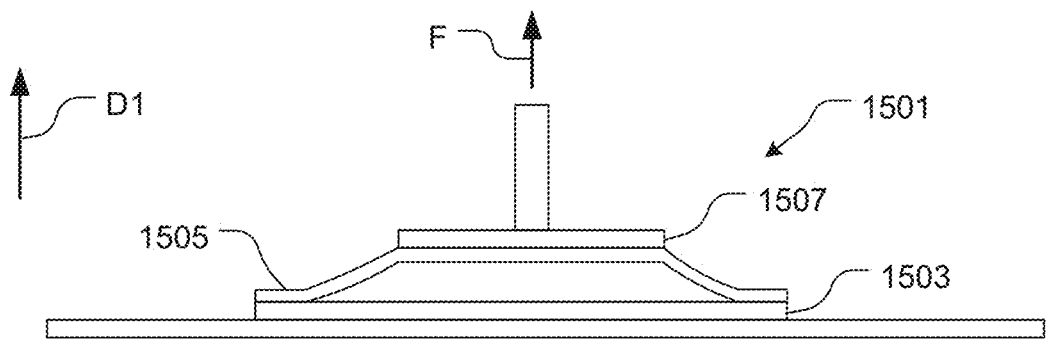
Figure 20C:
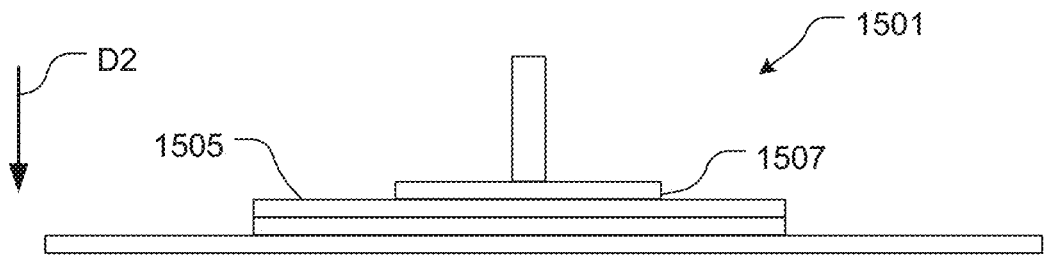

Referring next to FIGS. 20A-20C in the drawings, front views of mounting system 1501 are shown. FIGS. 20A-20C depicts second membrane 1505 elastically extending away from support structure 1601. Specifically, as a force F is exerted on object 1507, second membrane 1505 elastically extends in the direction of the force, and then returns to its original position after the force dissipates. FIG. 20A shows mounting system 1501 prior to force exerted against object 1507. FIG. 20B shows second membrane 1505 elastically extending in direction D1 as a force F is exerted on object 1507. FIG. 20C shows second membrane 1505 moving in the direction D2, thus returning back to its original position after force F1 is applied.

Figure 21:
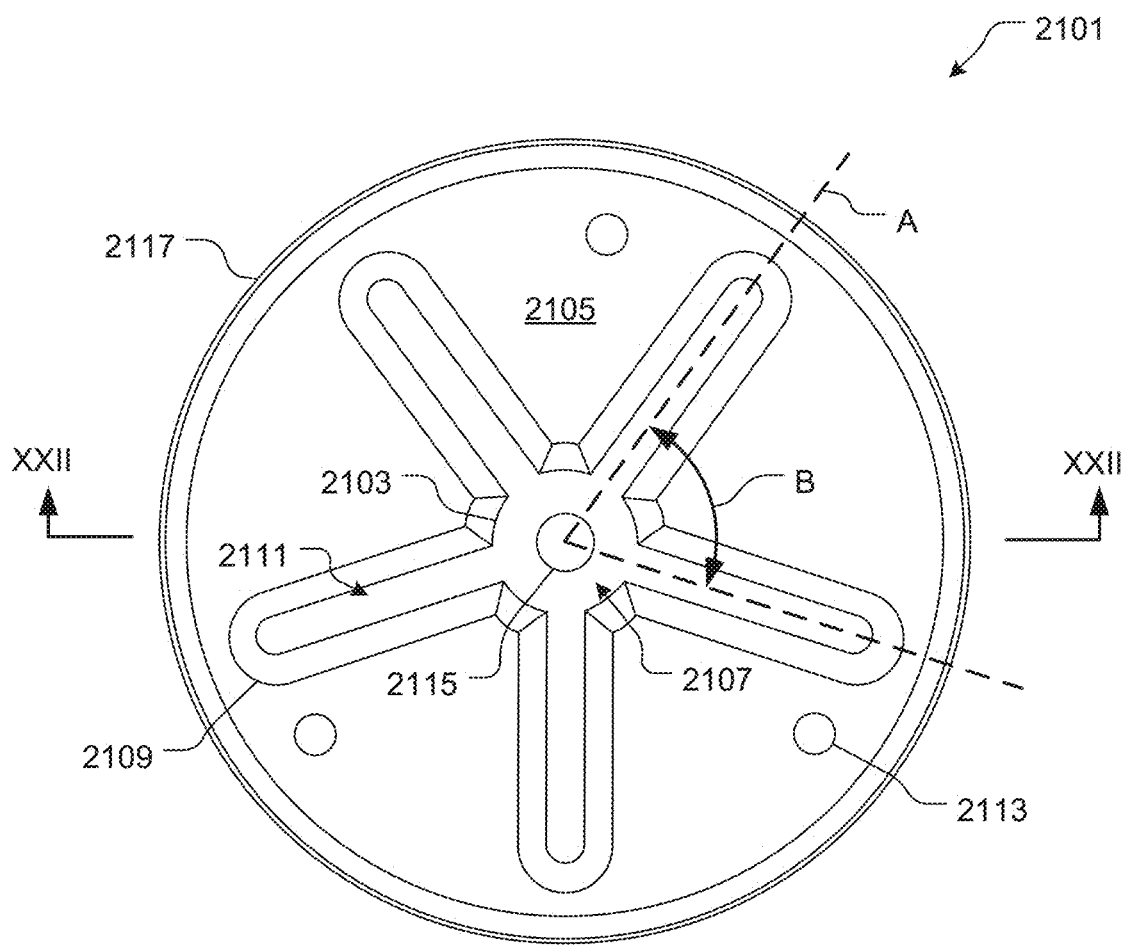
FIG. 21 is a top view of a mounting plate according to the preferred embodiment of the present invention.
Figure 22:
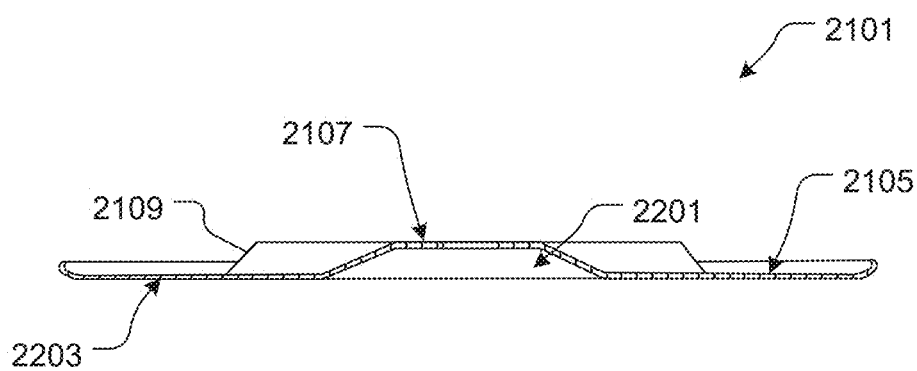
FIG. 22 is a side cross-sectional view of the mounting plate of FIG. 21 taken at XXII-XXII.

Referring now to FIGS. 21 and 22 in the drawings, respective top and side cross-sectional views of a mounting plate 2101 are shown according to the preferred embodiment of the present invention. It should be appreciated that mounting plate 2101 is substantially similar in function to the mounting plates shown and described herein. Specifically, mounting plate 2101 is adapted to secure an object such as a fastener, riser, attachment device, and/or other suitable device to the mounting system.

During assembly, a worker attaches an object, i.e., a solar panel attachment, to the mounting plate, and in some embodiments, it is not feasible to couple the object at a desired position and orientation because the raised surfaces of the mounting plate causes the object to tilt. The mounting plate of the present invention overcomes such problems by extending the contact surface area between the mounted object and the mounting plate, which in turn creates a relatively planar surface area for mounting objects thereto. To do this, mounting plate 2101 is provided with one or more elongated members adapted to extend from a primary housing. The housing and members form a relatively planar surface area for supporting the object resting thereon. Of course, it should be understood that mounting plate 2101 is not intended to be limited to the figures and description below, but could include the features of the mounting plates described herein and other modifications without departing from the spirit thereof.

Mounting plate 2101 comprises a housing 2103 raised from a base 2105, the housing being adapted to receive and support an object, i.e., a riser (not shown) thereon. Housing 2103 preferably forms a cavity 2201 for receiving a bolt, nut, and/or other any other type of fastener. However, it should be appreciated that alternative embodiments could include a solid housing, in lieu of a hollow cavity, and a shaft disposed therein for fastening to the object. Housing 2103 creates a contact surface area 2107, which receives and supports the object attached to mounting plate 2101.

Mounting plate 2101 is provided with one or more elongated members 2109 with a top surface area 2111 having a height relative flush with contact surface area 2107. Members 2109 are adapted to extend the contact surface area between the object and mounting plate 2101, which in turn creates a relatively planar surface area for mounting objects thereto. In the preferred embodiment, housing 2103 and members 2109 form a continuous contact surface area. However, it should be appreciated that alternative embodiments could include members spaced apart from housing 2103. For example, alternative embodiments could include one or more isolated members spaced apart from the housing and adapted to receive and maintain a flush surface area with the housing for mounting an object thereon.

In the preferred embodiment, mounting plate 2101 comprises five elongated members 2109, each member having a longitudinal centerline A, and each longitudinal centerline A being oriented at the same angle B relative to each other on a surface planar to base 2105. It should be appreciated that alternative embodiments could include more less elongated members for supporting the object. For example, alternative embodiments could include three members in lieu and/or different angles relative to each other.

Mounting plate 2101 is further provided with one or more optional holes 2113 for receiving a fastener (not shown) and a hole 2115 extending through the thickness of housing 2103. Hole 2115 is utilized to either receive a attachment device, i.e., a fastener, of the object being attached thereon or adapted to allow a fastener to extend therethrough for fastening to the object. In some embodiments, hole 2115 could be threaded for threadingly engaging with a threaded fastener. Mounting plate 2101 also includes an optional rim 2117 extending peripherally along an edge of base 2105. It should be appreciated that although shown in the circular form, mounting plate 2101 could easily be manufactured in different geometric shapes, depending on the desired application.

Figure 23:
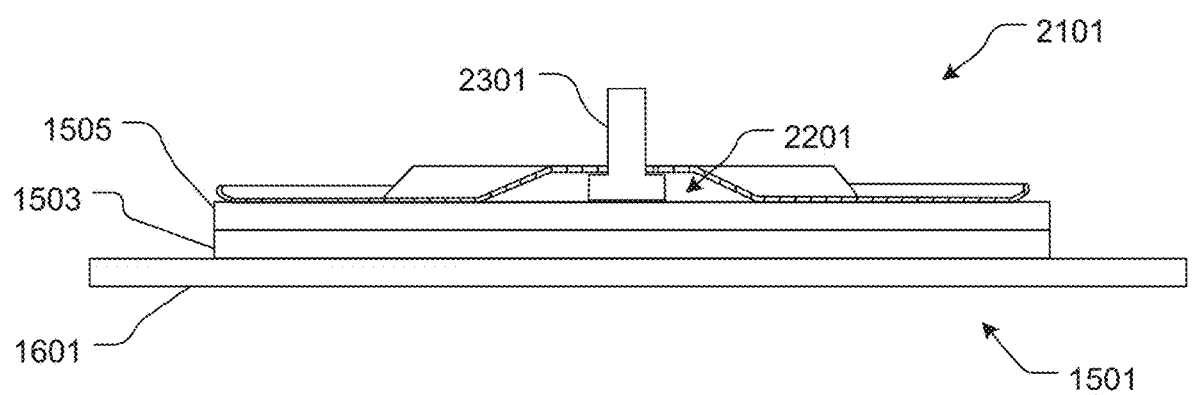
FIG. 23 is a side view of the mounting plate of FIG. 22 shown attached to the mounting system of FIG. 17.

Referring to FIG. 23 in the drawings, a cross-sectional side view of mounting plate 2101 taken at XXII-XXII is shown attached to mounting system 1501. In the preferred embodiment, an adhesive, as described herein, is applied to a bottom surface 2203 of mounting plate 2101 and thereafter bonded, preferably thermally fused, to membrane 1505 of mounting system 1501. In the exemplary embodiment, a fastener 2301 is shown securely positioned within cavity 2201.

Figure 24:
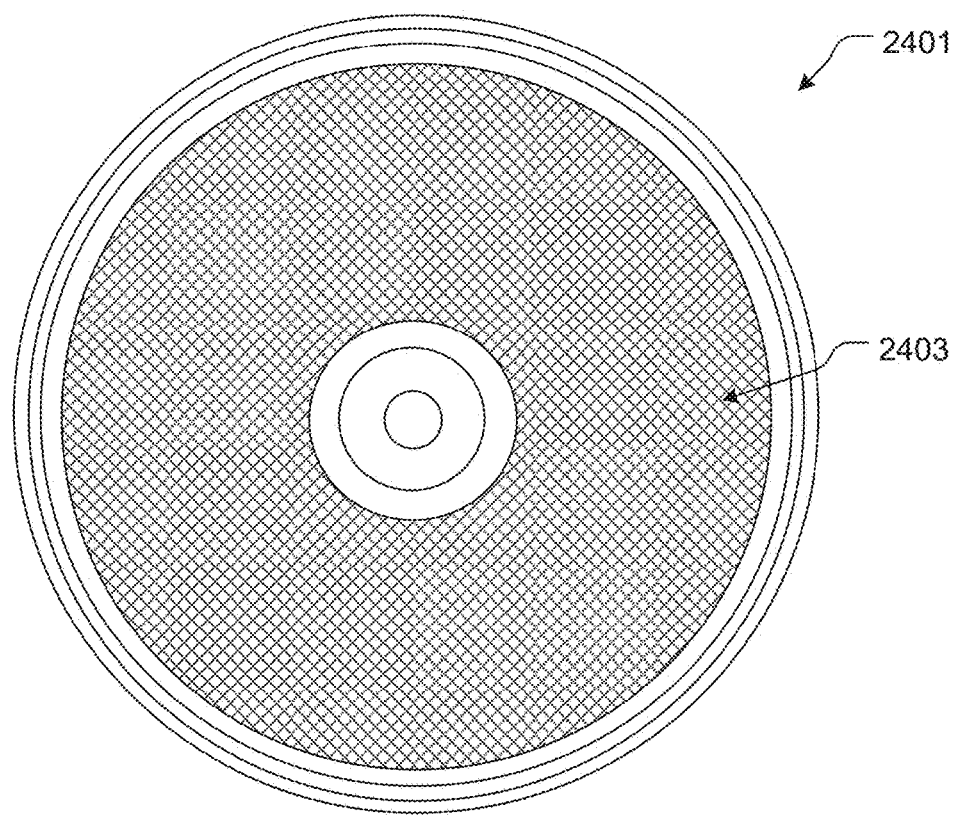
FIG. 24 is a front view of an alternative embodiment of the mounting plate of FIG. 21.

In FIG. 24, a front view of an alternative embodiment of mounting plate 2101 is shown. Mounting plate 2401 is adapted with a perforated surface area 2403. The perforated areas allow the membrane of the mounting system to extend therethrough as heat is applied to the membrane. Thereafter, the membrane securely bonds to above, within, and below the perforated areas after the membrane is cooled.

It should be appreciated that mounting plate 2401 is substantially similar in function to the mounting plates shown and described herein. Specifically, mounting plate 2401 is adapted to secure an object such as a fastener, riser, attachment device, and/or other suitable device to the mounting system. The features of the mounting plates described herein could easily be adapted to include the features of mounting plate 2401, and likewise mounting plate 2401 could be adapted to include the features of the mounting plates described herein. Of course, it should be understood that mounting plate 2401 is not intended to be limited to the embodiment shown in FIG. 24, but includes the features of the mounting plates described herein and other modifications without departing from the spirit thereof.

Figures 25, 26:
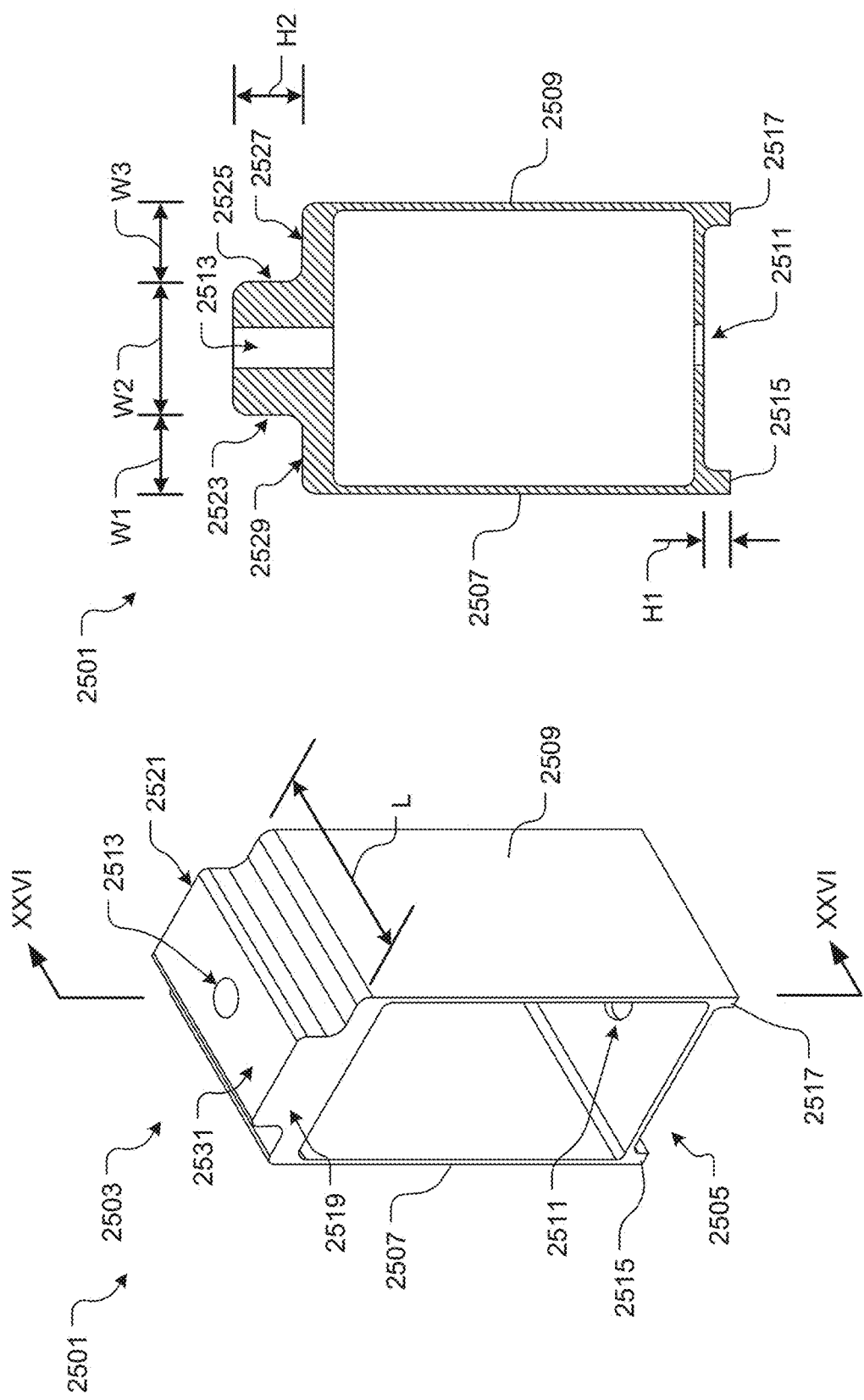
FIG. 25 is an oblique view of a riser according to the preferred embodiment of the present invention.
FIG. 26 is a cross-sectional front view of the riser of FIG. 25 taken at XXVI-XXVI.

Referring now to FIGS. 25 and 26 in the drawings, FIG. 25 shows an oblique view of a riser 2501 according to the preferred embodiment of the present invention, while FIG. 26 shows a front cross-sectional view of riser 2501 taken at XXVI-XXVI of FIG. 25. In the preferred embodiment, riser 2501 is adapted to couple to and elevate an object, i.e., an attachment device for a solar panel, at a desired height, preferably 4 inches, above a structure. It should be understood that, riser 2501, and the alternative embodiments disclosed herein, are adapted to couple to one or more of the mounting systems described herein and/or other modifications without departing from the spirit thereof. In addition, it should be appreciated that riser 2501 and other alternative embodiments thereof could easily be adapted to fasten to other types of devices in lieu of a mounting assembly.

Riser 2501 is preferably composed of a rigid, metallic material such as aluminum, which allows little to no flexure, thus restricting transverse, longitudinal, and rotational movement of riser 2501. The metallic material allows an object, such as a solar panel, to rigidly attach to the structure via riser 2501. However, it should be appreciated that alternative embodiments of riser 2501 could be composed of different materials, both flexible and rigid, depending on the preferred application. For example, riser 2501 could be composed, partially or in whole, of a composite, wood, and/or an elastomeric material, which creates flexibility, conductive resistance, and/or other desired attributes.

Riser 2501 provides significant advantageous over conventional devices for securing an object to a roof structure. Specifically, riser 2501 is preferably manufactured through an extruding process, wherein multiple risers are formed simultaneously as a continuously extruded member. During the manufacturing process, the extruded member is transversely cut to form individual risers. Then, two opposing holes are machined on opposing surfaces of the riser for attaching the riser to both the mounting plate and the object coupled thereto. The relatively simple design and advanced extruding process greatly reduces the manufacturing costs.

Riser 2501 comprises an attachment portion 2503 for securing an object to riser 2501 and a base portion 2505 for coupling riser 2501 to one or more mounting systems described herein. In the exemplary embodiment, riser 2501 is adapted to attach to mounting assembly 110, which in turn attaches to a roof structure. Of course, it should be understood that although described as being utilized with a roof structure, riser 2501 could easily be utilized with other structures in lieu of the preferred roof structure, i.e, a vertical wall, membrane for covering ponds, and/or other suitable structures.

Riser 2501 comprises a first sidewall 2507 and a second sidewall 2509 extending relatively parallel to each other. The sidewalls are adapted to elevate attachment portion 2503 at a predetermined height relative to the structure (not shown). Riser 2501 further comprises a first attachment device 2511, which is preferable a hole extending through the thickness of base 2505 and a second attachment device 2513, which is preferable a hole extending through the thickness of attachment portion 2503. Attachment device 2511 is adapted to couple riser 2501 to the mounting plate, while attachment device 2513 is adapted to couple an object to riser 2501.

Base 2505 preferably includes two elongated leg members, a first leg 2515 and a second leg 2517, both legs being adapted to elevate base 2505 at a height H1 above the top surface of the mounting plate. In the preferred embodiment, leg 2515 and leg 2517 elevate base 2505 above one or more raised surfaces of the mounting plate. For example, the mounting plate, as shown and described above, could include a raised surface directly underneath base 2505, thereby requiring base 2505 to be raised at a height H1 to create a tight, secure fit between riser 2501 and the mounting system. It should be appreciated that leg 2515 and leg 2517 are optional features and are not required in alternative embodiments wherein the mounting plate is devoid of raised surfaces below base 2505. In these alternative embodiments, base 2505 could easily be adapted to sit directly on the top surface of the mounting plate.

Figure 27:
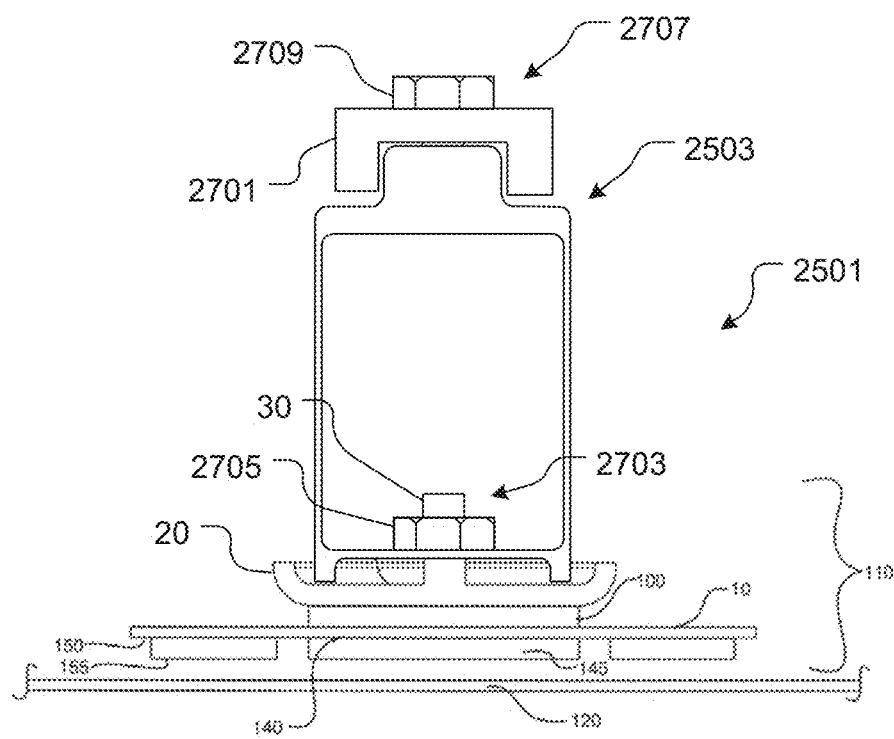
FIG. 27 is a front view of the riser of FIG. 25 shown attached to the mounting assembly of FIG. 4.

Attachment portion 2503 includes one or more surfaces for abutting against the object coupled thereto (see FIG. 27). Attachment portion 2503 preferably comprises six surfaces, a front surface 2519, an opposing rear surface 2521, a side surface 2523, an opposing side surface 2525, a first top surface 2527, a second top surface 2529, and an elevated top surface 2531. In the preferred embodiment, riser 2501 has a length L, a top surface width W1 extending the width of surface 2529, a top surface width W2 extending the width of surface 2531, a top surface width W3 extending the width of surface 2527, and a height H2 extending the height between top surface 2531 and surface 2529. In the preferred embodiment, W2 is greater than W1 or W3 and H2 has a length of approximate ⅜ of an inch. Of course, it should be understood that the foregoing lengths, widths, and heights are not intended to limit riser 2501 to these dimensions. It should be appreciated that alternative embodiments could include different dimensions depending on the desired application.

In the preferred embodiment, an object 2701, like that shown in FIG. 27, rests on top surface 2531 and/or top surfaces 2527 and 2529. Side surfaces 2527 and 2529 and/or front surface 2519 and rear surface 2521 provide means for restricting movement of the object. For example, the object could include a surface extending alongside surface 2523, which creates contact and restricts rotational movement of the object as rotational torque is applied thereto.

Referring now to FIG. 27 in the drawings, a front cross-sectional view of riser 2501 is shown attached to mounting assembly 110 and shown attached to an object 2701. It should be noted that the term mounting assembly and mounting system are interchangeable used herein, and intended to refer to a system adapted to secure an object to a structure. It should also be noted that the front view of mounting assembly 110 is depicted in FIG. 4 above. When assembled, protrusion 30 extends through attachment device 2511, which in turn, is received by an attachment device 2703 for securing base 2505 to assembly 110. In the preferred embodiment, attachment device 2703 is a nut 2705 threadingly engaged with protrusion 30; however, it should be appreciated that alternative embodiments could include different attachment devices, i.e., a quick release device, snap, clip, and/or other suitable devices in lieu of the preferred embodiment.

Attachment device 2511 is preferable a non-threaded hole, which allows the protrusion to slide therein, while attachment device 2513 is preferably a threaded hole, which provides attachment means for a threaded bolt and/or other suitable device. It should be appreciated that alternative embodiments could include either threaded or non-threaded holes in lieu of the preferred embodiment.

During assembly, riser 2501 is positioned on plate 20 such that hole 2511 receives protrusion 30. Thereafter, riser 2501 is attached to plate 20 with attachment device 2703 such that the legs of riser 2501 securely contact the top surface of plate 20. Finally, object 2701 is placed on attachment portion 2503 and secured with attachment device 2707, for example, a bolt 2709.

Referring now to FIGS. 28 and 29 in the drawings, FIG. 28 shows an oblique view of a riser 2801 according to an alternative embodiment of the present invention, while FIG. 29 shows a front cross-sectional view of riser 2801 taken at XXIX-XXIX of FIG. 28. It should be noted that riser 2801 is substantially similar in function to riser 2501, wherein both riser 2801 and riser 2501 are adapted to elevate an object at a predetermined height above a structure and both risers are adapted to securely attach to a mounting assembly.

The features of riser 2801 could easily be incorporated in riser 2501, and likewise, the features of riser 2501 could be incorporated in riser 2801.

Riser 2801 comprises an attachment portion 2803 for securing an object to riser 2801 and a base portion 2805 for attaching riser 2801 to a mounting assembly. Base portion 2805 is preferably a separate member rigidly attached to attachment portion 2803 through bonding means, i.e., welding, to form a unitary body with attachment portion 2803. However, it should be appreciated that attachment portion 2803 and base 2805 could easily be manufactured as a single member in alternative embodiments. For example, riser 2801 could be manufactured through a lathing or milling process.

Riser 2801 comprises a first attachment device 2807, which is preferably a hole, and a second attachment device, which is preferable a hole, both holes being adapted to extend partially through the thickness of attachment portion and base portion, respectively. Attachment device 2811 is adapted to couple riser 2801 to mounting assembly 110, while attachment device 2807 is adapted to secure an object to riser 2801. It should be appreciated that alternative embodiments could include a continuous conduit interconnecting the two opposing attachment devices in lieu of the preferred embodiment. In the preferred embodiment, attachment device 2811 threadingly engages with protrusion 30 of mounting assembly 110, and attachment device 2807 threadingly engages with a threaded bolt and/or other suitable attachment device.

In the exemplary embodiment, riser 2801 attaches to mounting assembly 110. Of course, it should be understood that riser 2801 could easily be attached to other types of mounting assemblies, either attached to a roof structure or other types of structures.

During assembly, riser 2801 is positioned on plate 20 such that attachment device 2811 receives protrusion 30. Thereafter, a worker rotates riser 2801, which in turn, causes attachment device 2811 to threadingly engage with protrusion 30. Finally, an object is placed on surface 2809 and secured with an attachment device (not shown), i.e., a fastener adapted to engage with attachment device 2807.

Riser 2801 is further provided with a cavity 2815 for receiving a raised surface of the mounting plate. It should be appreciated that cavity 2815 is an optional feature and is not required in alternative embodiments where the mounting plate is devoid of raised surfaces directly beneath surface 2813. In these alternative embodiments, base 2805 could easily be adapted to sit directly on the top surface of the mounting plate.

Figure 31:
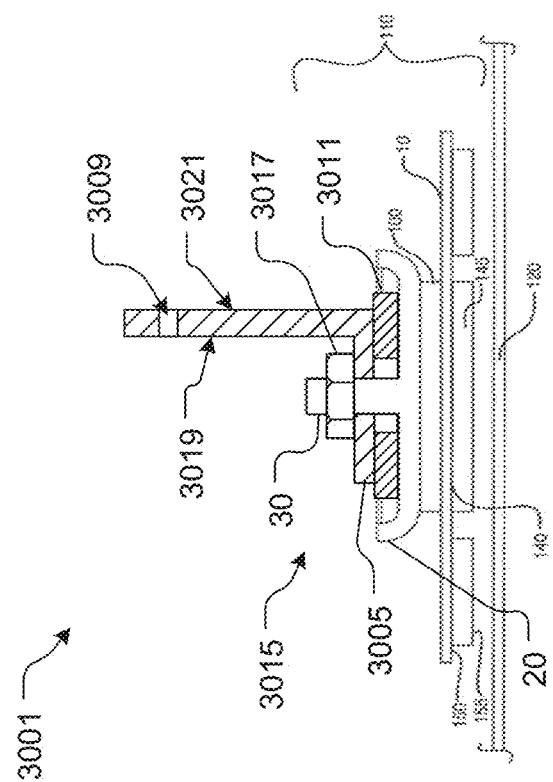
FIG. 31 is a cross-sectional side view of the riser of FIG. 30 taken at XXXI-XXXI.
Figure 30:
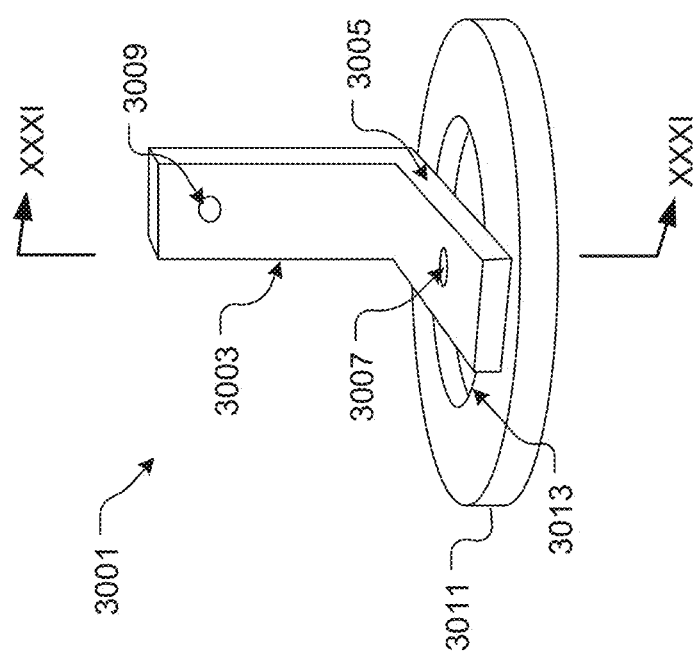
FIG. 30 is an oblique view of a riser according to an alternative embodiment of the present invention.

Referring now to FIGS. 30 and 31 in the drawings, FIG. 30 shows an oblique view of a riser 3001 according to an alternative embodiment of the present application, while FIG. 31 shows a front cross-sectional view of riser 3001 taken at XXXI-XXXI of FIG. 30. FIG. 31 also shows riser 3001 coupled to mounting assembly 110, as depicted in FIG. 4 above. It should be appreciated that riser 3001 is substantially similar in function to riser 2801 and riser 2501, wherein riser 2801, riser 2501 and riser 3001 are adapted to raise an object at a predetermined height above a structure and adapted to securely attach to a mounting assembly. The features of riser 3001 could easily be incorporated in both risers 2501 and 2801, and likewise, the features of risers 2501 and 2801 could be incorporated in riser 3001.

Like risers 2501 and 2801, riser 3001 comprises an attachment portion 3003 for securing an object to riser 3001 and a base 3005 for attaching riser 3001 to a mounting assembly. In the preferred embodiment, riser 3001 is formed as a single member, preferably manufactured through the extruding process described above. Riser 3001 is provided with a first attachment device 3007, which is preferable a hole extending through the thickness of attachment portion 3003 and a second attachment device 3009, which is preferably a hole extending through the thickness of base 3005. Attachment device 3007 provides means for attaching riser 3001 to the roof structure, while attachment device 3009 provides means for securing an object to riser 3001.

Riser 3001 is further provided with a structure 3011, which can either be separable from or rigidly attached to base 3005 through a bonding process, i.e., welding, to form a unitary body with base portion 3005. Structure 3011 elevates base 3005 above a raised surface area (not shown) of the mounting plate. Structure 3011 is provided with a cavity 3013 extending through the thickness of structure 3011 for receiving the raised surface and for allowing protrusion 30 to extend therethrough.

During assembly, riser 3001 is positioned on plate 20 such that hole 3013 and hole 3007 receive protrusion 30. Thereafter, an attachment device 3015, i.e., a bolt 2117, attaches to protrusion 30 for securing riser 3001 to mounting assembly 110. Finally, an object is coupled to either a surface 2019 and/or a surface 2021 of attachment portion 3003 and secured with an attachment device (not shown) adapted to couple to hole 3009.

Figure 32:
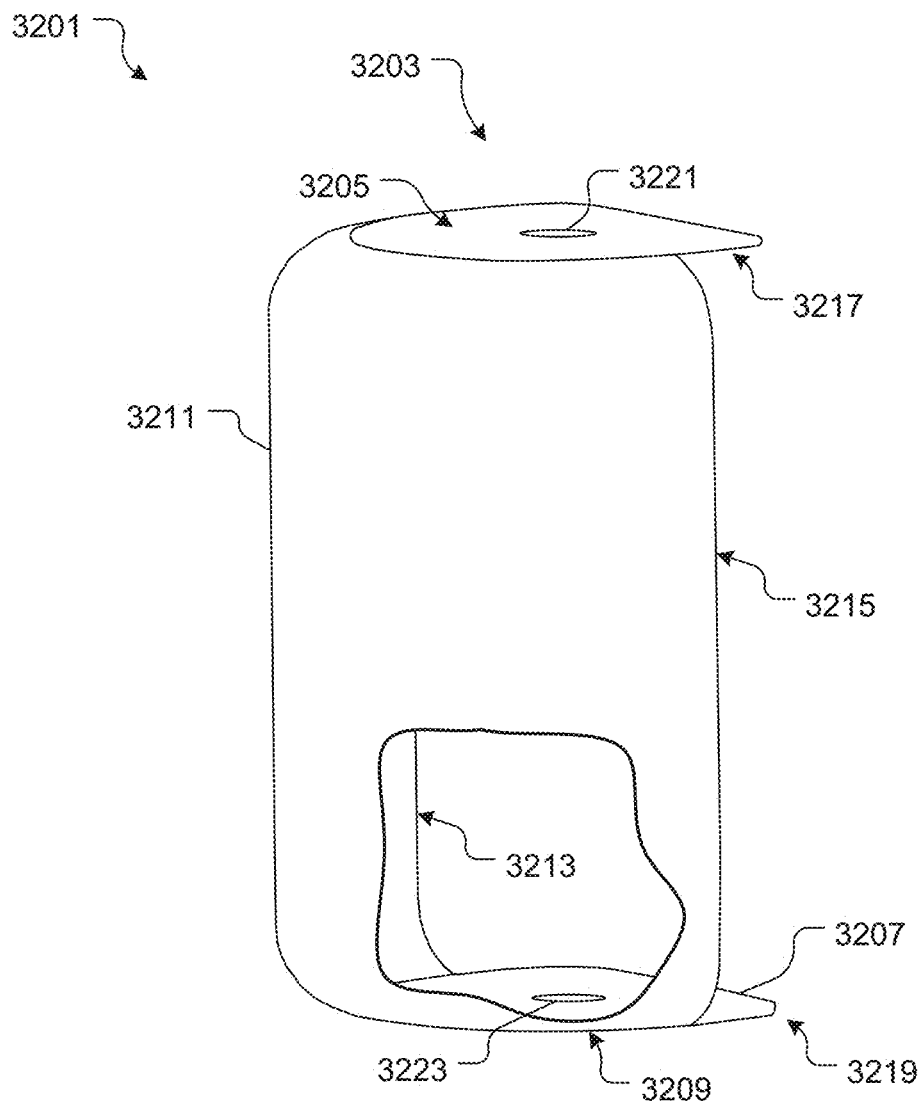
FIG. 32 is an oblique view of a riser according to an alternative embodiment of the present invention.

Referring now to FIG. 32 in the drawings, an oblique view of an alternative embodiment of riser 2501 is shown. Riser 3201 is substantially similar in function to the risers described herein. Specifically, riser 3201 is adapted to elevate an object at a predetermined height above a structure via one or more of the mounting systems described herein. The features of riser 3201 could easily be incorporated in the risers described herein, and likewise the features of risers disclosed herein could be incorporated in riser 3201.

Riser 3201 comprises one or more of an attachment portion 3203 having a top surface 3205 and an opposing base portion 3207 having a bottom surface 3209. Attachment portion 3203 is adapted to support and attach to an object thereon, while base portion 3207 is adapted to secure riser 3201 to one or more of the mounting systems described herein.

Riser 3201 further comprises a sidewall 3211 rigidly attached to attachment portion 3203 and base portion 3209. Sidewall 3211 elevates attachment portion 3203 at a predetermined height, preferably around 4 inches above a structure the mounting system is attached thereto. In the preferred embodiment, sidewall 3211 is manufactured in a curved profile, which is formed through a stamping manufacturing process. It should be appreciated that other profiles, i.e., rectangular profiles, could be utilized in lieu of the preferred embodiment. The curved profile provides sufficient rigidity for supporting the object coupled to attachment portion 3203. In the preferred embodiment, riser 3201 is manufactured with a stamping process; however, it should be appreciated that alternative manufacturing process, i.e., milling, could be utilized in lieu of the preferred process.

Sidewall 3211 curves from a first end 3213 to a second end 3215. In the preferred embodiment, sidewall 3211 does not attach to the entire edged surfaces of attachment portion 3203 and base portion 3207. Attachment portion 3203 includes a top tab portion 3217, while base portion 3207 includes a bottom tab portion 3219. However, it should be appreciated that alternative embodiments could include a sidewall that attach to the entire edged surfaces of the top and bottom members.

Riser 3201 further comprises a first attachment device 3221, which is preferable a hole extending through the thickness of attachment portion 3203 and a second attachment device 3233 extending through the thickness of base portion 3207. In the preferred embodiment, attachment portion 3221 is adapted to couple to the object being mounted thereto, and attachment portion 3223 is adapted to couple riser 3201 to one or more of the mounting systems described herein. It should be appreciated that attachment device 3221 and/or attachment device 3223 could either be threaded or unthreaded, depending on the preferred application.

Figure 33:
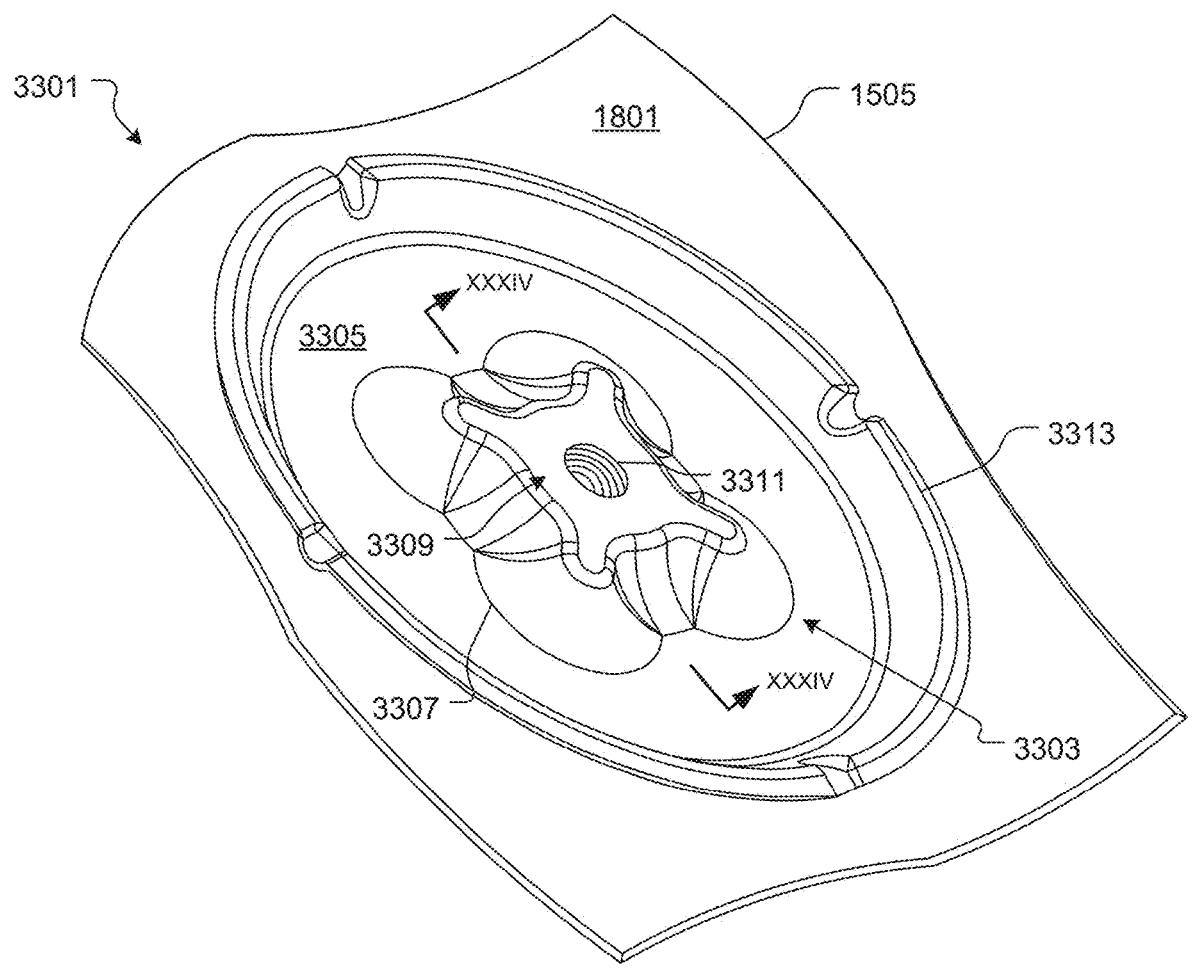
FIG. 33 is an oblique view of an alternative embodiment of a mounting plate.
Figure 34:
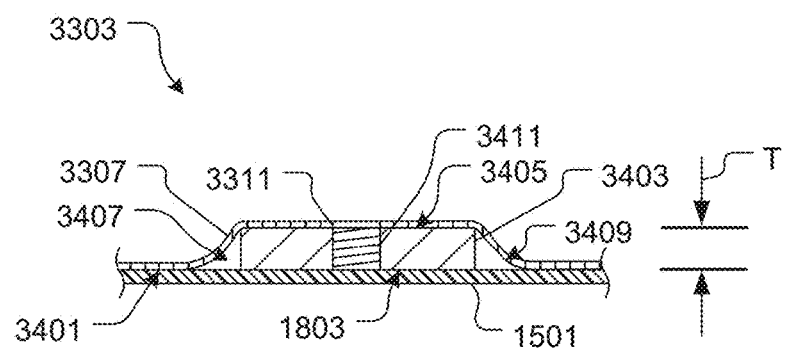
FIG. 34 is a cross-sectional view of a portion of the mounting plate of FIG. 33 taken at XXXIV-XXXIV.

Referring now to FIGS. 33 and 34 in the drawings, oblique and cross-sectional views of a mounting plate 3301 according to a preferred embodiment of the present application are shown. Mounting plate 3301 is substantially similar in function to the foregoing mounting plates. In particular, mounting plate 3301 is utilized to secure an object, i.e., a riser, to one or more of mounting systems discussed herein. It will be appreciated that the features of mounting plate 3301 and the foregoing mounting plates are interchangeable, for example, mounting plate 3301 could include the features of the mounting plate 2101 and/or mounting plate 2401. Like the foregoing mounting plates, mounting plate 3301 preferably thermally bonds to upper surface 1803 of second membrane 1505. In the preferred embodiment, mounting plate 3301 is utilized with mounting system 1501; however, it will be appreciated that mounting plate 3301 could easily be utilized with alternative embodiments of mounting system 1501.

Mounting plate 3301 comprises a raised portion 3303 being raised at a height relative to a base 3305. Base 3305 includes a bottom surface area 3403, which thermally bonded to second membrane 1501 according to one or more of the bonding methods discussed herein. In the preferred embodiment, mounting plate 3301 is composed of a metallic material sufficiently rigid to support an object to the mounting system in a relatively fixed position, yet sufficiently elastic to receive different embodiments of a fastener, as will be discussed in detail below (see FIGS. 37 and 38).

Mounting plate 3301 is preferably formed through a stamping process, which provides easy and rapid manufacturing of raised portion 3303. The stamping process is an effective means for forming raised portion 3303; however, it should be appreciated that alternative embodiments of mounting plate 3301 could be composed of other materials, including but not limited to, plastics, ceramics, composites, elastomeric material, and/or other suitable materials and could be manufactured through alternative machining processes such as milling, extrusion, molding, and/or other suitable manufacturing processes.

Raised portion 3303 is utilized to secure a fastener 3403 to mounting system 1501. In the preferred embodiment, raised portion 3303 is adapted to sandwich fastener 3403 between a lower surface area 3405 and upper surface area 1803 of second membrane 1505. Raised portion 3303 forms a cavity 3407 for receiving fastener 3403. Cavity 3407 is formed with a lower surface 3405 and a contoured joining material 3307. Joining material 3307 extends from base 3305 to a top surface 3309 and includes an inner surface 3409 selectively contoured to abut against the top and side surfaces of fastener 3403. Thus, the snug fit between the surfaces of fastener 3403 and inner surfaces of cavity 3405 prevent rotational, transverse, and longitudinal movement of fastener 3403, which in turn enables an object attached thereto to remain in a relatively fixed position while mounted to mounting system 1501.

It should be appreciated that alternative embodiments of raised portion 3303 could include cavities which are not formed with contoured inner surfaces adapted to create a snug fit with the fastener. In these alternative embodiments, the fastener disposed therein is capable of some movement, depending on the preferred application. For example, the raised portion could be configured to enable rotational movement, while restricting transverse and longitudinal movement. An example of this type of embodiment is found in FIG. 38, as will be discussed below.

Raised portion 3303 is further provided with a port 3311 extending through the thickness formed between top surface area 3309 and lower surface area 3405. Port 3311 provides passage for a fastening device, i.e., a threaded shaft (not shown), to extend therethrough and fasten to an attachment device 3411 of fastener 3403. In the preferred embodiment, port 3311 is a hole, either partially or fully extending through thickness T of fastener 3403, and is preferably threaded for engaging a threaded member of an object being supported thereto. However, it will be appreciated that alternative embodiments of fastener 3403 could include different fastening means, i.e., slots, clips, clamps, quick-release devices, in lieu of the preferred embodiment. Also, alternative embodiments could include a protrusion extending through port 3311 and adapted to couple to the object (see FIG. 36).

Mounting plate 3301 is optionally manufactured with a rim 3313 extending around the peripheral edge of base 3307 and oriented at an angle with respect to and in a direction away from base 3307. Rim 3313 provides means for preventing water, debris, and/or other foreign objects from entering and/or blocking port 3311. Also, rim 3313 could provide attachment means for coupling an attachment device, i.e., a clip or clamp, to mounting plate 3301.

Figure 35:
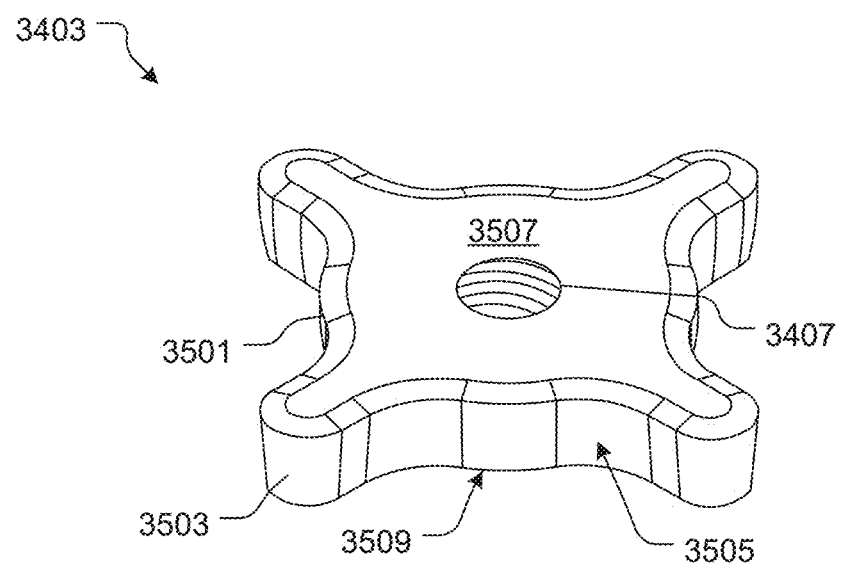
FIG. 35 is an oblique view of a fastener.

FIG. 35 shows an oblique view of fastener 3403. Fastener 3403 comprises a base 3501 and one or more anti-rotational members 3503 extending therefrom. Members 3503 are utilized to prevent transverse, longitudinal, and rotational movement of fastener 3403 while fastener 3403 is disposed within cavity 3407. Specifically, members 3503 and base 3501 include a side surface 3505 that abuts against inner surface 3409 of joining material 3307, thereby creating a snug fit therebetween and preventing movement. In the preferred embodiment, fastener 3403 comprises four members 3503; however, alternative embodiments could include more or less members depending on the preferred application. Fastener 3403 is further provided with a top surface 3507, which comes in contact with surface 3405, and a bottom surface 3509, which comes in contact with upper surface 1803 of second membrane 1501. During operation, movement of fastener 3403 is restricted when the side, top, and bottom surfaces of the fastener abut against the inner surfaces of cavity 3407 and surface 1803 of membrane 1501 as forces are exerted against fastener 3403.

Figure 36:
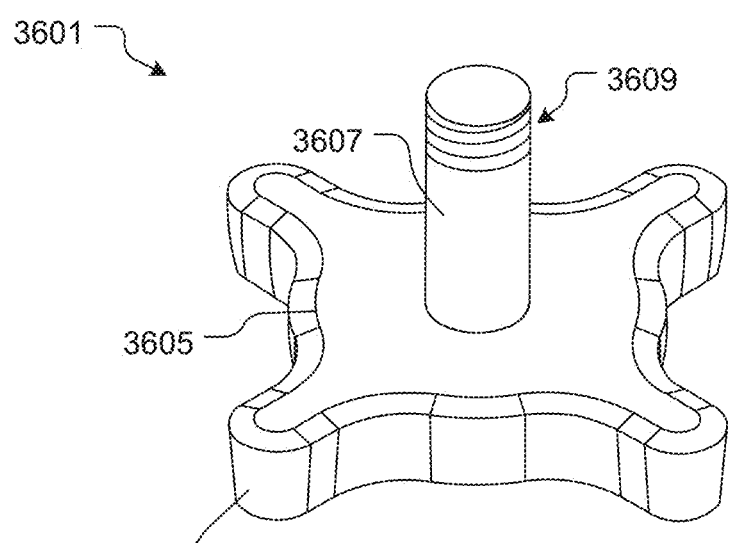
FIG. 36 is an oblique view of an alternative embodiment of the fastener of FIG. 35.

FIG. 36 shows an oblique view of an alternative embodiment of fastener 3403. Fastener 3601 is substantially similar in form and function to fastener 3403. For example, fastener 3601 is provided with one or more anti-rotational members 3603 extending from a base 3605 and adapted to prevent rotational, longitudinal, and transverse movement of fastener 3601 when sandwiched between surface 3405 and surface 1803.

Fastener 3601 is further provided with a protrusion 3607 extending from base 3605. Fastener 3601 is preferably manufactured as an integral member with protrusion 3607, thus being rigidly formed with base 3605. Protrusion 3607 is utilized to provide coupling means for attaching an object to fastener 3601. Protrusion 3607 is further optionally provided with an attachment portion 3609 utilized to couple with the object. In the preferred embodiment, attachment portion 3609 preferably includes threads for engaging with a threaded member of the object. Of course it should be appreciated that alternative embodiments of attachment portion 3609 could include different surface treatments and/or device in lieu of the preferred embodiment.

Figure 37:
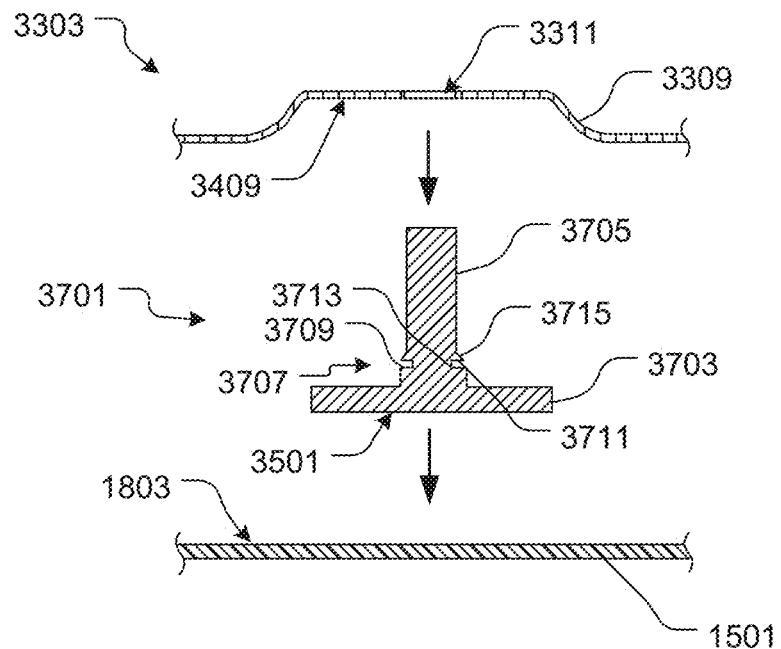
FIGS. 37 and 38 are cross-sectional views of an alternative embodiment of the fastener of FIG. 35.
Figure 38:
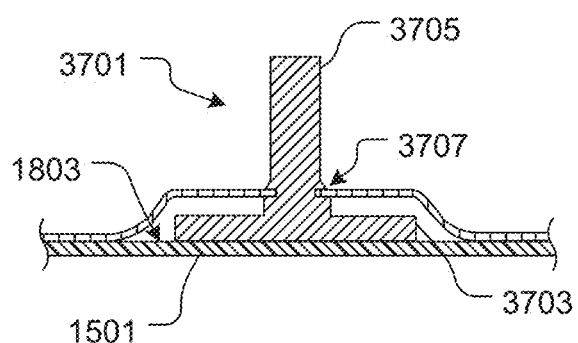

Referring now to FIGS. 37 and 38 in the drawings, a cross-sectional view of an alternative embodiment of fastener 3601 is shown. Fastener 3701 is substantially similar in form and function to fastener 3601. For example, fastener 3701 comprises a base portion 3703 and a protrusion 3705 extending therefrom. It will be appreciated that the features of fastener 3701 and the foregoing fasteners are interchangeable, for example, fastener 3701 could include the features of fastener 3601.

Fastener 3701 is further provided with a notch 3707 utilized to couple fastener 3701 to port 3311. In the preferred embodiment, notch 3707 is adapted to tightly fit with port 3311, which in turn prevents rotational, longitudinal, and transverse movement of fastener 3701, thereby eliminating the need to sandwich fastener 3701 within cavity 3407 of raised portion 3303. It should be appreciated that alternative embodiments of notch 3707 could be utilized to allow some movement, i.e., rotational movement, depending on the preferred application. Notch 3707 peripherally extends around protrusion 3705 and comprises a bottom surface 3709, a top surface 3711, and an inner side surface 3713. A contoured surface 3715 is positioned above notch 3707 and is utilized to elastically deform the material around port 3311 such that the material widens while in contact with surface 3715, then retracts to its original geometric shape in notch 3707.

Figure 39:
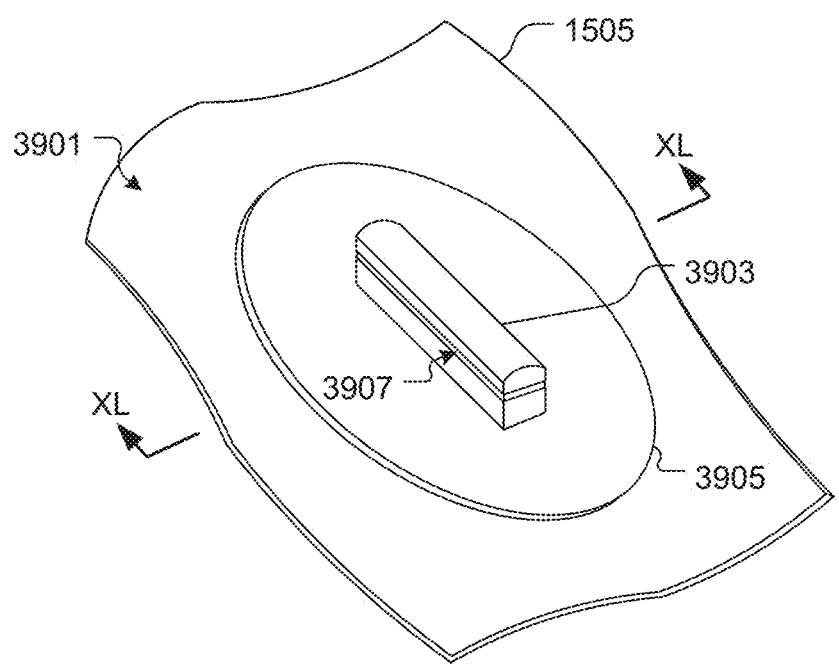
FIG. 39 is an oblique view of an alternative embodiment of the mounting plate of FIG. 33.

Referring now to FIG. 39 in the drawings, an alternative embodiment of mounting plate 3301 is shown. Mounting plate 3901 is substantially similar in function to mounting plate 3301. In particular, mounting plate 3901 is adapted to secure an object, i.e., a riser to mounting system 1501. It will be appreciated that mounting plate 3901 could include the features of the other mounting plates discussed herein, and likewise, the features of mounting plate 3901 could be incorporated in the foregoing mounting plates.

Figure 40:
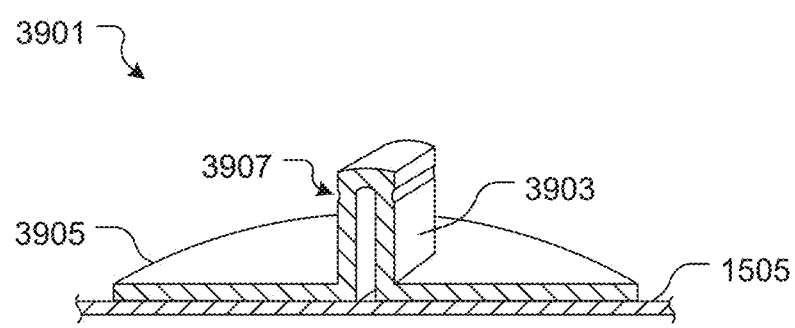
FIG. 40 is a cross-sectional view of mounting plate of FIG. 39 taken at XL-XL.

Mounting plate 3901 is provided with a protrusion 3903 extending from a base portion 3903. Protrusion 3903 is utilized to couple an object to mounting plate 3901. FIG. 40 shows a cross-sectional view of mounting plate 3901 taken at XL-XL of FIG. 39. As is shown, protrusion 3903 and base 3905 are preferably formed as an integral body, and preferably manufactured through a stamping process. Protrusion is provided with an attachment portion 3907, which in the preferred embodiment, is a ridge recessed on the surface of protrusion 3903. Although shown as an elongated rectangular member, protrusion 3903 can easily be manufactured with different shapes and sizes. For example, an alternative embodiment could include a cylindrical protrusion in lieu of a rectangular profile. Also, alternative embodiments could include different attachment devices in lieu of a ridge. For example, attachment portion 3907 could include threads for engaging a threaded structure.

Figure 41:
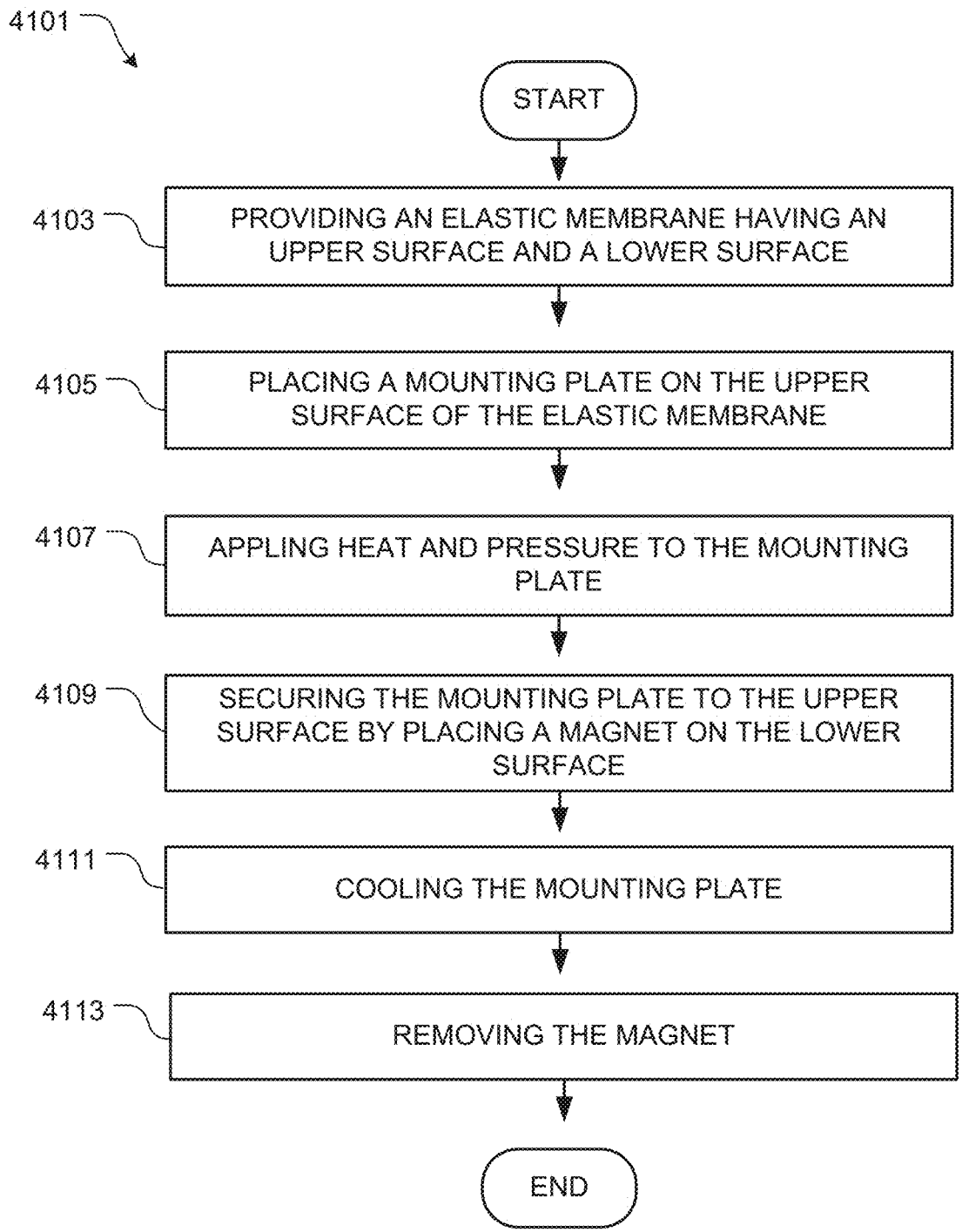
FIG. 41 is a flow chart depicting the preferred method of assembling the mounting system according to the preferred embodiment of the present application.

FIG. 41 shows a flow chart 4101 illustrating the preferred method of the manufacturing the mounting systems disclosed herein. Box 4103 shows the first step, which includes providing an elastic membrane having an upper and lower surface. The next step includes placing and bonding a mounting plate to the upper surface with heat and pressure, as depicted in boxes 4105 and 4107. Thereafter, the mounting plate is secured in place with a magnet positioned on the opposing lower surface, as depicted in box 4109. Finally, the magnet is removed after sufficient time is allowed to cool the mounting plate, as depicted in boxes 4111 and 4113.

Figure 42:
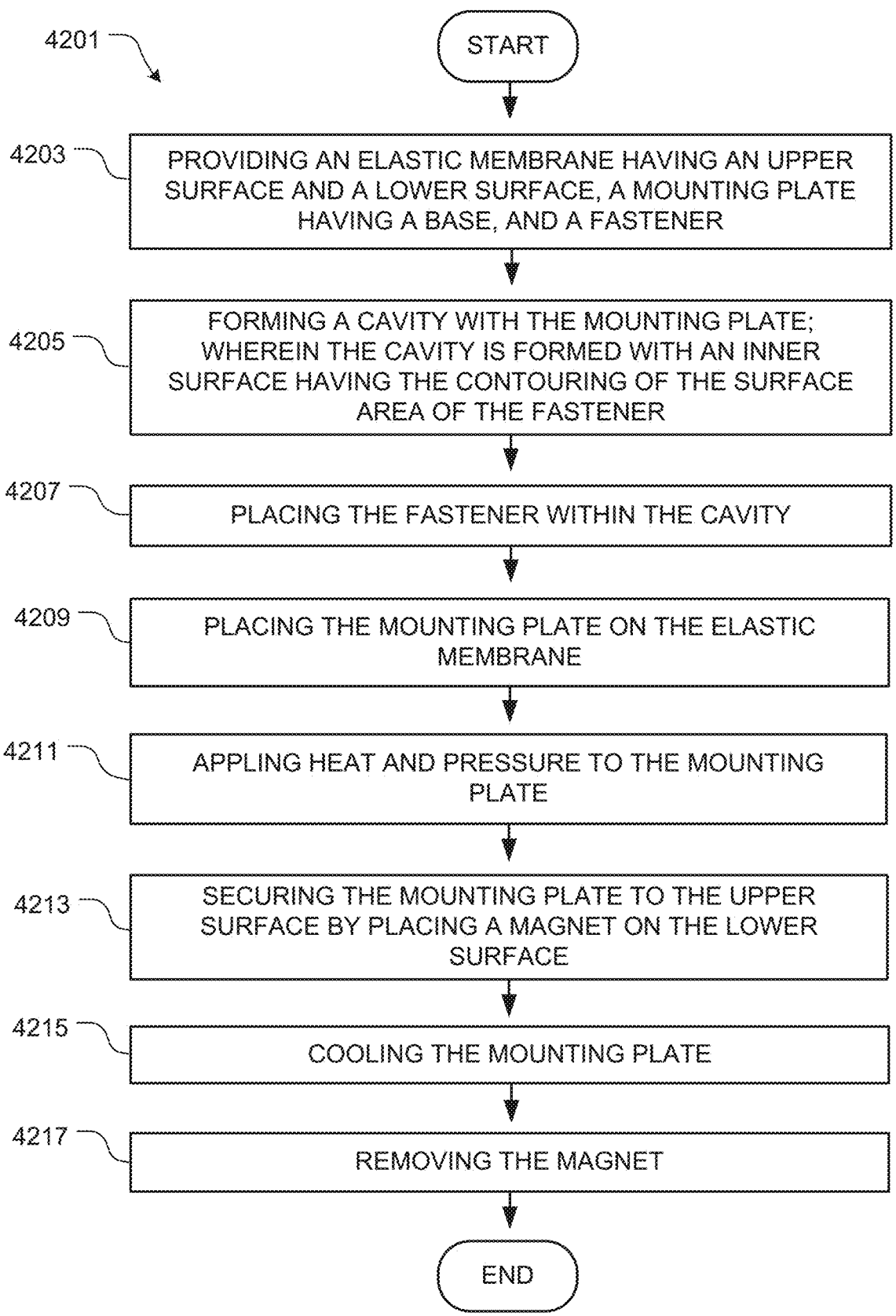
FIG. 42 is a flow chart depicting the preferred method of assembling the mounting plate of FIG. 33.

FIG. 42 shows a flow chart 4201 illustrating the preferred method of the manufacturing and assembling the mounting systems with plate 3301. Box 4203 includes the first step, which includes providing a membrane, mounting plate, and a fastener. The next step includes securing the fastener to the mounting plate, which includes the steps of first forming a cavity having the contouring of the fastener, as depicted in boxes 4205 and 4207. The next step includes placing and bonding a mounting plate to the upper surface with heat and pressure, as depicted in boxes 4209 and 4211. Thereafter, the mounting plate is secured in place with a magnet positioned on the opposing lower surface, as depicted in box 4213. Finally, the magnet is removed after sufficient time is allowed to cool the mounting plate, as depicted in boxes 4215 and 4217.

Figure 43:
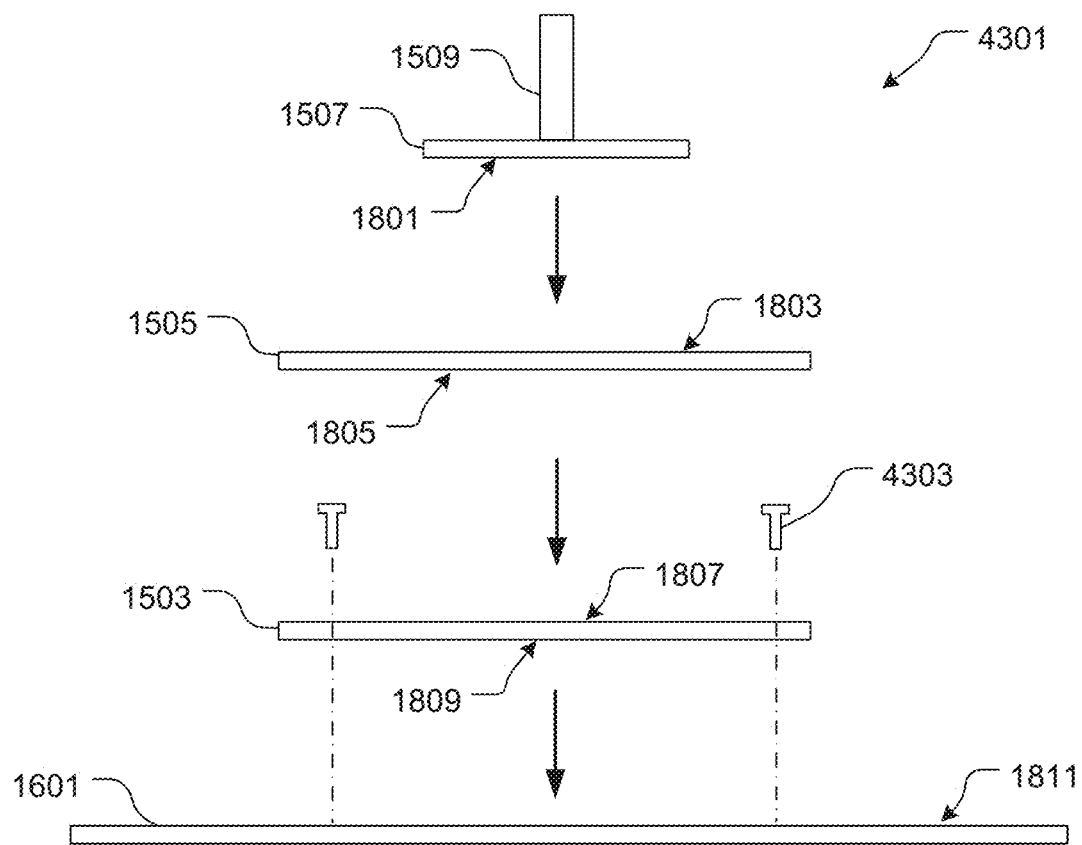
FIG. 43 is a front view of an alternative embodiment of the mounting system of FIG. 18.
Figure 44:
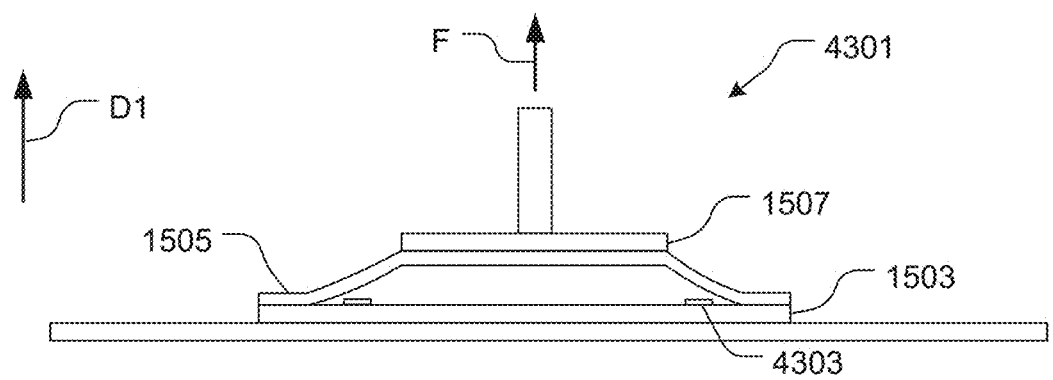
FIG. 44 is the assembled embodiment of the mounting system of FIG. 43.

Referring to FIGS. 43 and 44, unassembled and assembled front views of an alternative embodiment of mounting system 1501 is shown. Mounting system 4301 is substantially similar in form and function to mounting system 1501. The features of the mounting systems described herein could easily be adapted to include the features of mounting system 4301, and likewise mounting system 4301 could be adapted to include the features of the foregoing mounting system described herein.

Mounting system 4301 is further provided with one or more fastening device 4303 utilized to secure membrane 1503 to structure 1601. FIG. 44 shows fastening devices 4303 securing membrane 1503 to structure 1601 as force F is exerted against mounting system 4301, which in turn causes elastic stretching of membrane 1505.

Figure 45:
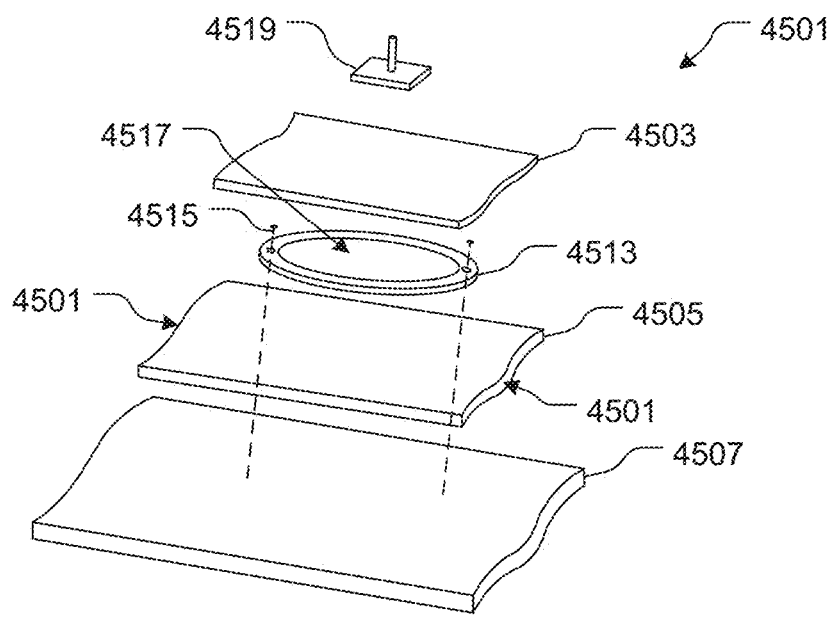
FIG. 45 is an oblique exploded view of an alternative embodiment of the mounting system.
Figure 46:
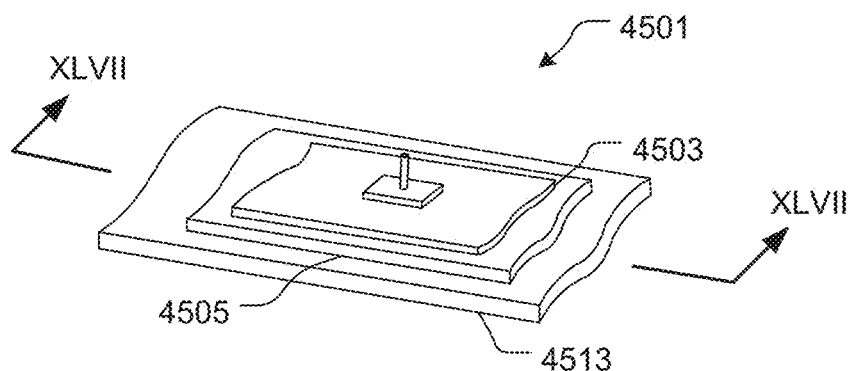
FIG. 46 shows an assembled oblique view of mounting system of FIG. 45.

Referring now to FIGS. 45 and 46, an alternative embodiment of mounting system 1501 is shown. FIG. 45 shows an exploded oblique view of mounting system 4501, while FIG. 46 shows an assembled oblique view of mounting system 4501. Mounting system 4501 is substantially similar in form and function to the mounting systems described above, namely, mounting system 4501 comprises one or more membranes adapted to secure an object to a structure, i.e., a polymeric membrane, rooftop, and/or other rigid or non-rigid type of structure. It should be appreciated that the features of mounting system 4501 could be incorporated in any of the foregoing mounting plates, and likewise, mounting system 4501 could be adapted to include the mounting plate features disclosed herein.

Mounting system 4501 comprises a second membrane 4503, substantially similar in function to membrane 1505, and a first membrane 4505. First membrane is preferably a flashing membrane, which securely bonds to a structure 4507, i.e., a rooftop at end 4509 and at end 4511 according to one or more of the bonding methods discussed above. It should be noted that the entire bottom surface of first membrane 4505 is not bonded to structure 4507 in the preferred embodiment. For this reason, mounting system 4501 is further provided with a bracket 4513 adapted to securely fasten a portion of first membrane 4505 to structure 4507. One or more fastener means 4515 are utilized to secure bracket 4513, which in turn secures a portion of first membrane 4509, to structure 4507. Bracket 4513 forms a hollow area 4517, which enables a portion of first membrane to extend therethrough when a force is exerted against mounting plate 4591 bonded to second membrane 4503.

In the preferred embodiment, a single bracket 4513 is utilized to secure first membrane 4505 to structure 4507;

however, it will be appreciated that alternative embodiments could include two or more brackets in lieu of the preferred embodiment. For example, an alternative embodiment could include a second bracket having a smaller diameter than bracket 4513 and adapted to fit within hollow area 4517. The two brackets provide additional means for securing the first membrane to the structure. In the preferred embodiment, bracket 4513 is composed of a metallic material; however, alternative embodiments could include different materials, i.e., wood, composite, plastic, and/or other suitable materials, both rigid and flexible, in lieu of the preferred embodiment. Bracket 4513 is also preferably circular in shape; however, it will be appreciated that alternative embodiments could include different geometric shapes, sizes, and embodiments wherein the bracket does not form a unitary body.

Referring now to FIGS. 47 and 48, respective cross-sectional and front views of mounting system 4501 are shown as a force F is exerted against mounting plate 4517. Mounting system 4501 is further provided with a bonding material 4701 utilized to bond a portion of second membrane 4503 to first membrane 4505 within hollow area 4517.

FIG. 48 shows the effects of force F exerted against mounting system 4501 when bracket 4513 is not utilized. As is shown, a large gap 4801 is formed between first membrane 4505 and structure 4507. In this exemplary depiction, first membrane 4505 remains securely bonded to structure 4507 at ends 4509 and 4511, while the remaining area is separated.

Figure 49:
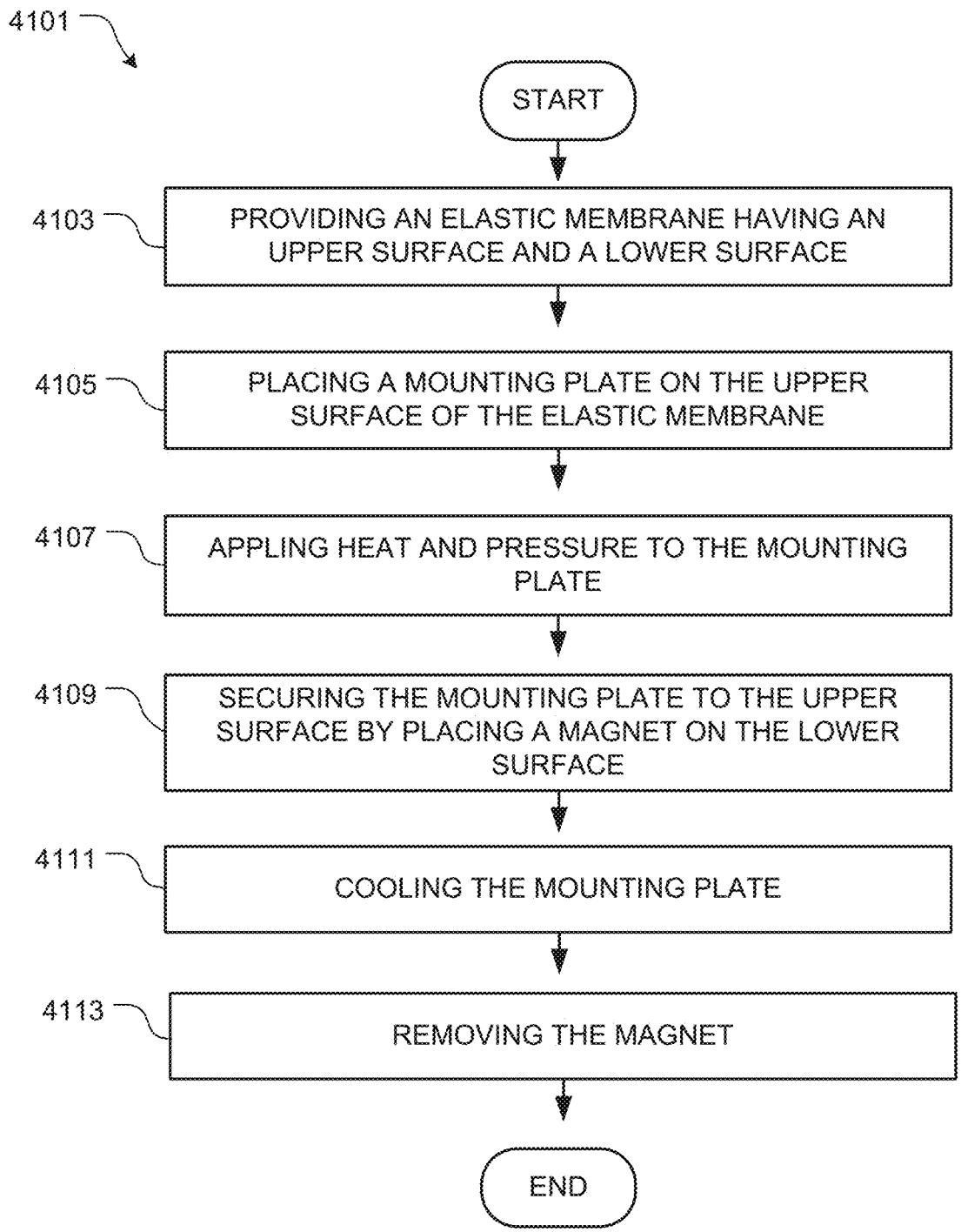
FIG. 49 is a flow chart depicting the preferred method of assembling a mounting system.

In FIG. 49, a flow chart depicting the preferred method of assembling a mounting system is shown. In particular, box 4903 depicts the first step, which includes placing a lower surface of a first membrane on a structure and bonding it thereto via one or more of the bonding methods discussed herein. Thereafter, a mounting plate is placed on an upper surface of the first membrane and securely attached thereto via a fastener, i.e., a screw or bolt, wherein the fastener is adapted to extend through the thickness of the mounting plate, first membrane and into the structure, as depicted in boxes 4905 and 4907. The fastener is countersinked into the mounting plate and a second membrane is placed thereon, as depicted in boxes 4909 and 4913. The second membrane has a hole for receiving a protrusion extending from the mounting plate. A bonding agent is applied to the top surface of the mounting plate and disposed between the lower surface of the second membrane and the top surface of the mounting plate, as depicted in boxes 4911 and 4915. In the preferred embodiment, the bonding agent and the second membrane are thermally fused together, and sufficient bonding agent is applied such that second membrane forms a fluidly sealed barrier between the top surface of the mounting plate and the lower surface of the second membrane. Thus, forming a fluidly sealed bond between the second membrane and the mounting plate. In the preferred embodiment, the bonding agent is one or more of the different types of bonding agents and/or adhesive described herein and preferably thermally fused at a temperature ranging between 300-700 degrees Fahrenheit. Finally a portion of the lower surface of the second membrane is bonded to the upper surface of the first membrane.

Figure 50:
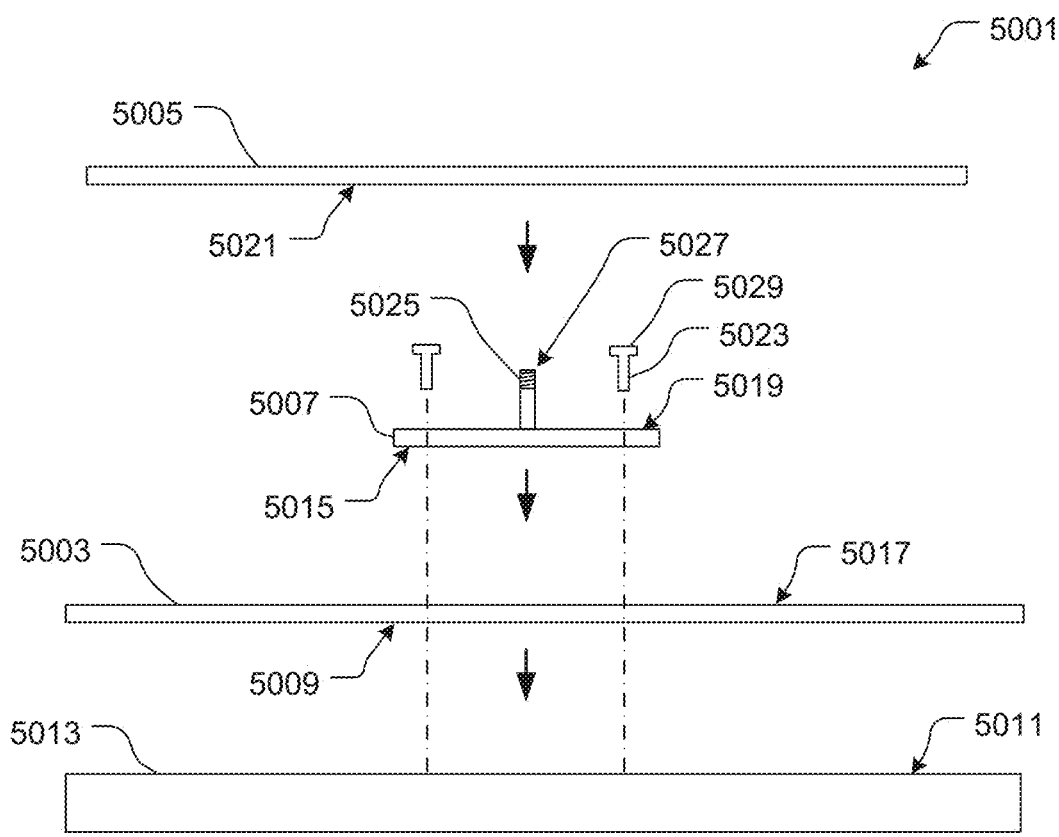
FIG. 50 is an exploded front view of a mounting system.
Figure 51:
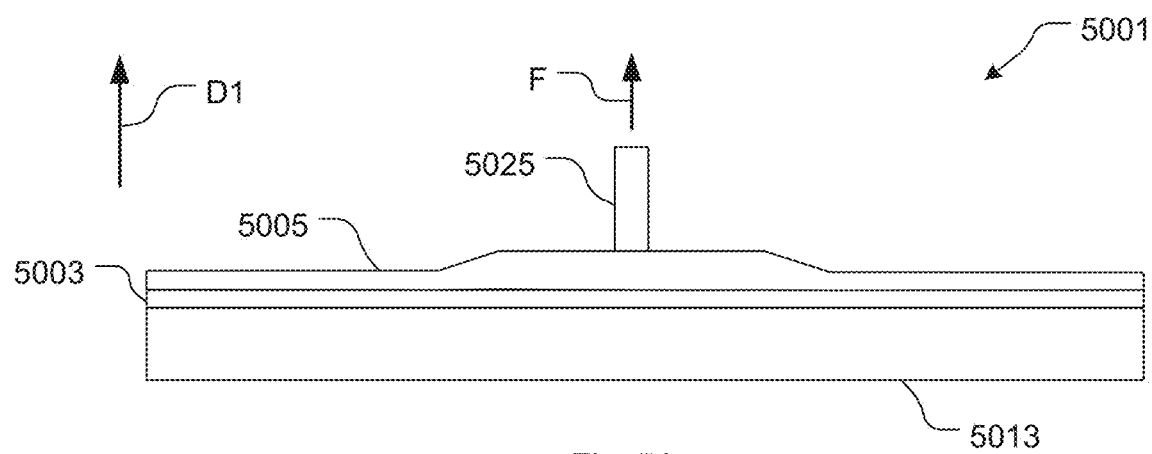
FIG. 51 is an assembled front view of the mounting system of FIG. 50.

Referring next to FIGS. 50 and 51, front views of an alternative embodiment of the mounting systems discussed herein are shown. In FIG. 50, a simplified unassembled front view of mounting system 5001 is shown, while FIG. 51 shows mounting system 5001 assembled and a force F1 being applied thereto. It will be appreciated that mounting system 5001 is substantially similar in form and function to one or more of the mounting systems discussed above, and is contemplated including the features discussed above, and vice-versa.

Mounting system 5001 securely fastens an object to the support structure. It is contemplated having mounting system 5001 being adapted to secure a riser to a roof structure, and more specifically, an array of photoelectric cells to a roof structure and/or a snow guard to a roof structure. However, it should be understood that mounting system 5001 should not be narrowly limited to these two applications and it is contemplated utilizing mounting system 5001 for other applications, all falling within the spirit of the present application.

In this embodiment, mounting system 5001 fastens to the support structure with one or more fasteners, which in turn provides effective means for securing an object to the structure via the mounting plate. Mounting system 5001 further comprises a second membrane, which preferably thermally fuses to both the first membrane and the mounting plate. When assembled, the mounting plate is sandwiched between the first and second membranes. To prevent water, dirt and other foreign objects from reaching the support structure, an adhesive is applied between the mounting plate and the second membrane and bonded thereafter, preferably by a thermal process. Further description and illustration of the features are discussed in detail below and shown in the corresponding figures.

Mounting system 5001 comprises one or more of a first elastomeric membrane 5003, a second elastomeric membrane 5005, and a mounting plate 5007. When assembled, mounting plate 5007 is sandwiched between first membrane 5003 and second membrane 5005. First membrane 5003 has a bottom surface 5009, which bonds to a top surface 5011 of a structure 5013. Mounting plate 5007 has a bottom surface 5015 that preferably bonds to a top surface 5017 of first membrane 5003 and a top surface 5019 that bonds to a bottom surface 5021 of second membrane 5005.

It will be appreciated that the method of assembly, including the bonding process and materials disclosed above, are optionally incorporated in the method for manufacturing and assembly of mounting system 5001.

In the preferred embodiment, mounting plate 5007 securely attaches to structure 5013 via one or more fasteners 5023. Fastener 5023 attaches to and extends through mounting plate 5007 via one or more countersunk holes 5201 (see FIG. 52). In the preferred embodiment, countersunk hole 5201 receives a head 5029 of fastener 5023, which in turn provides means for the top surface of head 5029 to sit flush with top surface 5019 of mounting plate 5007. This feature provides a flat contact surface area between top surface 5019 of mounting plate 5007 and bottom surface 5021 of second membrane 5005. In the exemplary embodiment, fastener 5023 has sufficient length to extend through the thickness of first membrane 5003 and partially through structure 5013. In the exemplary embodiment, fasteners 5023 are threaded bolts; however, it will be appreciated that other types of fasteners, i.e., screws, nails, and other suitable fasteners could be utilized in lieu of the preferred embodiment.

Mounting plate 5007 further comprises a protrusion 5025 extending from top surface 5019 and configured to secure an object (not shown) to mounting plate 5007. In the preferred embodiment, protrusion 5025 includes an attachment portion 5027 that is threaded for threadingly engaging to a threaded member of the object. However, attachment portion 5027 could easily be adapted with other surface treatments, i.e., a groove, and/or other devices configured to attach the object thereto.

In the preferred embodiment, second membrane 5005 includes a hole 5301 (see FIG. 53) for receiving protrusion 5025. During assembly, protrusion 5025 passes through hole 5301, which in turn attaches to the object being secured thereto. It should be understood that penetrating second membrane 5005 creates potential passage for water, dirt, and other undesired foreign debris that could damage structure 5013. To restrict these foreign debris from entering, mounting plate 5007 is further provided with an adhesive, preferably a thermal adhesive, which thermally fuses top surface 5019 thereto.

Figure 52:
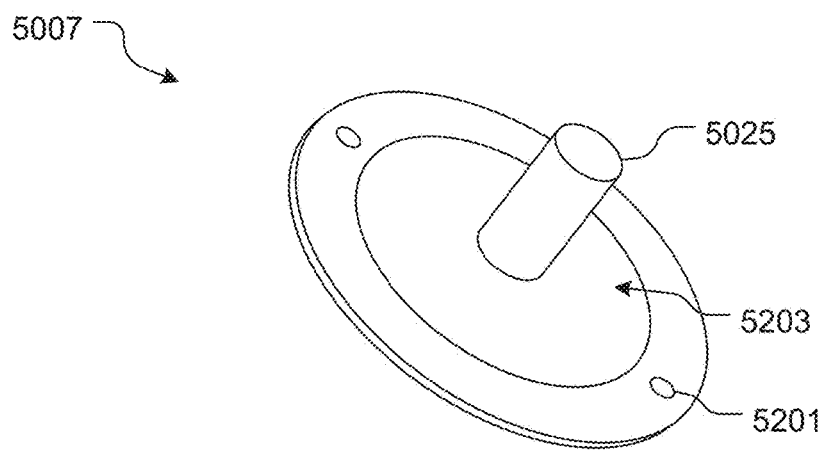
FIG. 52 is an oblique view of a mounting plate of the mounting system of FIG. 50.

Referring now to FIG. 52, an oblique view of mounting plate 5007 is shown. In the contemplated embodiment, protrusion 5025 is manufactured as an integral piece with mounting plate 5007. However, alternative embodiments could include protrusion 5025 and mounting plate 5007 being manufactured as separate pieces and thereafter assembled via one or more manufacturing processes known in the art. For example, protrusion 5025 could include a threaded portion for threading within a threaded channel formed through the centerline of mounting plate 5007 or alternatively, protrusion 5025 could be welded to mounting plate 5007.

Protrusion 5025 is preferably oriented at about 90 degrees relative to top surface 5019, resulting in no raised portions around protrusion 5025, which in turn creates a flat surface peripherally extending around protrusion 5025. In the exemplary embodiment, protrusion 5025 is a threaded rod; however, alternative embodiments could include different attachment means in lieu of the exemplary embodiment.

Mounting system 5001 is further provide with an adhesive 5203 applied to top surface 5019 of mounting plate 5007. Adhesive 5203 bonds mounting plate 5007 to second membrane 5005, which in turn prevents water and other foreign debris from passing through hole 5301. In the preferred embodiment, adhesive 5203 can be one or more of a thermal liquid plastic, thermal adhesive, liquid PVC, and/or plastisol. Of course, it should be appreciated that alternative embodiments could utilize different suitable adhesives in lieu of the preferred embodiment. In the preferred embodiment, heat and pressure is applied to both second membrane 5005 and adhesive 5203 during assembly such that second membrane 5005 thermally fuses with adhesive 5203.

Figure 53:
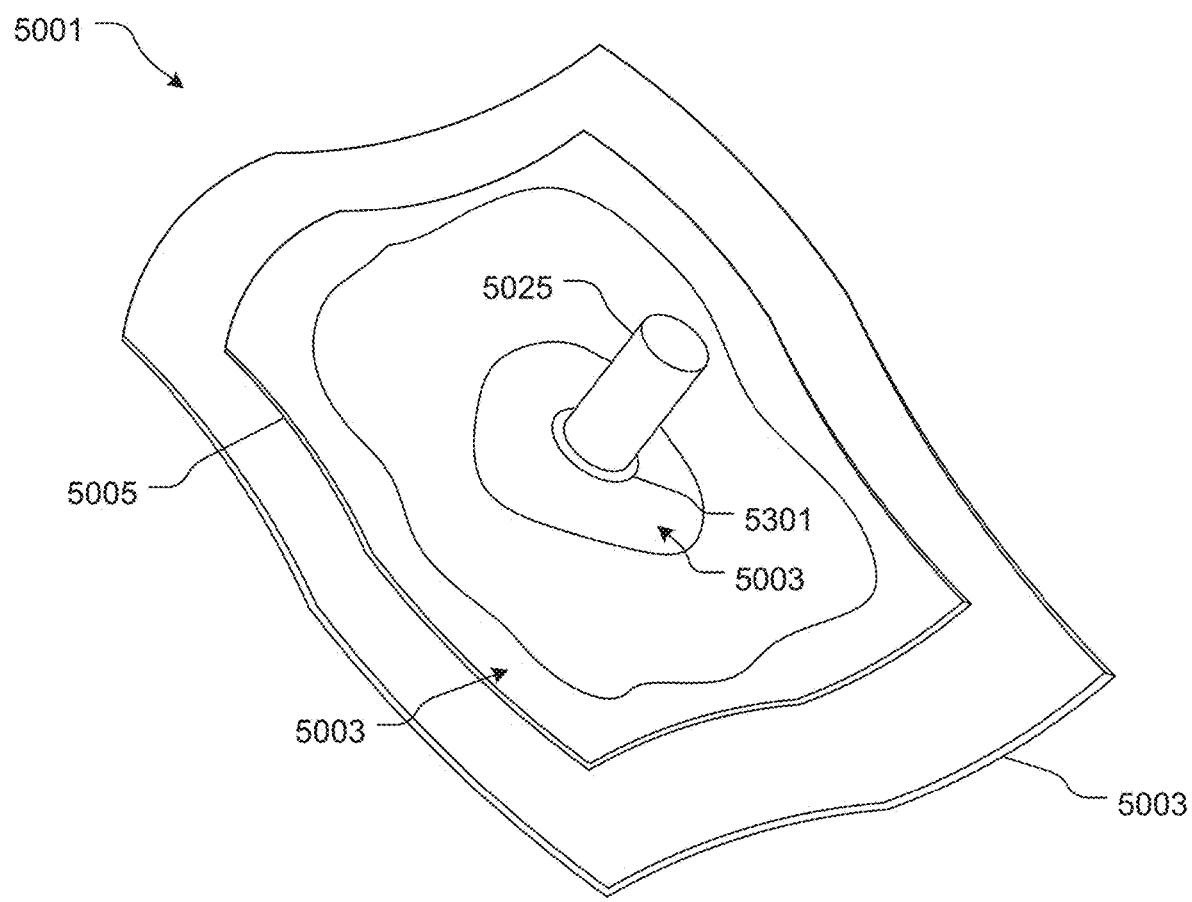
FIG. 53 is an oblique view of the mounting system of FIG. 51.

Referring now to FIG. 53, an oblique assembled view of mounting system 5001 is shown. The preferred method of assembling mounting system 5001 includes the process of first adhering the adhesive to the mounting plate. Next, the first membrane is bonded to the structure. Thereafter, the mounting plate is positioned on the first membrane and secured thereupon with one or more fasteners. The fasteners extend through both the mounting plate and first membrane to secure to mounting plate to the structure. A second membrane is placed over the mounting plate and a hole extending therethrough receives the protrusion of the mounting plate. Heat and pressure is applied to the second membrane and the adhesive, which in turn causes the second membrane to thermally fuse to the adhesive. Heat and pressure is also applied to other portions of the second membrane for thermally fusing the second membrane to the first membrane.

FIG. 53 shows the two areas fused through the preferred method of assembly. As discussed, heat and pressure is applied to the adhesive, which in turn causes a first area 5303 of the second membrane 5005 to thermally fuse to adhesive 5203. Heat and pressure can also be optionally applied to thermally fuse area 5305 to first membrane 5003. Thermally fused area 5303 prevents fluid and debris seepage through hole 5301, while area 5305 provides additional means to securely attach second membrane 5005 to first membrane 5003.

When assembled, the mounting system provides effective means to secure an object to the structure, i.e., via the mounting plate and fasteners, and effective means for preventing water and/or other foreign debris from damaging the structure, i.e., via the adhesive. It should also be appreciated that adhesive effectively seals passage between top surface 5019 of mounting plate 5007 and bottom surface 5021 of second membrane 5005 that other devices, i.e., nuts, caps, are not required to block passage of water and/or debris through hole 5301.

Figure 54:
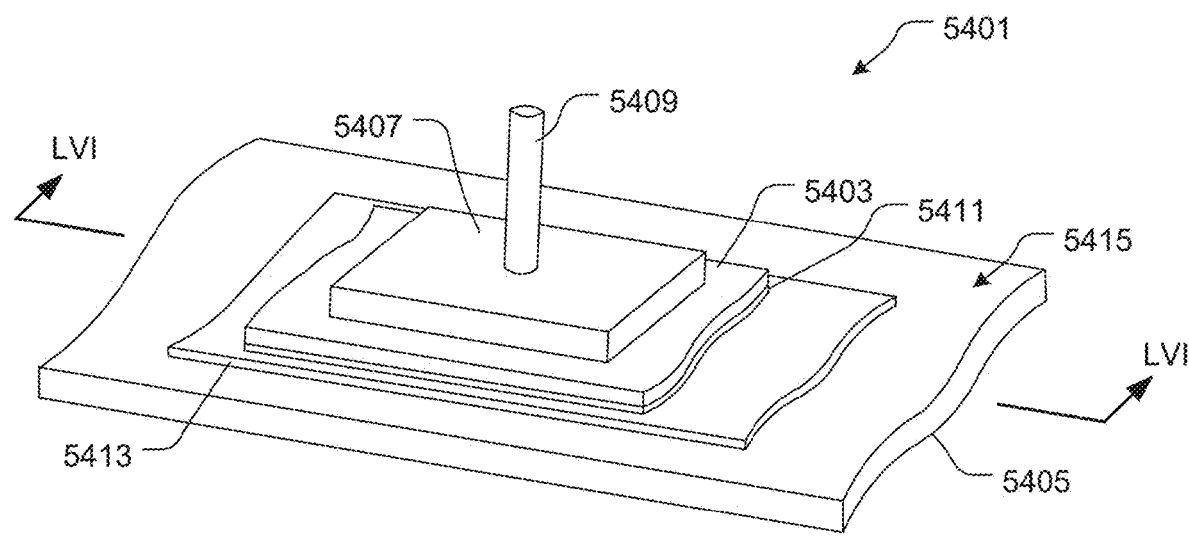
FIG. 54 is an oblique view of an alternative embodiment of the mounting system.

Referring now to FIG. 54, an alternative embodiment of mounting system 1501 is shown. Mounting system 5401 is substantially similar in form and function to the mounting systems described herein. In particular, mounting system 5401 utilizes one or more elastic membranes to securely attach an object to the support structure, which includes, but should not be limited to a polymeric membrane and/or a rooftop. Of course, it should be understood that mounting system 5401 is not intended to be limited to the figures and description below, but could include the features of the mounting system described herein and other modifications without departing from the spirit thereof, and likewise the mounting systems described herein could incorporate the features of mounting system 5801.

Mounting system 5401 comprises an elastic membrane 5403 bonded to both a structure 5405 and an object 5407. Elastic membrane 5403 is substantially similar in form and function to membrane 1505 described above, namely, elastic membrane 5403 is adapted to elastically stretch in a direction from structure 5405 as a force is exerted on object 5407. An optional protrusion 5409 couples to object 5407, which in turn attaches to a riser (not shown) and/or other structure associated with mounting system 5401.

Mounting system 5401 is further provided with a material 5411 preferably thermally fused to a lower surface 5701 of membrane 5403 (see FIG. 35). During assembly, an adhesive 5413 is applied to a top surface 5415 of structure 5405, and then membrane 5403 and material 5411 are placed on at least a portion of adhesive 5413. In the preferred embodiment, adhesive 5413 has a temperature sufficient to thermally bond with material 5411. Material 5411 is preferably composed of a non-woven absorbent polyester material; however, it should be appreciated that alternative embodiments could include other types of materials adapted to form a bond with adhesive 5413. Also, adhesive 5413 is preferably composed of an asphalt material, which is heated to form a bond with material 5411; however, it should be appreciated that alternative embodiments could include other forms of adhesive materials adapted to bond with material 5411.

Figure 55:
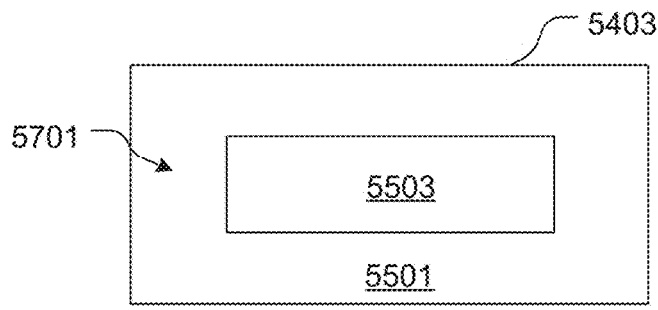
FIG. 55 is a bottom view of a membrane of the mounting system of FIG. 54.
Figure 56:
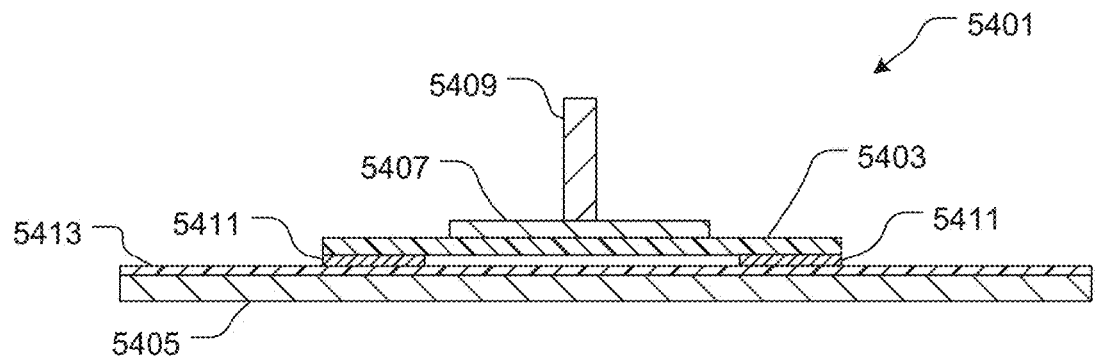
FIG. 56 is a cross-sectional front view of the mounting system of FIG. 54 taken at LVI-LVI.

Referring now to FIG. 55, a bottom view of membrane 5403 is shown. Lower surface 5701 preferably comprises two surface areas, a first surface area 5501 extending peripherally around a perimeter of lower surface 5701, and a second remaining surface area 5503, which is preferably enclosed within surface area 5501. In the preferred embodiment, material 5411 is bonded to surface area 5501, and forms a bond with adhesive 5413 applied to top surface 5415 of structure 5405, while area 5503 remains separable from top surface 5415 of structure 5405 such that area 5503 allows membrane 5403 to elastically extend in a direction away from structure 5405 as a force is exerted on object 5407 (see FIG. 20B). Further illustration of material 5411 is shown in at least FIG. 56, wherein a front cross-sectional view clearly shows material 5411 being partially applied to lower surface 5701 and surface area 5503 being separable from structure 5405.

Figure 57:
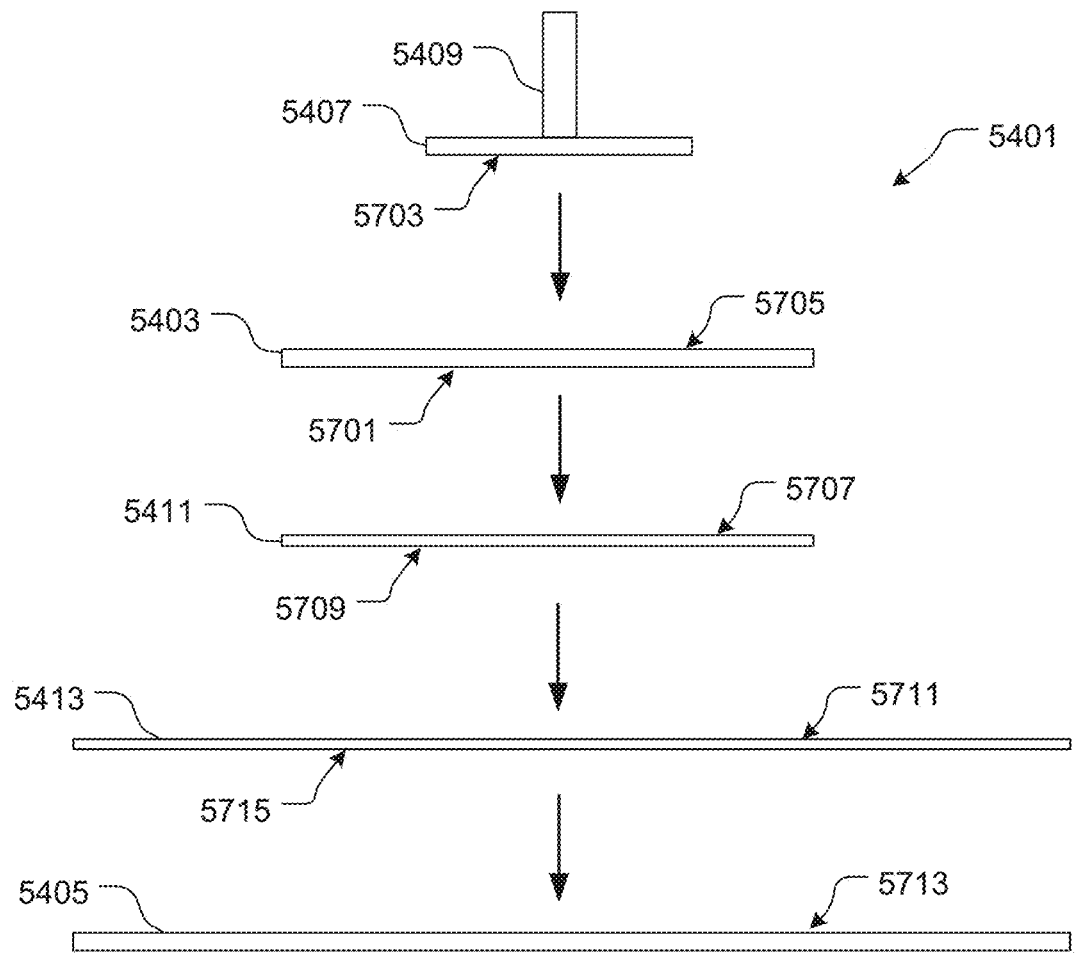
FIG. 57 is an exploded front view of the mounting system of FIG. 54.

Referring now to FIG. 57, an exploded front view of mounting system 5401 is shown. Object 1507 includes a bottom surface 5703 which bonds to an upper surface 5705 of membrane 5403. Membrane 5403 includes lower surface 5701 which bonds to a top surface 5707 of material 5411. Material 5411 includes a bottom surface 5709 which bonds to a top surface 5711 of adhesive 5413. Structure 5405 includes a top surface 5713 which bonds to a bottom surface 5715 of material 5403.

Figure 58:
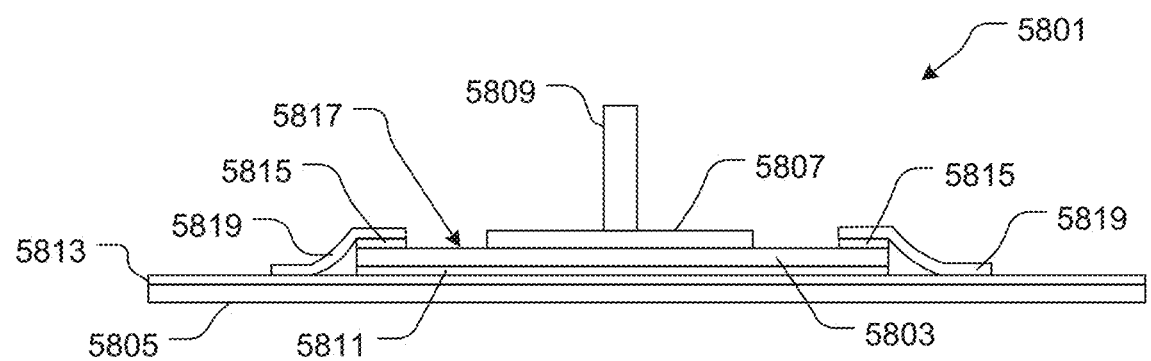
FIG. 58 is an alternative embodiment of the mounting system of FIG. 54.

In FIG. 58, a front view of an alternative embodiment of mounting system 5401 is shown. Mounting system 5801 is substantially similar in form and function to the mounting systems described herein. In particular, mounting system 5801 utilizes one or more elastic membranes to securely attach an object to the support structure, which includes, but should not be limited to a polymeric membrane and/or a rooftop. Of course, it should be understood that mounting system 5801 is not intended to be limited to the figures and description below, but could include the features of the mounting system described herein and other modifications without departing from the spirit thereof. It should also be appreciated that mounting system 5801 could include the features of the mounting systems described herein, and likewise the mounting systems described herein could incorporate the features of mounting system 5801.

Mounting system 5801 comprises an elastic membrane 5803 bonded to both a structure 5805 and an object 5807. Elastic membrane 5803 is substantially similar in form and function to membrane 5403 described above, namely, elastic membrane 5803 is adapted to elastically stretch in a direction away from the support structure as a force is exerted on object 5807. An optional protrusion 5809 couples to object 5407, which in turn attaches to a riser (not shown) and/or other structure associated with mounting system 5801.

Mounting system 5801 is provided with a material 5811, which attaches to a lower surface of membrane 5803. During assembly, an adhesive 5813 is applied to a top surface of structure 5805, and then membrane 5803 and material 5811 are placed on adhesive 5813, which in turn forms a bond between material 5811 and adhesive 5813.

Mounting system 5801 is further provided with a material 5815 bonded to an upper surface 5817 of membrane 5803. A second bonding adhesive 5819 is applied over at least a portion of material 5815 and applied over at least a portion of adhesive 5813. Material 5815 and adhesive 5819 are adapted to further secure membrane 5803 to structure 5805.

In the preferred embodiment, both material 5811 and material 5815 are composed of a non-woven absorbent polyester material; however, it should be appreciated that alternative embodiments could include other types of absorbent materials adapted to form a bond with adhesive 5813 and/or adhesive 5819. In the preferred embodiment, both adhesive 5813 and adhesive 5819 are composed of a hot asphalt material; however, alternative embodiments could include other forms of adhesive materials adapted to bond with material 5811 and material 5815.

Referring next to FIGS. 59-64, different embodiments of an adjustable riser are shown. It will be appreciated that the contemplated embodiments are operably associated with the mounting systems discussed herein, and that the features of an adjustable riser can easily be incorporated with one or more of the risers above.

Figure 59:
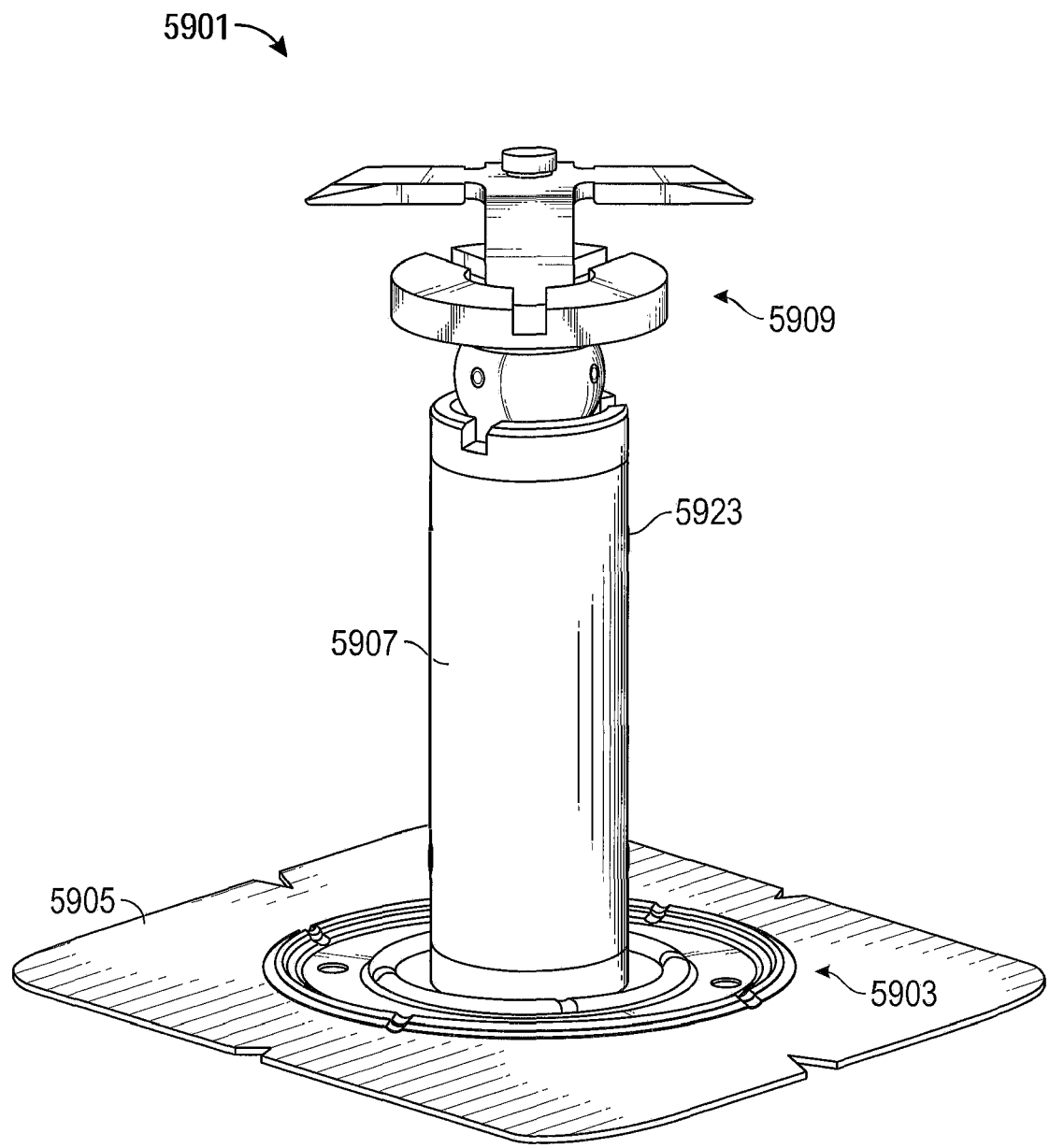
FIG. 59 depicts an oblique view of an adjustable riser according to one embodiment of the present application.

FIG. 59 depicts an oblique view of an adjustable riser 5901 according to one embodiment of the present application. Riser 5901 is configured to secure an object (not shown) to a support structure. For example, riser 5901 could be utilized in the field of roofing systems, wherein the object being supported thereto could include solar panels. However, it will be appreciated that the adjustable riser can adjustable support other types of objects in lieu of the contemplated embodiment.

Riser 5901 preferably securely mounts to a mounting plate 5903, which in turn is thermally bonded to a surface 5905 elastically secured to the structure. This feature allows slight movement of riser 5901 relative to the support structure. Riser 5901 comprises one or more of an extension 5907 and an attachment means 5909. Extension 5907 is preferably a cylindrical tube; however, alternative embodiments could include different structures in lieu of a tube.

Attachment means 5909 provides effective means for attaching the object at different angles relative to the mounting plate. In the contemplated embodiment, attachment means 5909 is a ball matingly engaged with a socket. This configuration allows the ball to be rotatably positioned within the socket and secured with one or more fasteners. This feature enables easy and efficient means for adjustably securing the object to the structure. For example, in the roofing industry, the roof structures are typically uneven and oriented at various angles. Having an adjustable riser with the features disclosed herein provide significant advantageous, including the ability to level the object relative to an unlevel roof structure.

Figure 60:
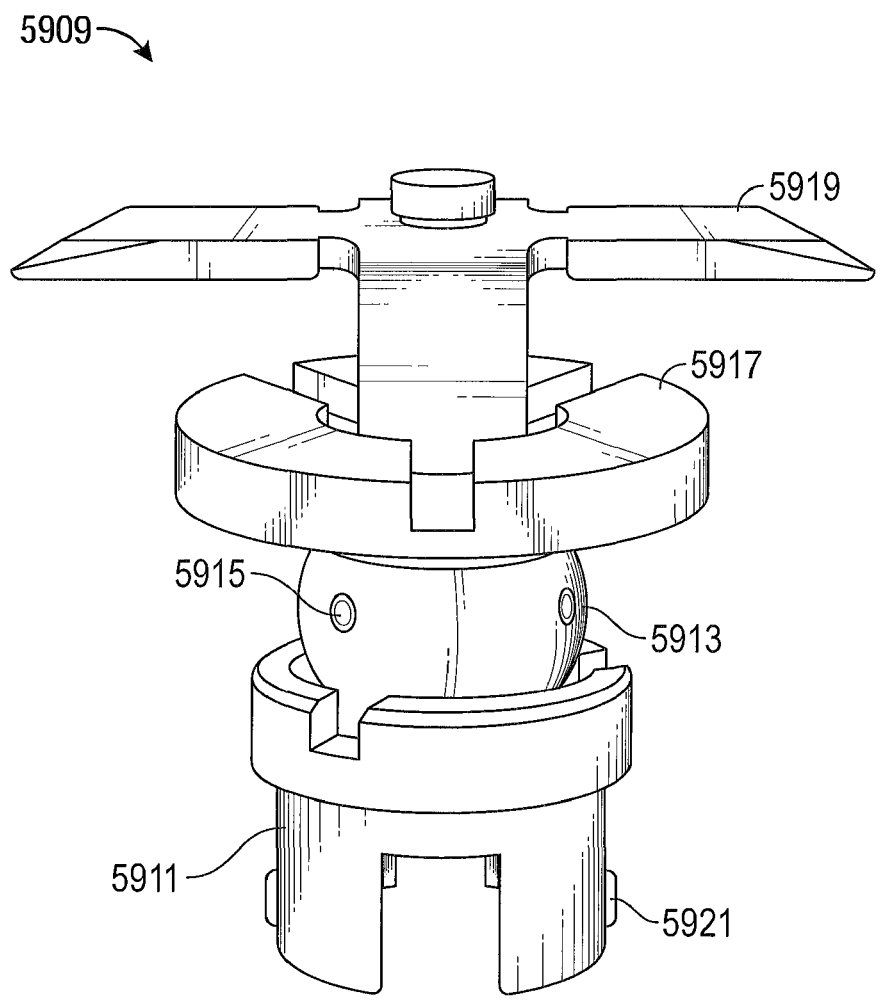
FIG. 60 depicts an oblique view of an attachment means of the adjustable riser FIG. 59.

FIG. 60 depicts an oblique view of attachment means 5909. In the preferred embodiment, attachment means 5909 comprises one or more of a first member 5911 configured to securely fasten to shaft 5907 having a socket 5913 for receiving a ball 5914 (see FIG. 61) therein. One or more fasteners 5915 are utilized to secure the ball within socket 5913. A member 5917 rigidly attaches to the ball and is utilized as a platform for securing the object thereto. A coupling device 5919 is also utilized to secure the object to member 5917. Attachment means 5909 is further provided with one or more locking devices 5921 configured to fit within one or more holes 5923 (see FIG. 59) extending through the thickness of shaft 5907.

Figure 61:
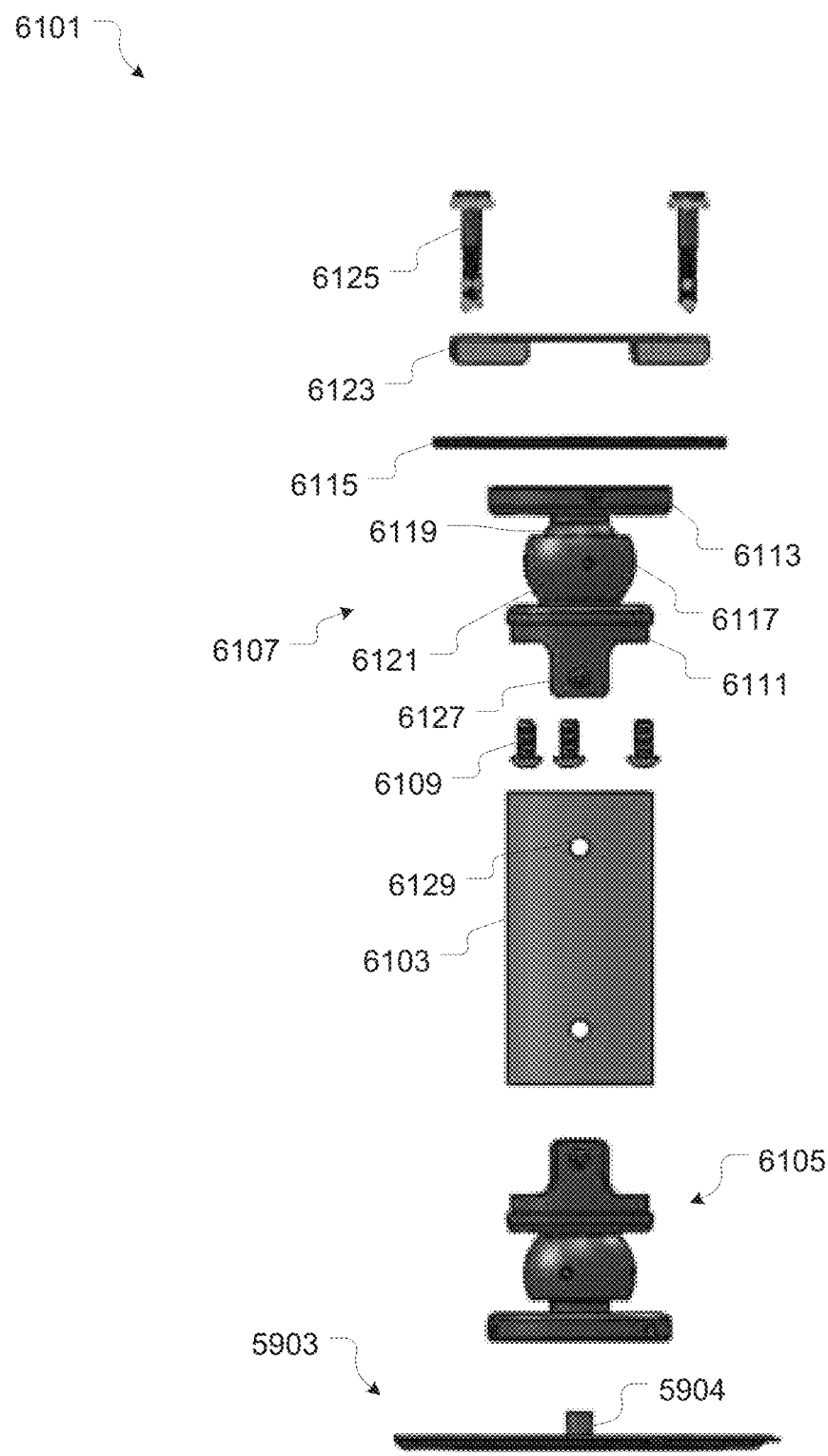
FIG. 61 depicts front exploded view of alternative embodiment of the adjustable riser.
Figure 62:
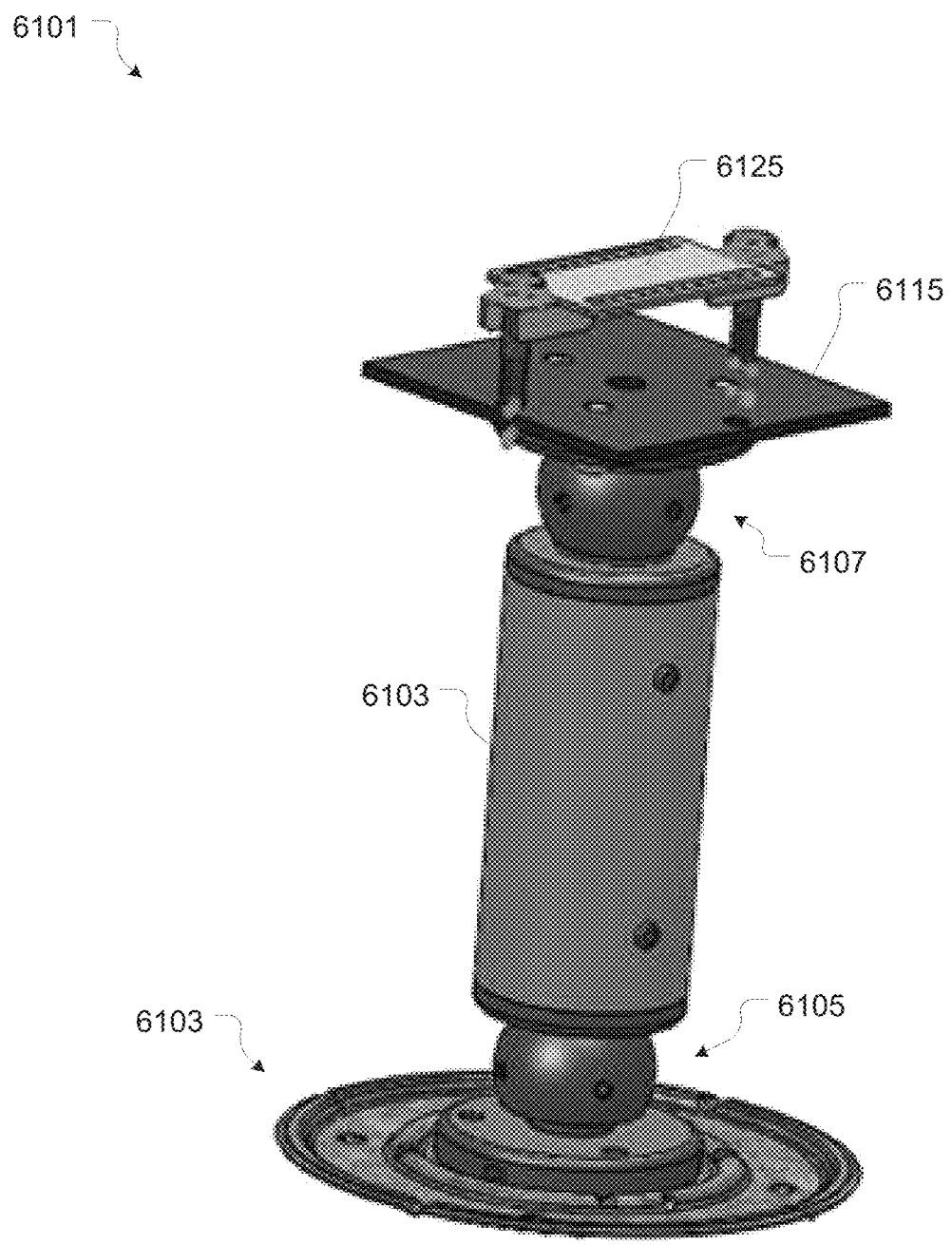
FIG. 62 depicts an oblique assembled view of the adjustable riser of FIG. 61.

Turning next to FIGS. 61 and 62 in the drawings, respective exploded and assembled views of an alternative embodiment of riser 5901 is shown. Adjustable riser 6101 is substantially similar in function to riser 5901, and the features therein could be incorporated herein.

Riser 6101 comprises one or more of an extension member 6103 configured to elevate the object at a height relative to the support structure that riser 6101 is attached thereto. In this embodiment, riser 6101 comprises two adjustment means at distal ends of extension member 6103: a first adjustment means 6105 and a second adjustment means 6107. In the exemplary embodiment, adjustment means 6105 securely attaches to a protrusion 104 of mounting plate 5903, while adjustment means 6107 securely attaches to member 6103 via one or more fasteners 6109. Both adjustment means 6105 and 6107 are substantially similar in form and function, and for ease of description, the components of adjustment means 6105 is discussed below. It will be appreciated that the features of attachment means 6105 is substantially similar in form and function to attachment means 5909 discussed above.

Adjustment means 6107 comprises a first member 6111 configured to securely fasten to extension member 6103 and a second member 6113 configured to securely fasten to a platform 6115 for securing an object thereto. In the exemplary embodiment, member 6111 and member 6113 are rotatably coupled to each other. Specifically, member 6111 include a cup-shaped socket 6117 configured to receive a ball 6119 of second member 6113. The socket allows rotational movement of the ball therein. One or more fasteners 6121 extend through the thickness of socket 6119 and are utilized to secure the ball in a fixed position. Riser 6101 further comprises an attachment device 6123 securely fastened to platform 6115 via one or more fasteners 6125. Further, riser 6101 is provided with a locking device 6127 configured to engage with a hole 6129 extending through the thickness of extension member 6103. It will be appreciated that riser 6101 could include a single adjustment means in lieu of the preferred embodiment.

Figure 63:
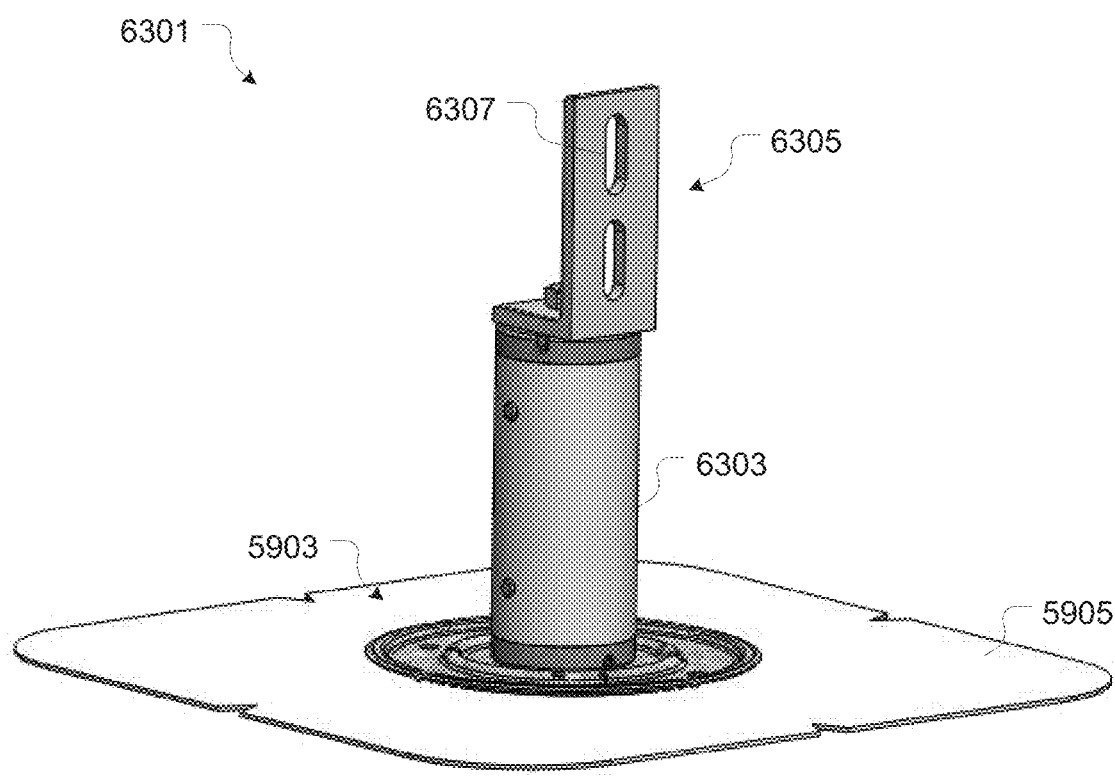
FIG. 63 depicts an oblique view of an alternative embodiment of an adjustable riser.

Referring to FIG. 63 in the drawings, an oblique view of an alternative adjustable riser 6301 is shown. Riser 6301 comprises one or more of a shaft 6303 configured to elevate an attachment means 6305 at a height relative to an attached surface 5905 such as a membrane. In the exemplary embodiment, attachment means 6305 is formed in a L-shaped configuration and configured to adjustable support the object thereto via one or more slots 6307. When assembled, the object securely attaches to slots 6307 via a fastener (not shown), which can be adjusted therein.

Turning next to FIGS. 64A-64D in the drawings, various views of an adjustable riser 6401 are shown. It will be appreciated that riser 6401 is substantially similar in function to one or more of the risers disclosed herein, and could easily include the features of the foregoing risers, and likewise, the features of riser 6401 could easily be incorporated in any one of the above risers. In the preferred embodiment, riser 6401 is configured to secure a solar panel to a roof structure; however, it will be appreciated that riser 6401 could easily be adapted to securely fasten other types of objects to a roof structure and/or other types of support structures. It will be appreciated that riser 6401 is adjustable, allowing adjustment of height, longitudinal direction, and lateral direction relative to the mounting plate attached thereto. It should also be appreciated that riser 6401 can also be pivotally adjusted to the mounting plate. Further illustration and description of these features are provided below.

Referring specifically to FIG. 64A in the drawings, a side view of riser 6401 is shown in an extended position. Riser 6401 comprises one or more of a base member 6403 adjustably coupled to an attachment member 6405 via one or more attachment means 6407.

Attachment means 6407 includes a plurality of interlocking channels configured to prevent movement in directions D2 and D3, as depicted in FIGS. 64B and 64C. More specifically, base member 6403 includes a first set of interlocking channels 6409, adapted to engage with a second set of interlocking channels 6411 on member 6405. The two interlocking channels include two opposing surfaces 5410 oriented at an angle less than 90 degrees relative to an inner surface 6412. The orientation of surfaces 5410 prevents movement in directions D2 and D3 as the interlocking channels engage. The assembly process includes sliding the two sets of interlocking channels in direction D1 relative to each other. Thereafter a fastener and/or other suitable device can be utilized to secure the interlocking channels in a relatively fixed position.

It should be appreciated that the height of riser 6401 is easily adjusted via attachment means 6407. Riser 6401 preferably includes a fastener 6413 such as a punch and/or other suitable securing means configured to securely attach base member 6403 to attachment member 6405 so as to prevent movement in directions D1, D2, and D3. In the preferred embodiment, fastener 6413 is a bolt threadingly attached to a nut; however, other suitable fastening means could easily be utilized in lieu of the bolt-nut embodiment. Fastener 6413 is configured to pass through a first channel 6415 extending through the thickness of base member 6403 and pass through a second channel 5416 extending through the thickness of attachment member 6405.

Attachment means 6407 is one of many different types of devices utilized to securely adjust the height of attachment member 6405 relative to base member 6403. Alternative embodiments could include different attachment means in lieu of the preferred embodiment. For example, a clip, snap-on, quick-release device, adhesive, and/or other suitable surface treatment or device could be used.

Base member 6403 is configured to securely attach riser 6401 to a mounting plate 6417. Mounting plate 6417 is substantially similar in form and function to one or more of the mounting plates discussed above. In the preferred embodiment, mounting plate 6417 thermally bonds to an elastic membrane attached to the support structure. Mounting plate 6417 includes a contoured surface area 6419 that receives the head of a fastener 6421. A bottom surface 6423 of base member 6403 preferably sits on contoured surface area 6419 and coupled thereto via a fastener 6421. Fastener 6421 is preferably a nut tightened to both base member 6403 and mounting plate 6417 so as to create a tight fit therebetween, which in turn securely fastens riser 6401 to mounting plate 6417.

Base member 6403 further comprises one or more optional footings 6425 configured to rest on a top surface 6427 of mounting plate 6417. Footings 6425 provide additional rigidity and support so as to prevent pivoting movement of riser 6401 while attached to mounting plate 6417. However, it will be appreciated that alternative embodiments could include a contoured bottom surface 6423 without footings 6425, which allows base member 6403 to pivotally couple to mounting plate 6417. This pivoting feature allows the riser to pivotally attach an object to the support structure.

Attachment member 6405 is provided with an attachment means 6429 for coupling with the object supported by riser 6401. In the preferred embodiment, attachment means 6429 is a hole extending through the thickness of attachment member 6405. A fastener, e.g., a bolt, from the object passes through attachment means 6429 and securely attaches thereto. It will be appreciated that alternative embodiments could include different attachment means in lieu of the preferred embodiment. For example, a clip, snap-on, quick-release device, adhesive, and/or other suitable device or surface treatment could be used. Also, attachment means 6429 could comprise a threaded hole for fastening with a threaded fastener.

Referring now specifically to FIG. 64D in the drawings, a top view of riser 6401 and plate 6417 is shown. Base member 6403 further comprises a channel 6431 for adjustably receiving fastener 6421. The channel allows adjustment of riser 6401 in direction D1.

It should be understood that the exemplary embodiment of riser 6401 shown in FIGS. 64A-64D is one of many different types of embodiments falling within the spirit of the present application. It will be appreciated that alternative embodiments could include different fastening means for making adjustment of the two members relative to each other and relative to the mounting plate. Further, although shown having a C-shaped configuration when assembled, it will be appreciated that the two coupled members could be coupled to form other configurations, e.g., an S-shaped configuration, in lieu of the exemplary embodiment.

Turning next to FIGS. 65A-65D in the drawings, various views of a riser 6501 are shown. It will be appreciated that riser 6501 is substantially similar in form and function to riser 6401, but with the additional feature of providing added support and rigidity with two sidewalls and two attachment means. Riser 6501 could include one or all of the features found in riser 6401, and likewise, the features of riser 6501 could be incorporated in riser 6401.

Referring now specifically to FIG. 65A in the drawings, a front view of riser 6501 is shown in an extended position. Riser 6501 comprises of a base member 6503 adjustably coupled to an attachment member 6505. The two members securely fasten to each other via a first attachment means 6507 and a second attachment means 6508. In the preferred embodiment, both base member 6503 and attachment member 6505 are manufactured as C-shaped channels, which provided additional rigidity and support to an object attached thereto.

Both attachment means 6507 and 6508 includes a plurality of semi-circular ridges configured to slindingly engage within a plurality of grooves. Base member 6503 includes ridges 6509 that protrude from an outer surface 6511 and configured to fit within channels 6513 extending inwardly from an inner surface 6515 of attachment member 6505. The assembly process includes sliding attachment member 6505 relative to base member 6503 in direction D1 such that the plurality of ridges fit snugly within the plurality of grooves. When assembled, the attachment means prevents movement in direction D2, while the sidewalls prevent movement in direction D3.

The exemplary attachment means is one of many different types of attachment surface treatments that can be used to securely adjust and fasten the two members together. Alternative embodiments of riser 6501 could include different attachment means, e.g., clips, snaps, quick-release devices, adhesives, and other suitable attachment surface and/or device, in lieu of the preferred embodiment.

Attachment member 6505 is utilized to couple an object to riser 6501. Attachment member 6505 includes an attachment means 6529 for coupling with the object attached thereto. In the preferred embodiment, attachment means 6529 is a hole extending through the thickness of attachment member 6505. During assembly, a fastener, e.g., a bolt, passes through attachment means 6529 and is secured thereto via a nut. It will be appreciated that alternative embodiments could include different attachment means in lieu of the preferred embodiment. For example, a clip, snap-on, quick-release device, adhesive, and/or other suitable device or surface treatments could be used. Also, attachment means is preferably threaded for receiving a threaded fastener.

Referring now specifically to FIG. 65B in the drawings, a cutout view of riser 6501 is shown taken at 8B. Riser 6501 securely attaches to a mounting plate 6517 via a fastener 6519. Base member 6503 preferably includes one or more footings 6521 that sit on a top surface 6523 of mounting plate 6517. In the exemplary embodiment, mounting plate 6517 includes a raised surface area 6525 for receiving the head of fastener 6519. Base member 6523 is positioned above raised surface area 6525 and a lower surface 6527 preferably rests directly on raised surface 6525 and fastened thereto via fastener 6519.

Figure 65D:
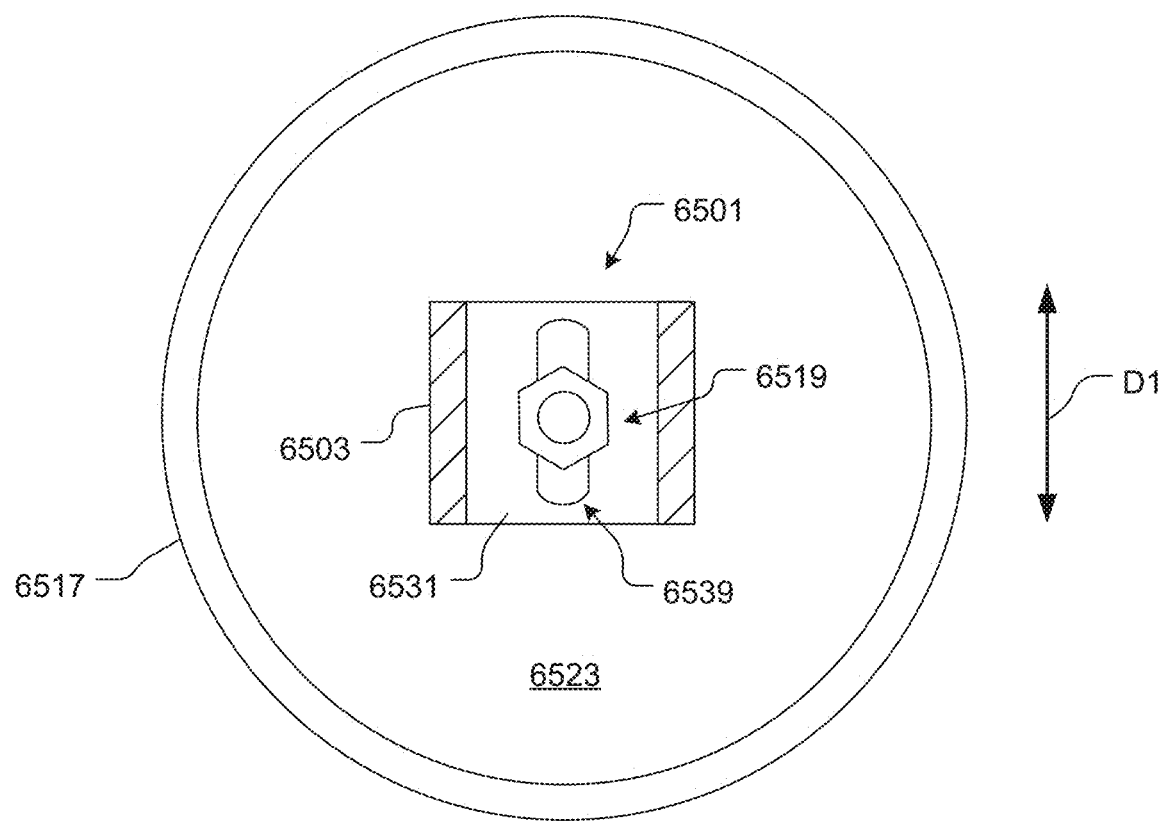

Base member 6503 preferably includes footings 6521 having channels 6531 for receiving and supporting a base support 6537. Base support 6537 includes ridges 6533 for slidingly engaging within channels 6531. The channel-ridge feature allows base member 6503 to selectively adjust in direction D1, as shown in FIG. 65D. When assembled, fastener 6519 securely tightens base support 6537 to mounting plate 6517.

Referring to FIG. 65C in the drawings, a side view of riser 6501 is shown. Riser 6501 is optionally provided with a channel 6535 extending through both base member 6503 and attachment member 6505 and configured to receive a fastener (not shown) for securing the two members together. The fastener prevents movement of attachment member 6505 in directions D1, D2, and D3 relative to member 6503.

FIG. 65D shows a top view of riser 6501 attached to mounting plate 6517. Riser 6501 further includes a channel 6539 extending through the thickness of base member 6503 and configured to receive fastener 6519. Channel 6531 allows selective adjustment of riser 6501 in direction D1.

Figure 66:
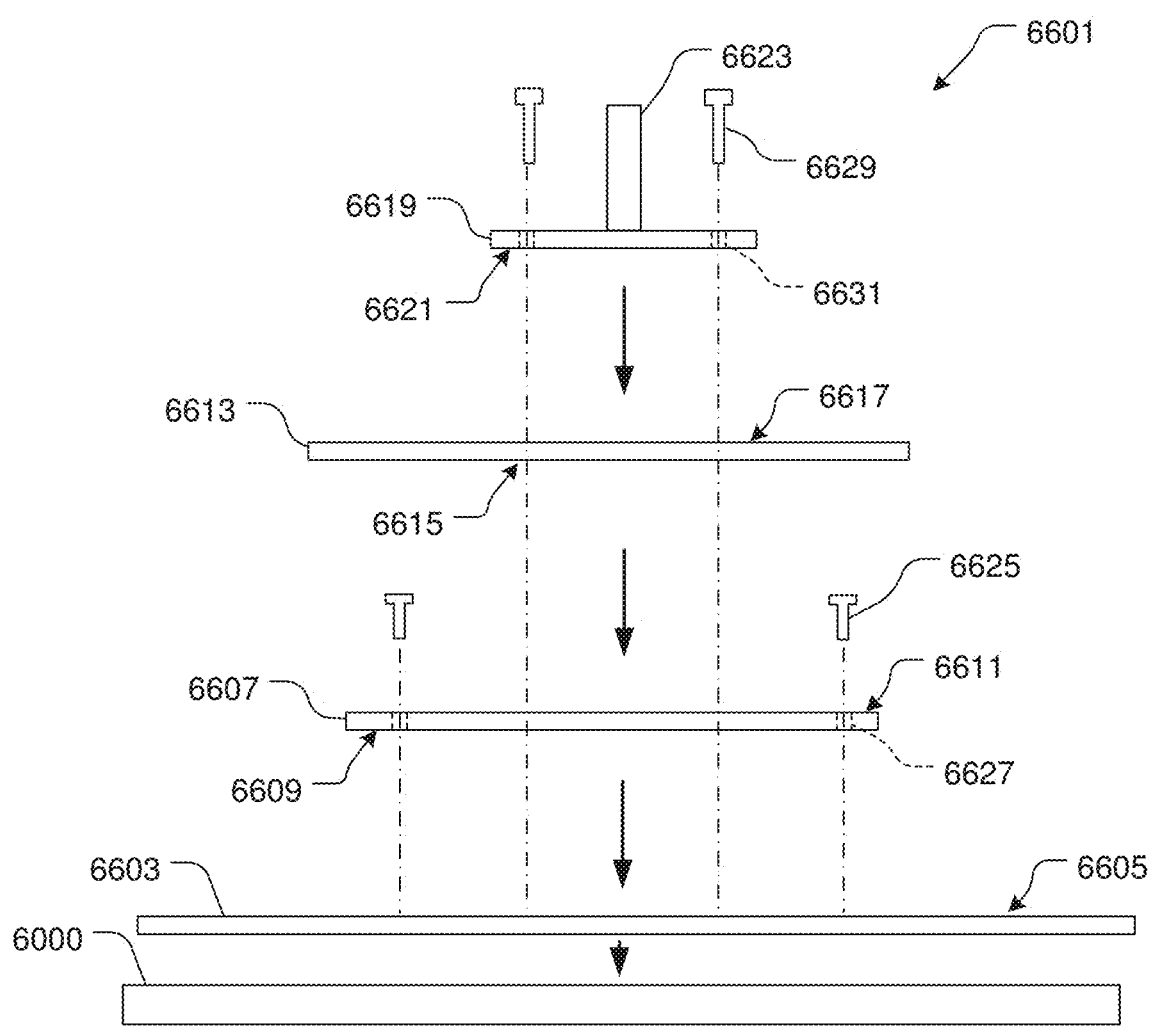
FIGS. 66 and 67 are front views of a mounting system in accordance with a preferred embodiment of the present application.
Figure 67:
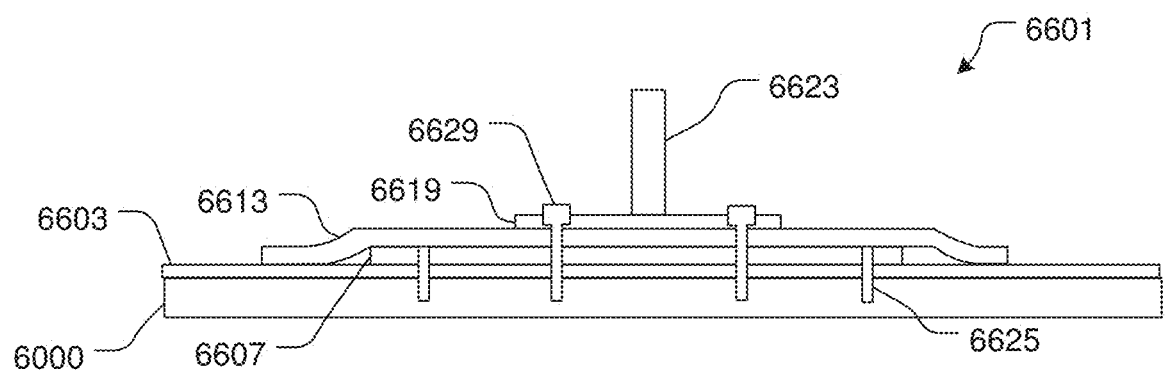
Figure 68:
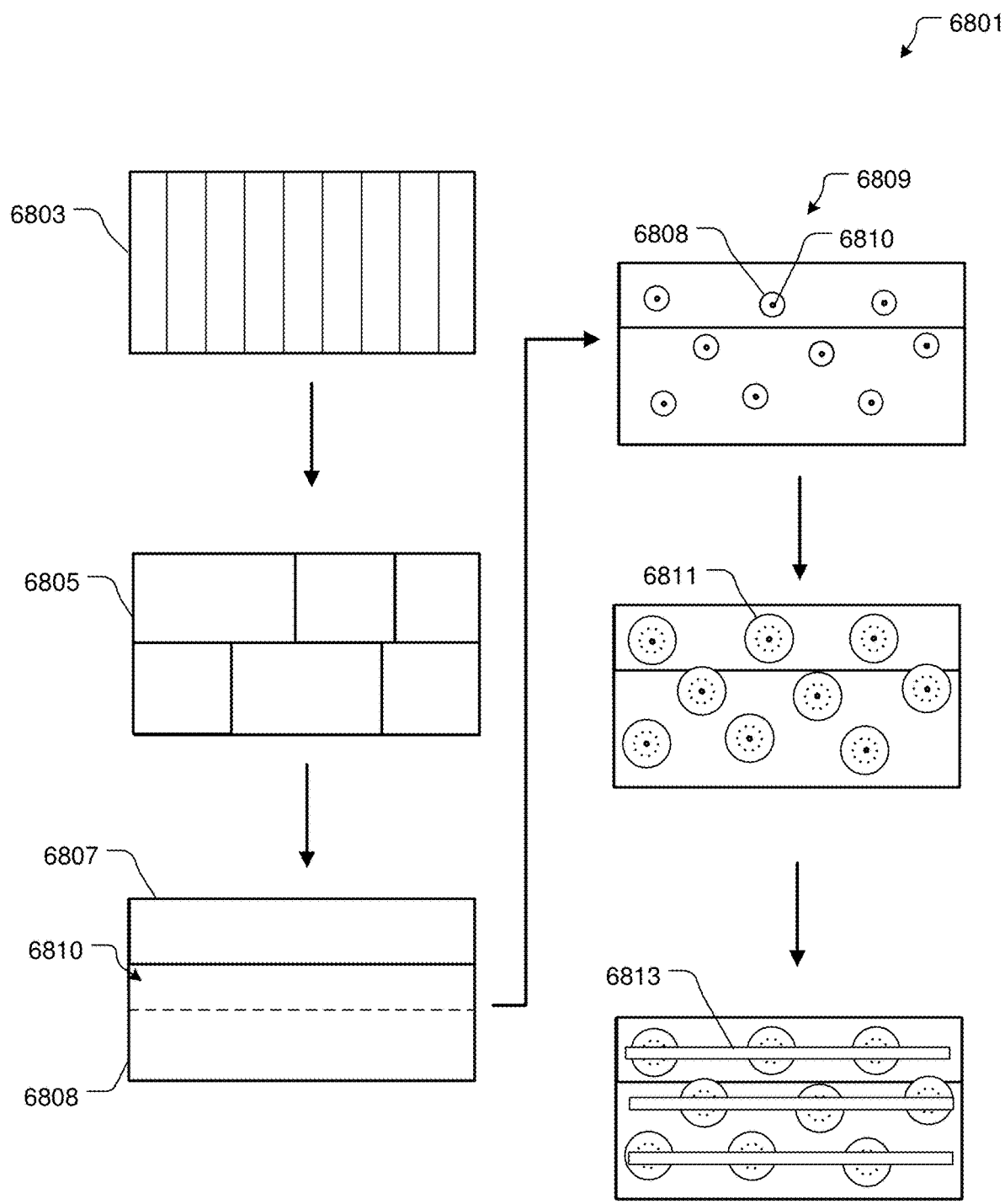
FIG. 68 is a simplified flowchart depicting a method to install fasteners and a roofing membrane to a roof structure in accordance with a preferred embodiment of the present application.

Referring now to FIGS. 66 and 67, respective exploded and assembled front views of a system 6601 is shown in accordance with an alternative embodiment of the present application. It will be appreciated that system 6601 is substantially similar in form and function to one or more of the systems discussed above and hereby incorporates the features discussed herein.

In the alternative embodiment, the system 6601 utilizes a rigid member 6607 configured to secure the mounting plate 6619 to the first membrane 6603 in a fixed position. It should be understood that the rigid member 6607 efficiently provides additional contact surface area for increase support and rigidity.

System 6601 includes one or more of a rigid member 6607 having a bottom surface 6609 that engages with a top surface 6605 of first membrane 6603 and a top surface 6611 that engages with a bottom surface 6615 of second membrane 6613. In the contemplated embodiment, also shown in FIG. 67, a portion of the second membrane 6613 is configured to adhere to the first membrane, thereby sandwiching the rigid member between the second membrane and the first membrane.

System 6601 is further provided with a mounting plate 6619 having a bottom surface 6621 configured to engage with the top surface 6617 of second membrane 6613. The process of adhering the mounting plate to the second membrane is discussed above and the manufacturing process is hereby incorporated in the present embodiment.

A riser 6623 is secured to the mounting plate 6619 via one or more types of fastening means discussed above and is configured to secure an object to the mounting plate.

One of the unique features believed characteristic of the present embodiment is the use of a plurality of fasteners 6627, 6629 configured to extend through respective holes 6627, 6631 of respective rigid member 6607 and mounting plate 6619. The fasteners provide means to secure the rigid member and the mounting plate directly to the roof member 6000.

Another unique feature believed characteristic of the present embodiment is the ability to prevent water from penetrating the roof member by sandwiching the rigidly member between the first and second membranes and thereafter bonding the membranes together. Although not shown, it should be understood that the rigid member is peripherally surrounded by a portion of the second membrane to form a sealed fluid area to contain the rigid member therein and to prevent water from coming into contact with the rigid member.

Referring now to FIG. 67, a system 6701 is shown in accordance with one preferred embodiment of the present application to install fasteners and roof membranes to a roof structure. It will be appreciated that the system 6701 includes one or more of the features of the systems discussed above. Specifically, the system 6701 utilizes one or more of the membrane embodiments, risers, and other features discussed herein to install the fasteners and roof membranes to the roof structure.

In the contemplated embodiment, system 6801 preferably includes one or more of the steps of installing a plurality of plywood sheets 6805 to a roof structure 6803 in the orientation depicted. Thereafter, the roofing membranes 6807 and 6808 are placed on the plywood sheets 6805 and secured in location via a plurality of mounting plates 6809. In the contemplated embodiment, a plurality of roofing membranes 6807, 6808 are secured to each other at overlapping section 6810 via one or more bonding methods discussed herein for securing two elastic materials to each other. For example, the process could include heat welding the elastic roofing membranes to each other. It should be understood that the plurality of mounting plates 6809 include a plate 6808 having a surface area along with a protrusion 6810 that extends from the plate, similar to the mounting plates discussed above.

A plurality of fasteners secure to the mounting plate and are secured directly to the plywood sheets 6805 and the roofing membrane 6807. In the contemplated embodiment, the fasteners could include one or more of screws, bolts, or the like that extend through the membrane and secure to the plywood, similar to one or more of the processes discussed above with the various types of mounting plates with fasteners extending through the mounting plate to secure the mounting plate to the roof structure.

After the mounting plates are secured to the roofing membrane and the plywood sheets via the fasteners, a second membrane 6811 is placed over the mounting plates 6809 and adhered to the roofing membrane 6807. The second membrane is preferably heat welded; however, one or more processes to secure the second membrane to the roof membrane discussed above could also be utilized. In an alternative embodiment, the process discussed herein could be achieved with asphalt and/or fiber material.

The last step to assembly system 6801 is to secure an object 6813 to the protrusion of the mounting plate. A process to secure objects to a mounting plate protrusion is discussed in detail above. In the contemplated embodiment, the object 6813 is a rail that engages with multiple protrusions and secures one or more solar panels to the roof structure. It should be appreciated, however, that the protrusion extending from the plate is an optional feature. The plate could be used to merely secure the roofing membrane and plywood directly to the roof structure.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention.

Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A mounting system for attaching an object to a roof structure having a roof membrane, comprising:
    a mounting plate having:
        a body, the body forming a circular base; and
        a threaded cylindrical protrusion extending from and rigidly attached to a top surface of the body, the threaded cylindrical protrusion is at least partially threaded and configured to threadedly attach the object to the mounting plate;
    an elastic membrane secured to the roof membrane, the elastic membrane having at top surface, a bottom surface, a peripheral edge, and a thickness extending from the bottom surface to the top surface, the elastic membrane having an opening extending through the thickness, the elastic membrane is secured solely around the peripheral edge such that an inner portion surrounded by the peripheral edge elastically deforms away from the roof membrane as a force is applied against the mounting plate; and
    a fastener threadedly secured to the threaded cylindrical protrusion;
    wherein the threaded protrusion extends through the opening;
    wherein a watertight seal is formed between the fastener, the top surface of the elastic membrane, and an outer surface of the threaded protrusion, the watertight seal is configured to prevent water from passing through the opening; and
    wherein the mounting plate is disposed between the elastic membrane and the roof membrane, the mounting plate is configured to securely attach to the inner portion of the bottom surface of the elastic membrane that elastically deforms in a direction away from the roof membrane as the force is applied against the mounting plate, the top surface of the mounting plate and the bottom surface of the elastic membrane forming the watertight seal.

2. The system of claim 1, wherein the elastic membrane is bonded to the top surface of the mounting plate.

3. The system of claim 2, wherein the elastic membrane is adhesively bonded to the top surface of the mounting plate.

4. The system of claim 1, further comprising:
    a plurality of plywood sheets secured to the roof structure and sandwiched between the roof structure and the roof membrane.

* * * * *